March 27, 1956

W. R. GRISWOLD ET AL 2,739,430

CARTON LOADING MACHINE

Filed Sept. 22, 1951

Inventors:
Walter R. Griswold
and Biagio J. Nigrelli
By: E A Wagonseller
Atty

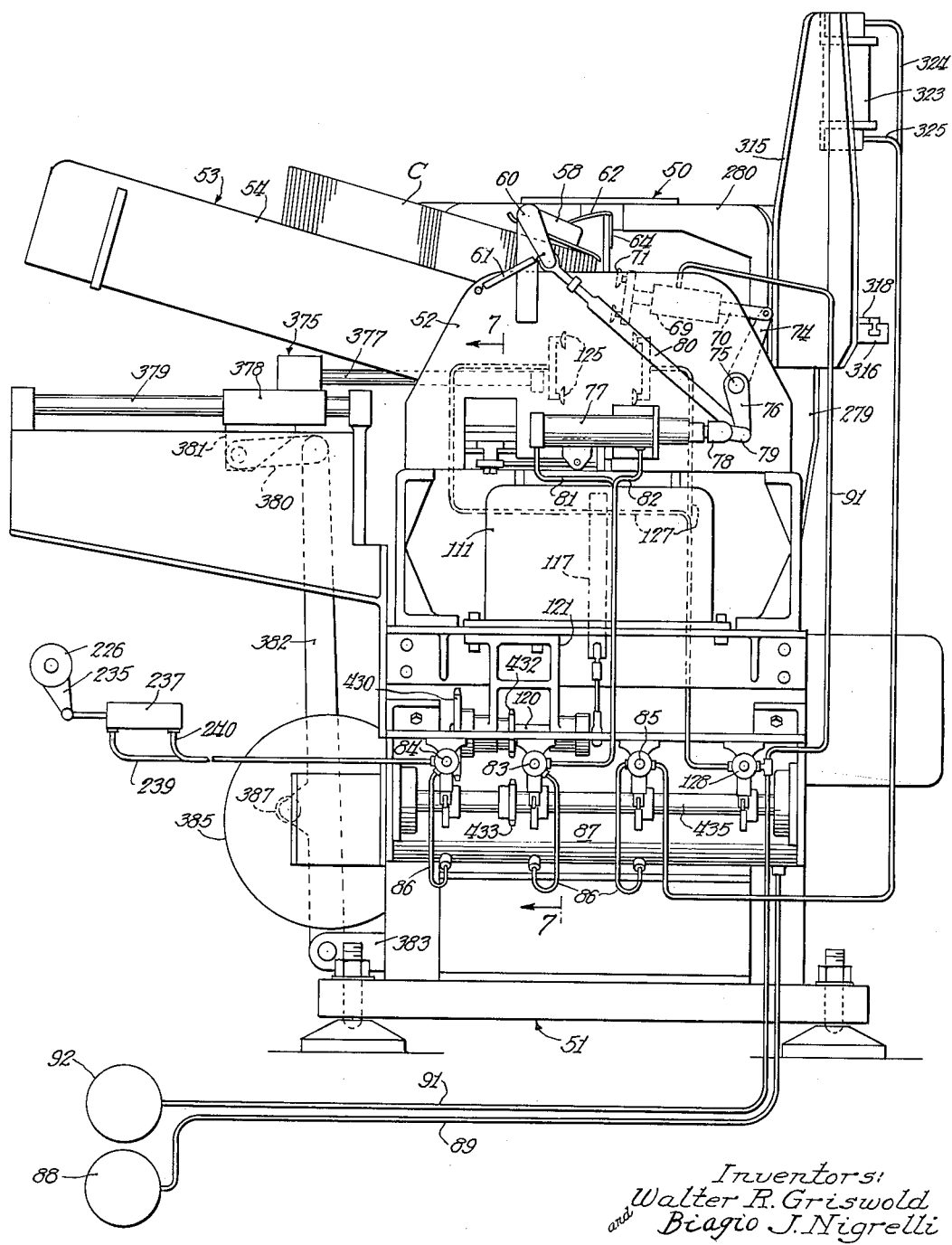

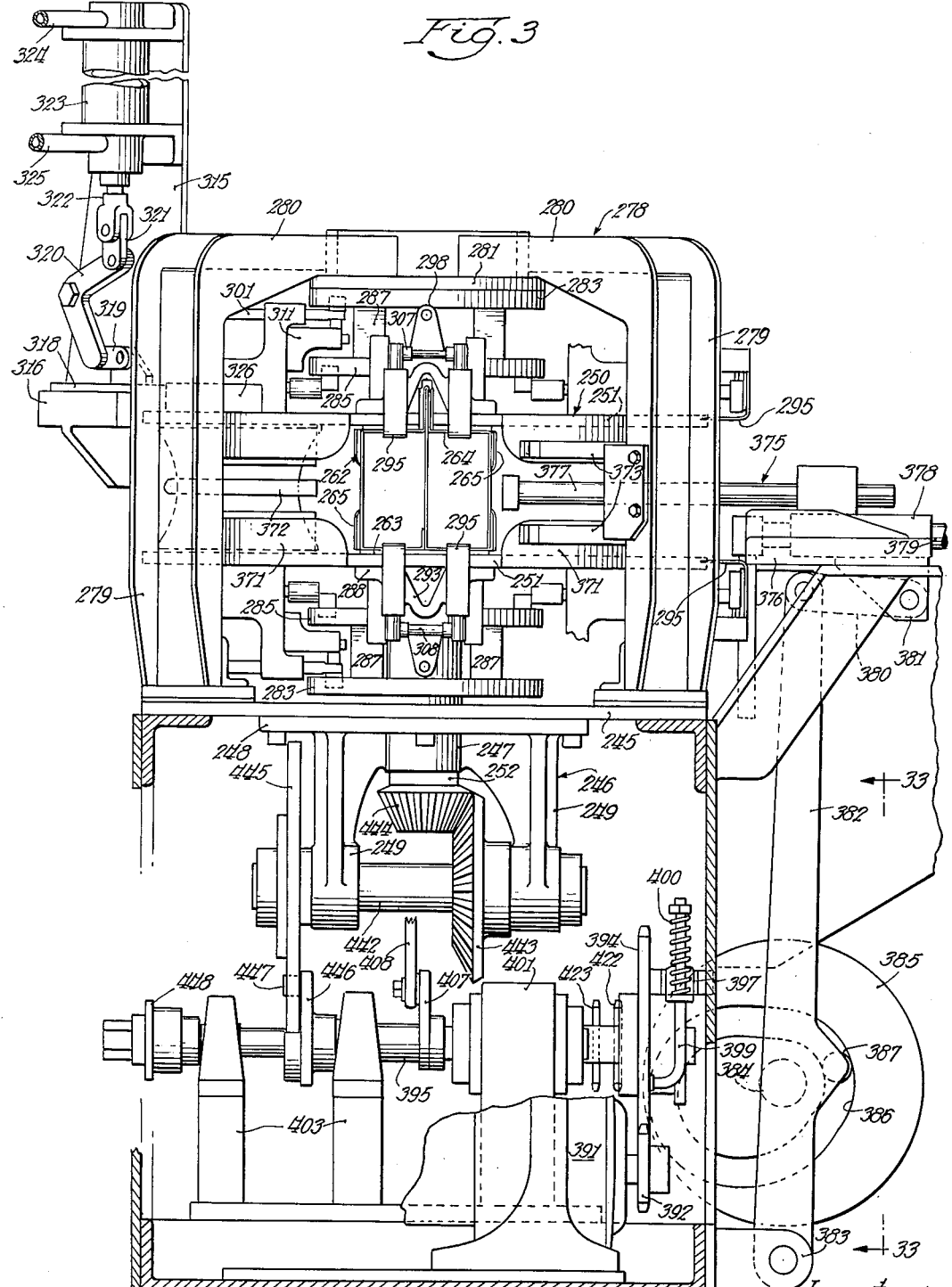

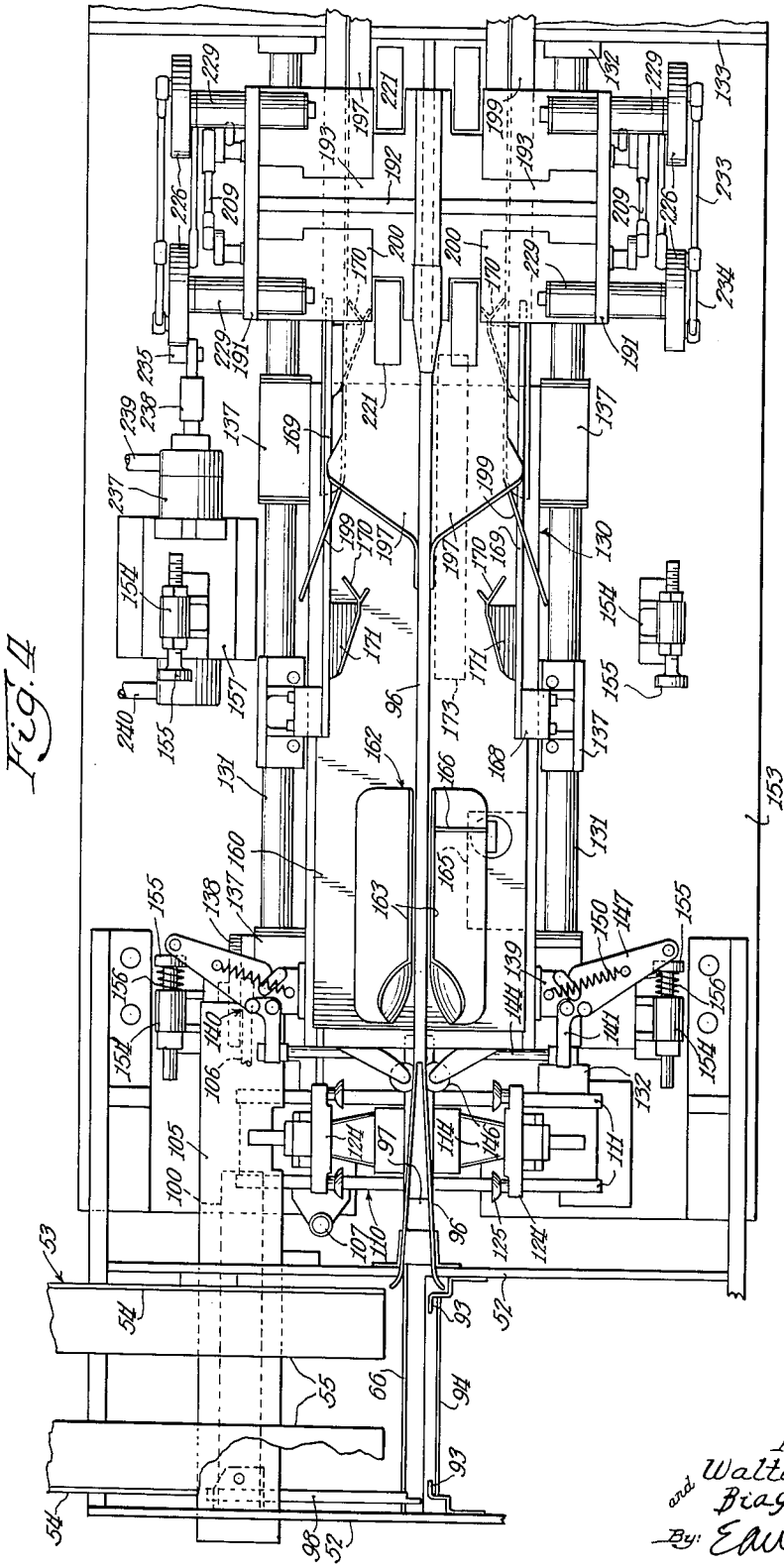

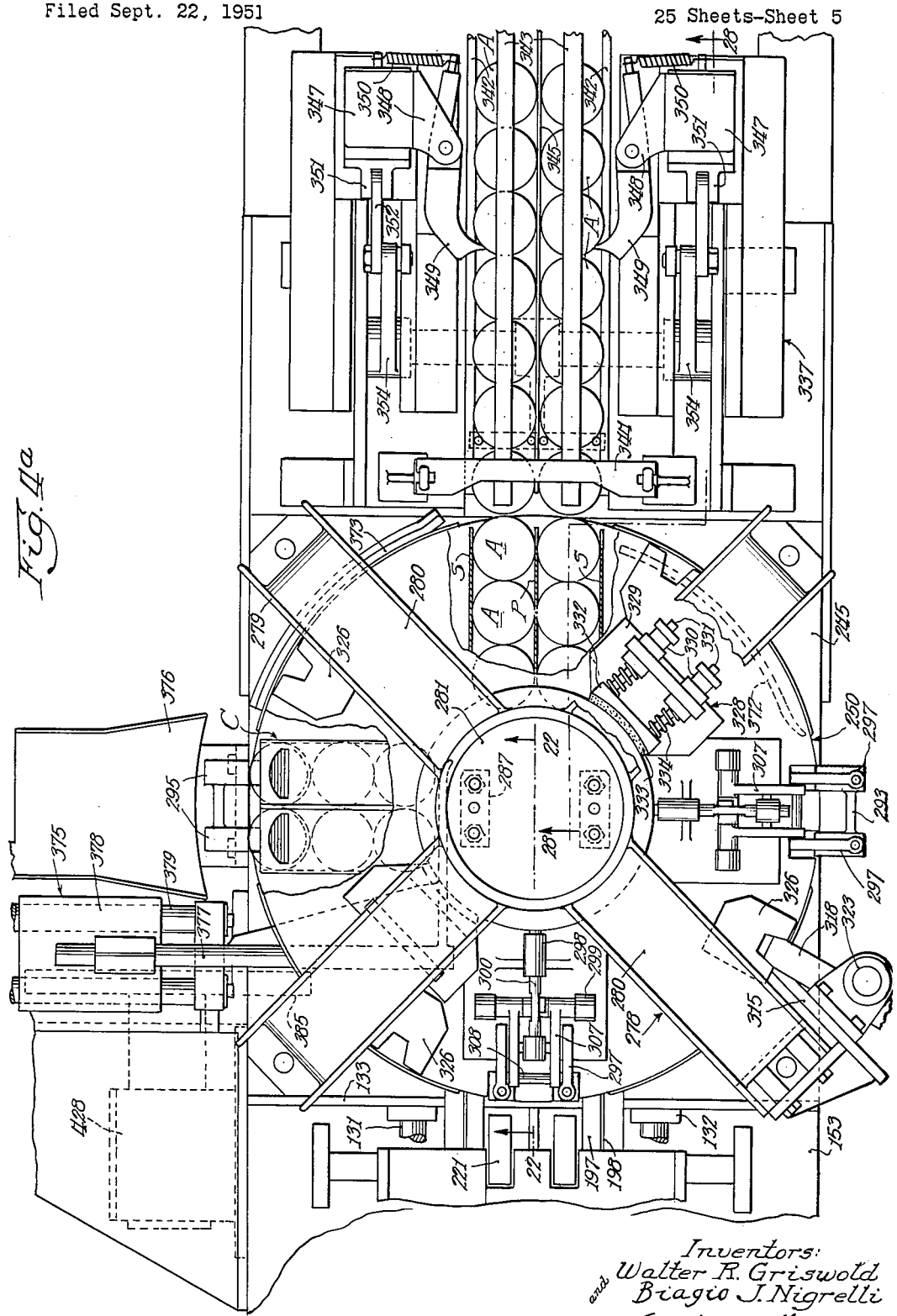

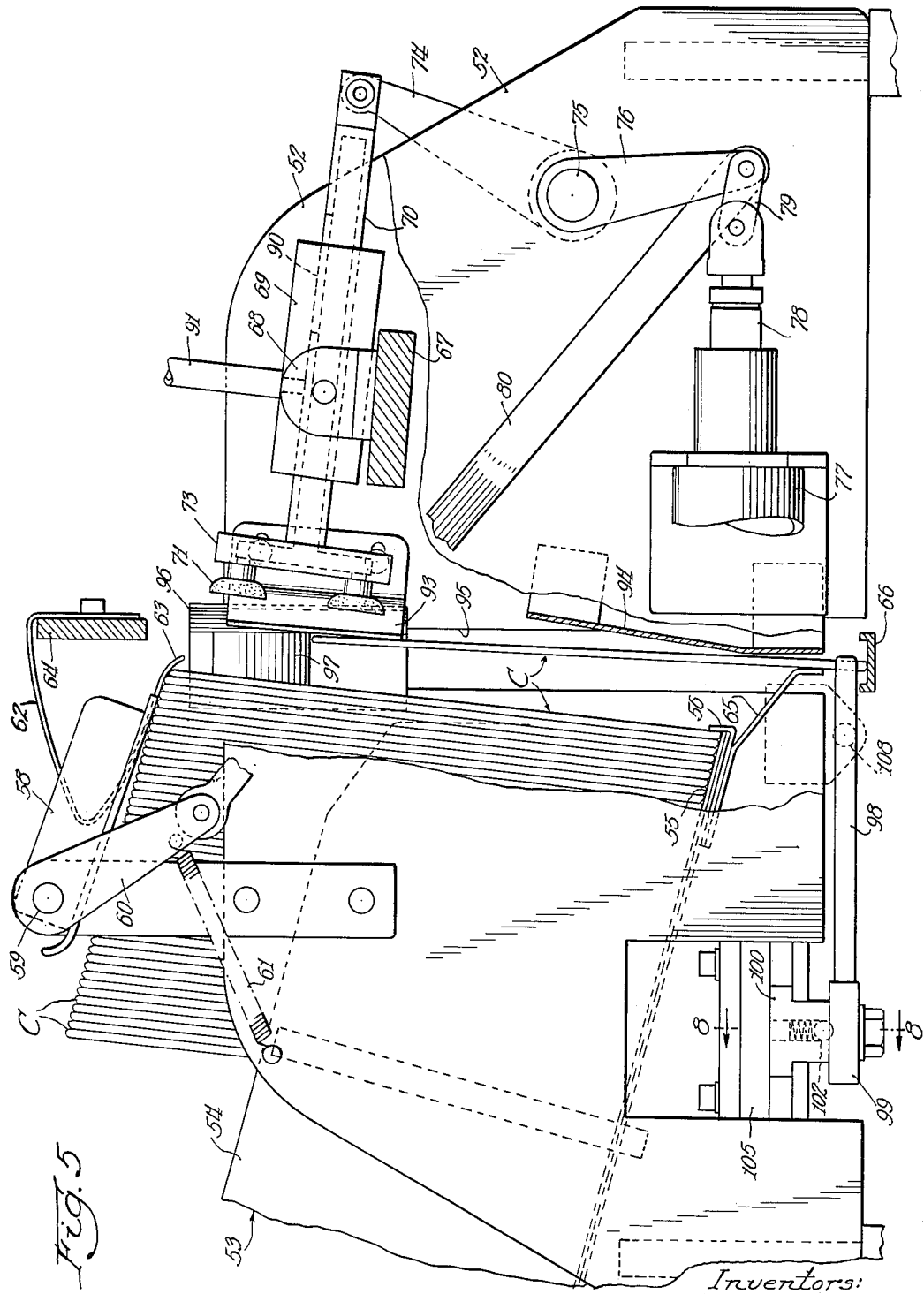

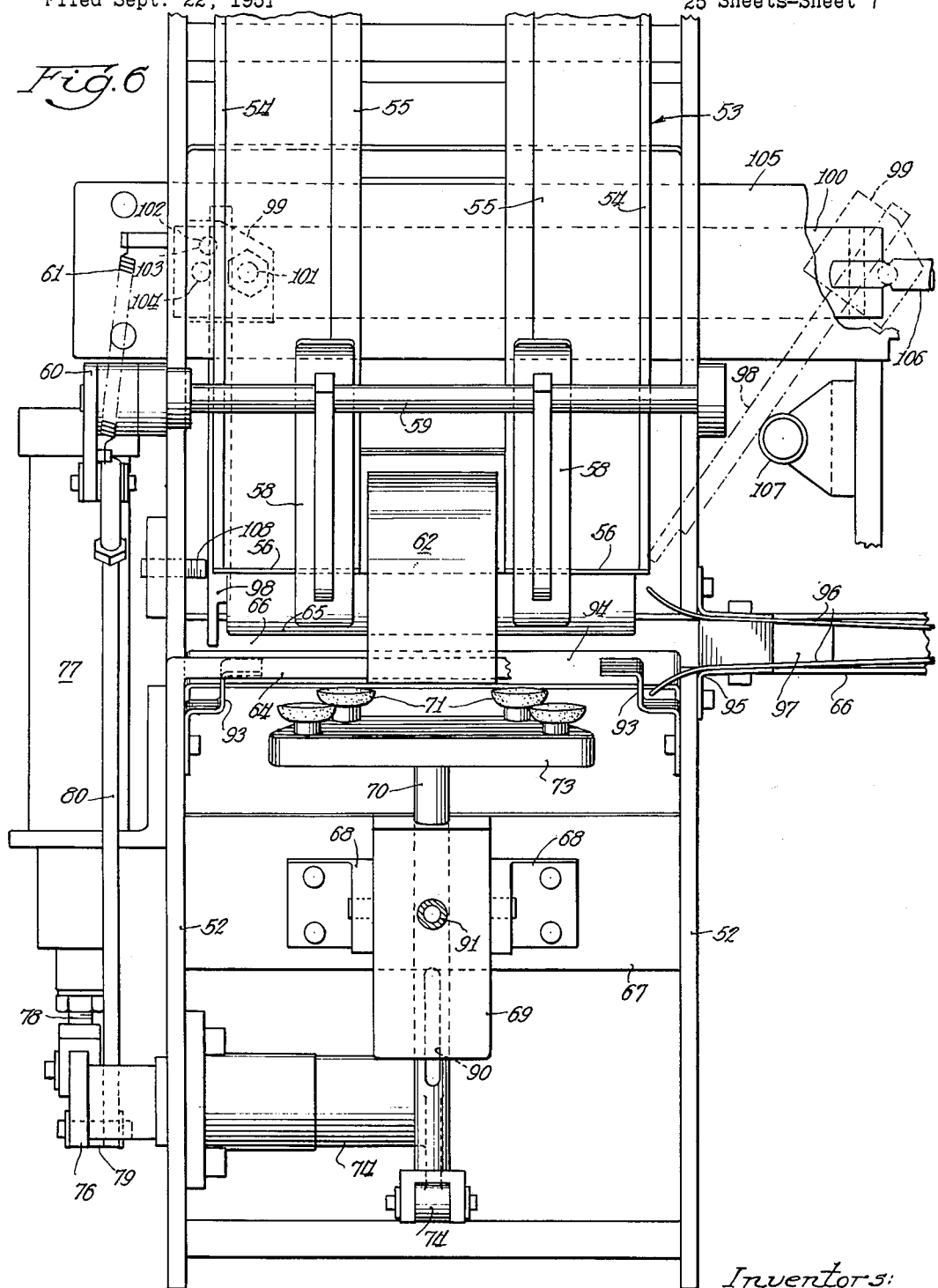

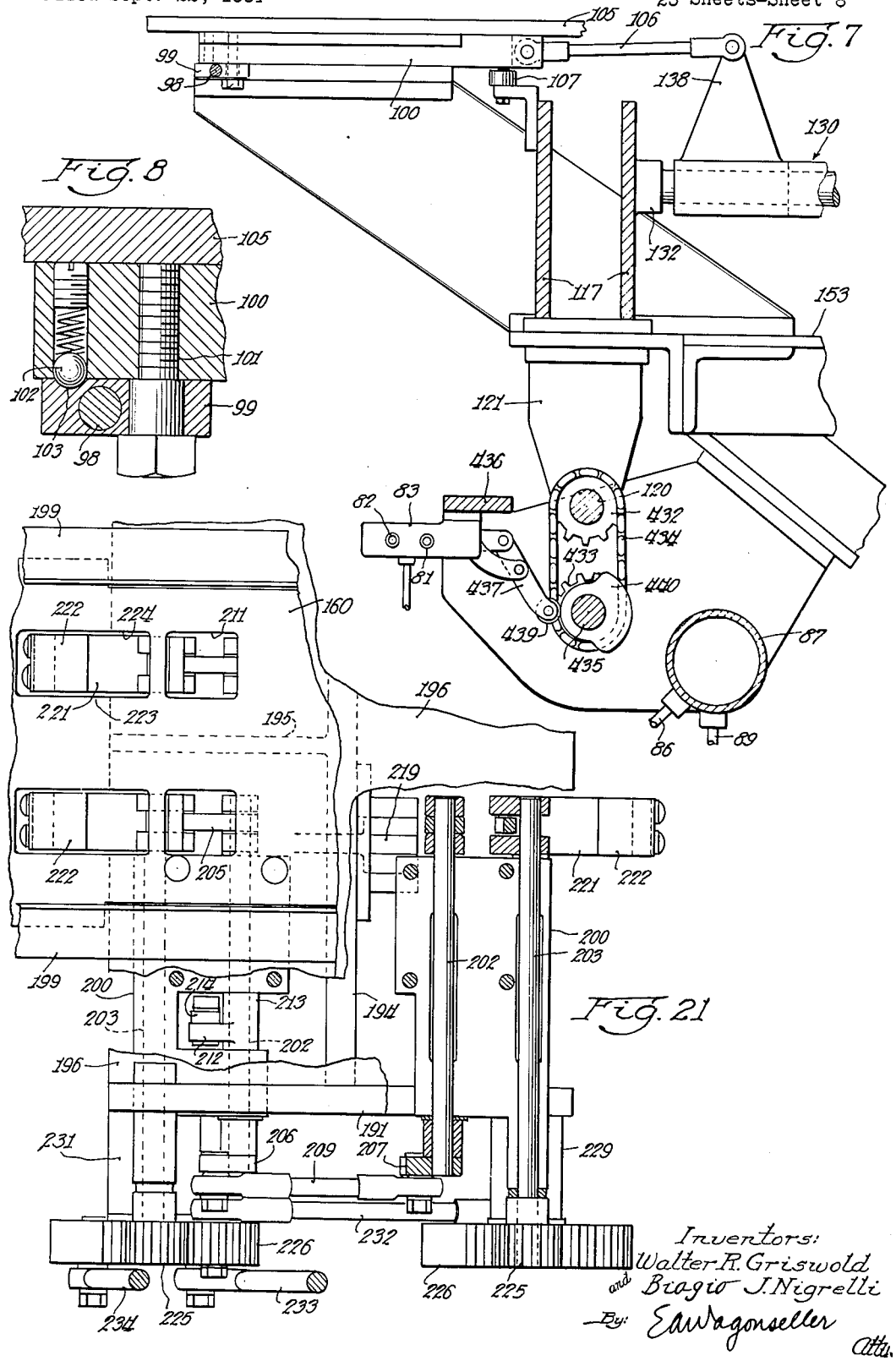

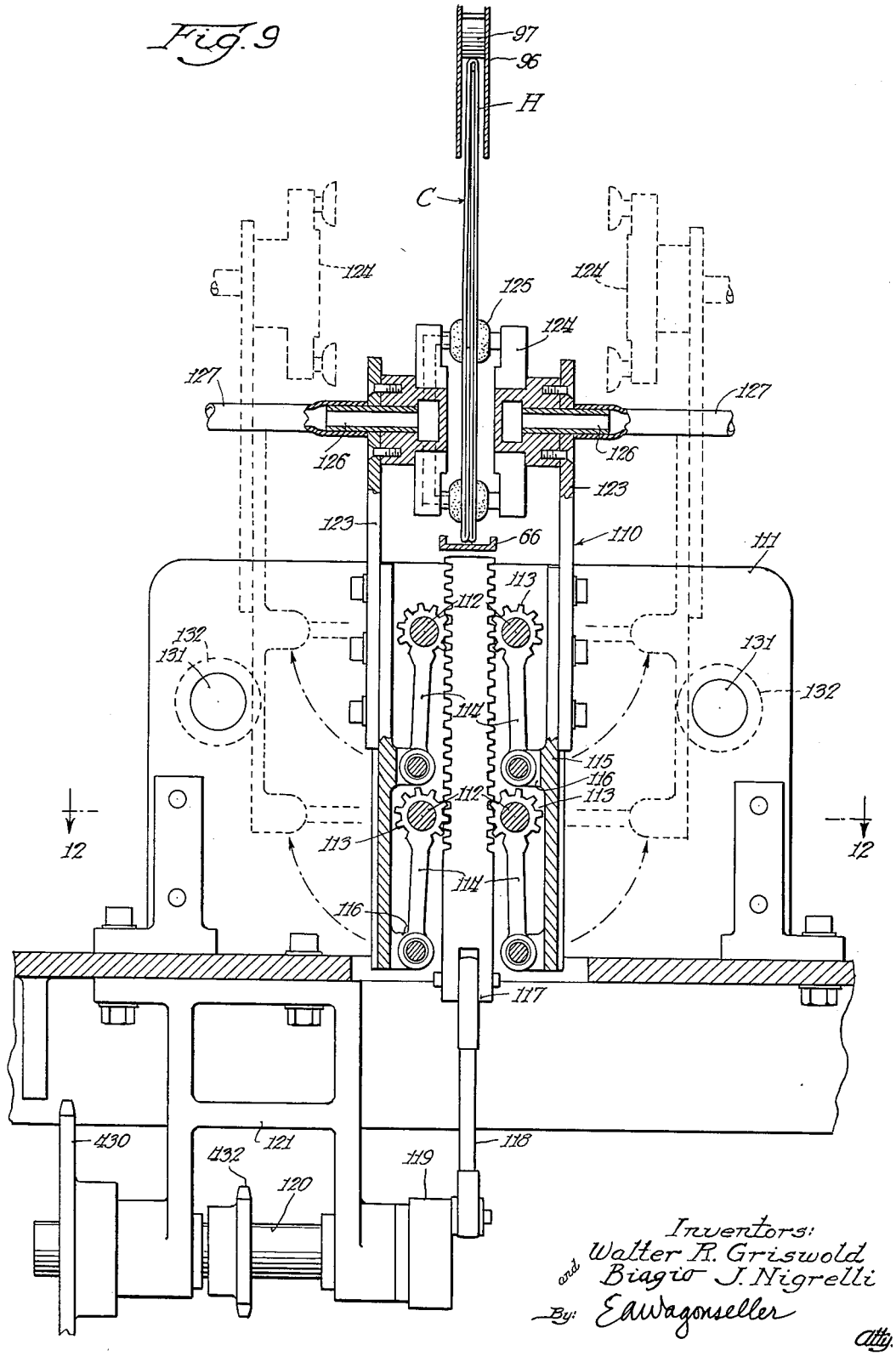

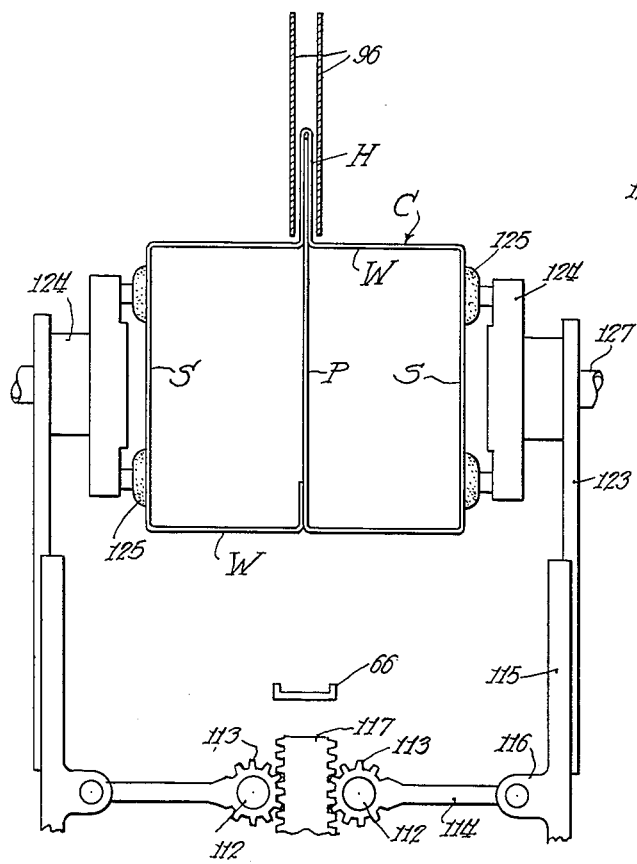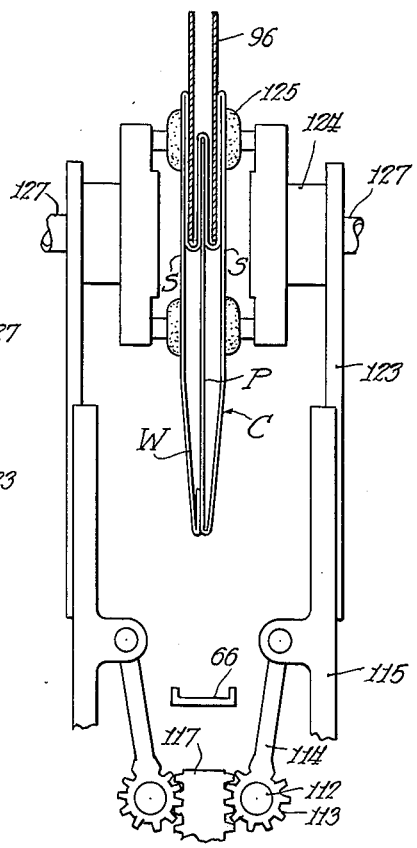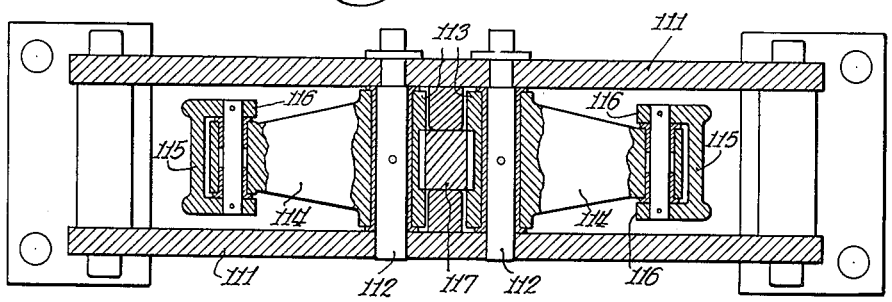

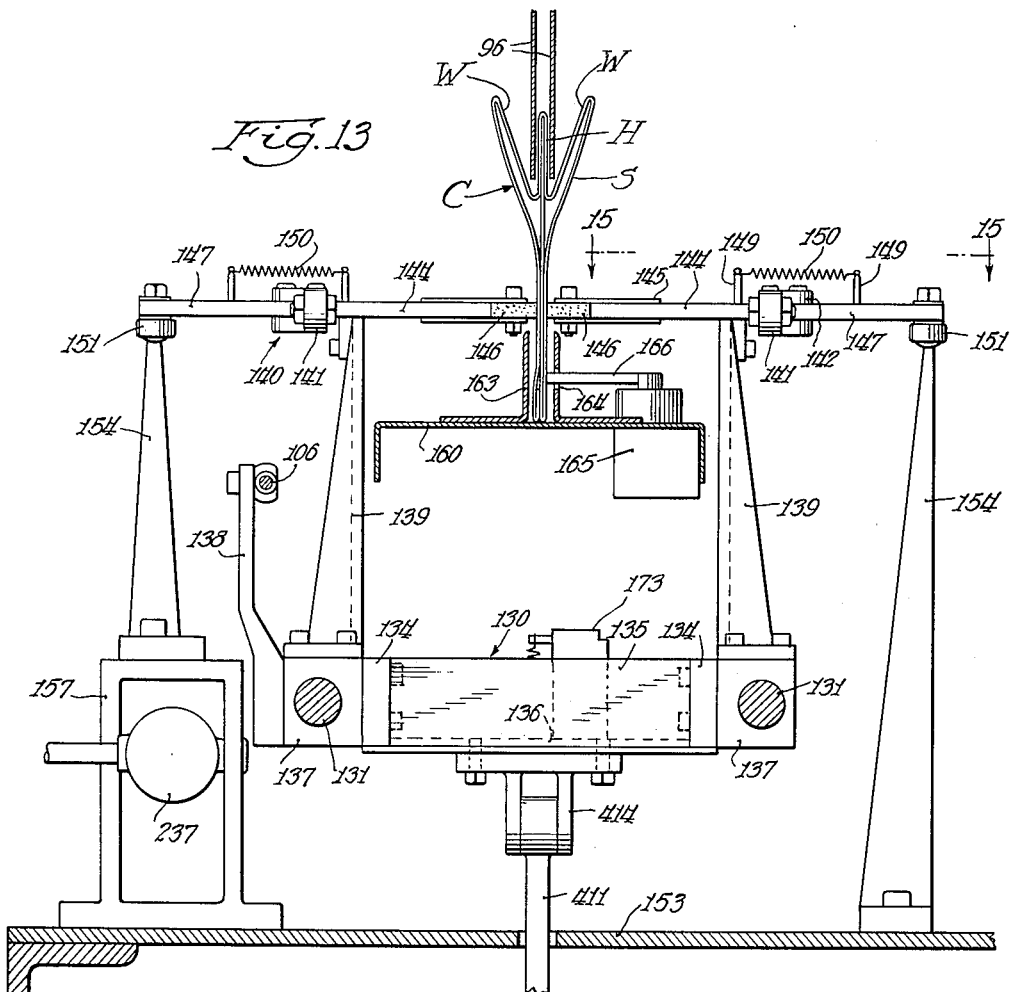
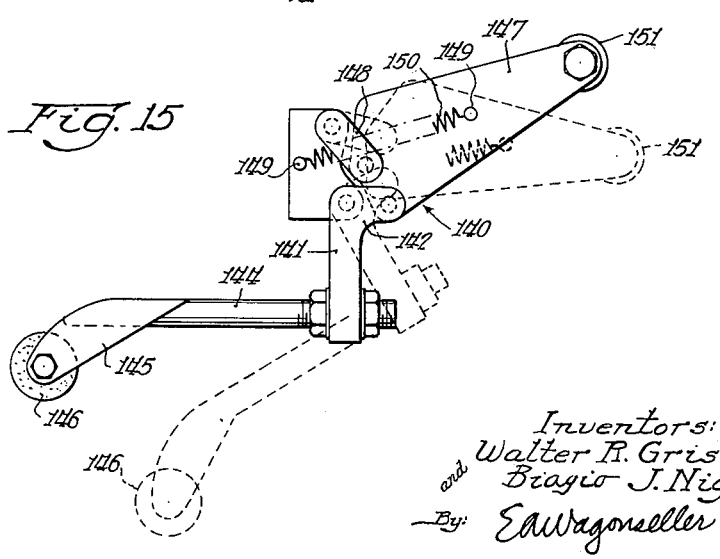

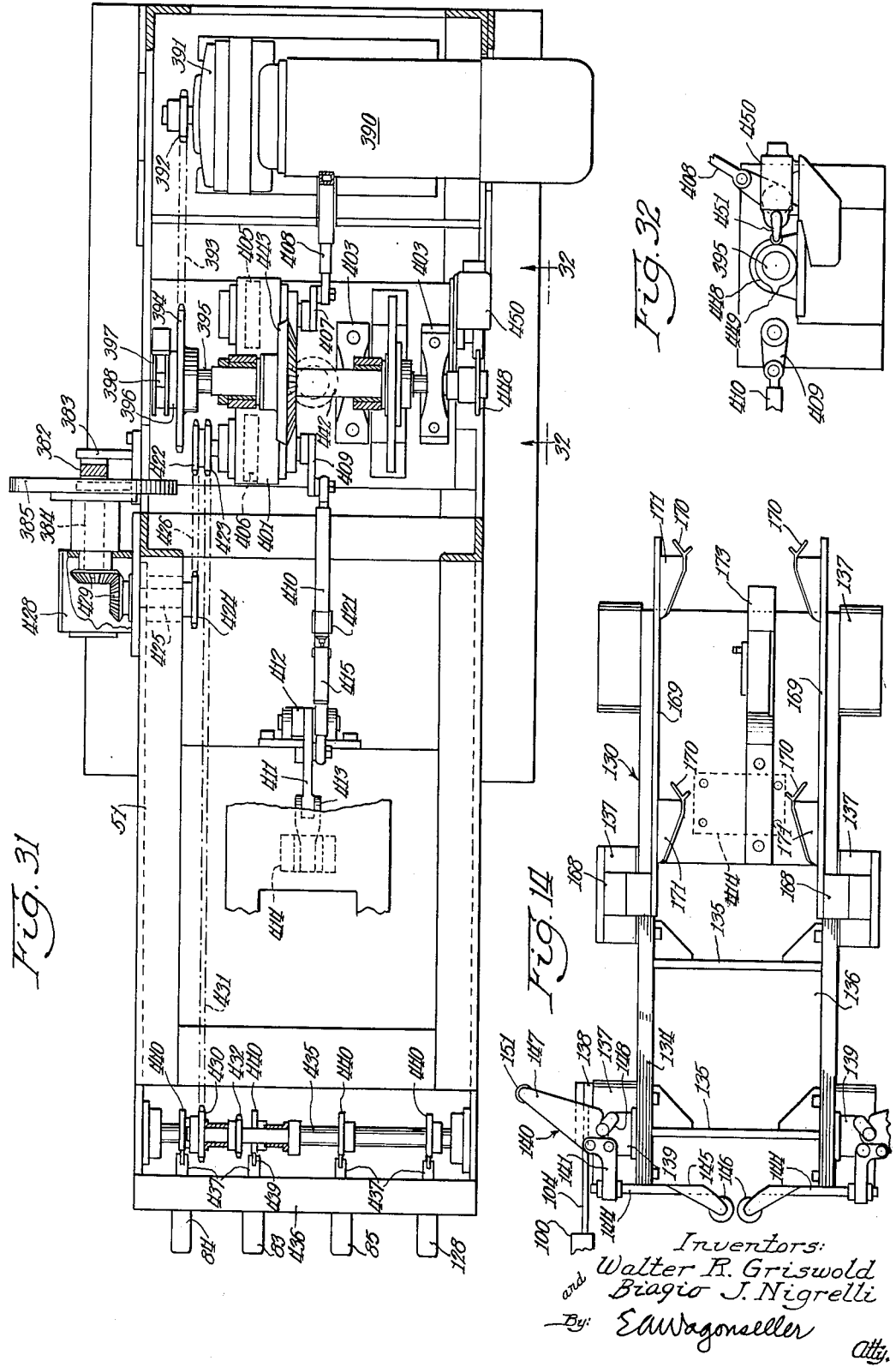

March 27, 1956 W. R. GRISWOLD ET AL 2,739,430
CARTON LOADING MACHINE
Filed Sept. 22, 1951 25 Sheets-Sheet 13
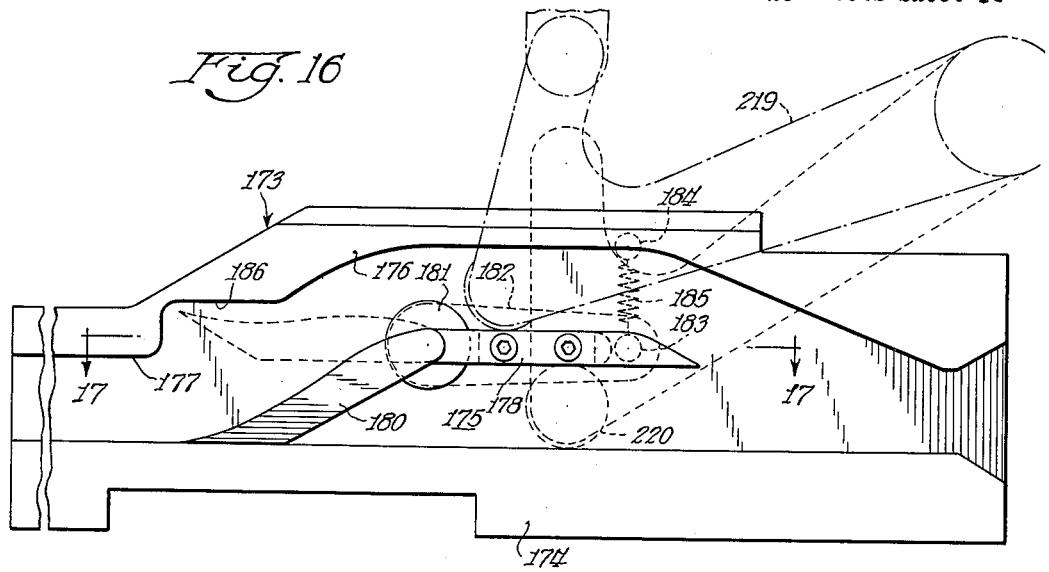
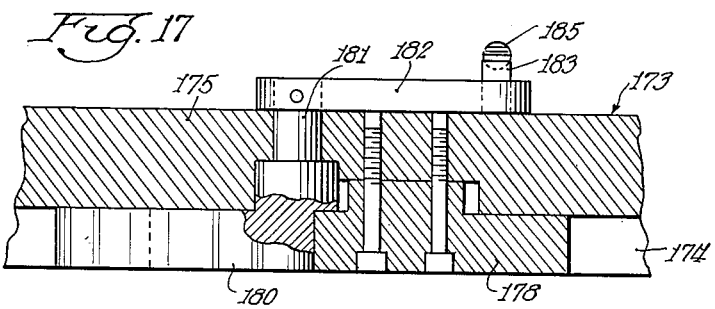
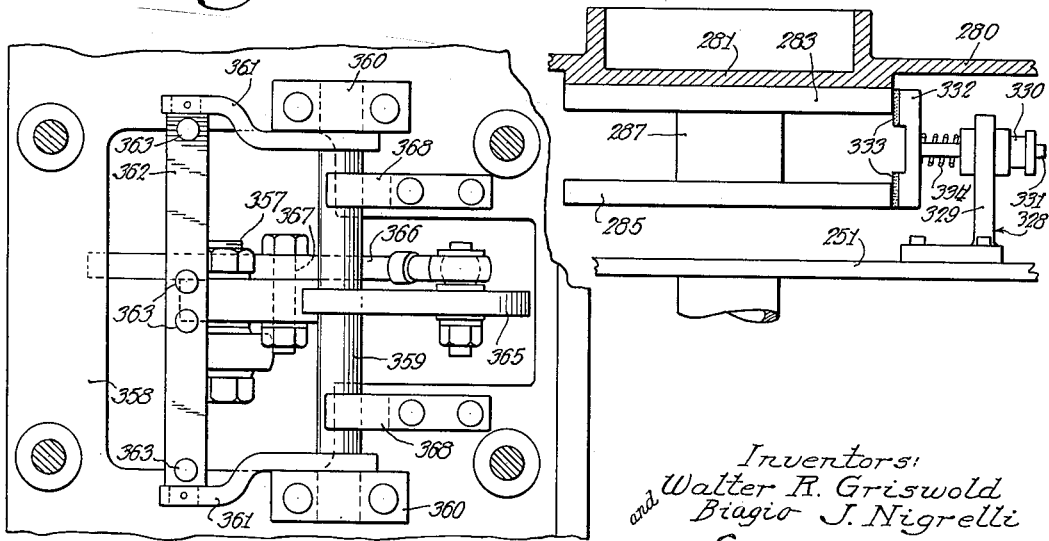
Inventors:
Walter R. Griswold
and Biagio J. Nigrelli
By: E. W. Wagonseller
Atty.

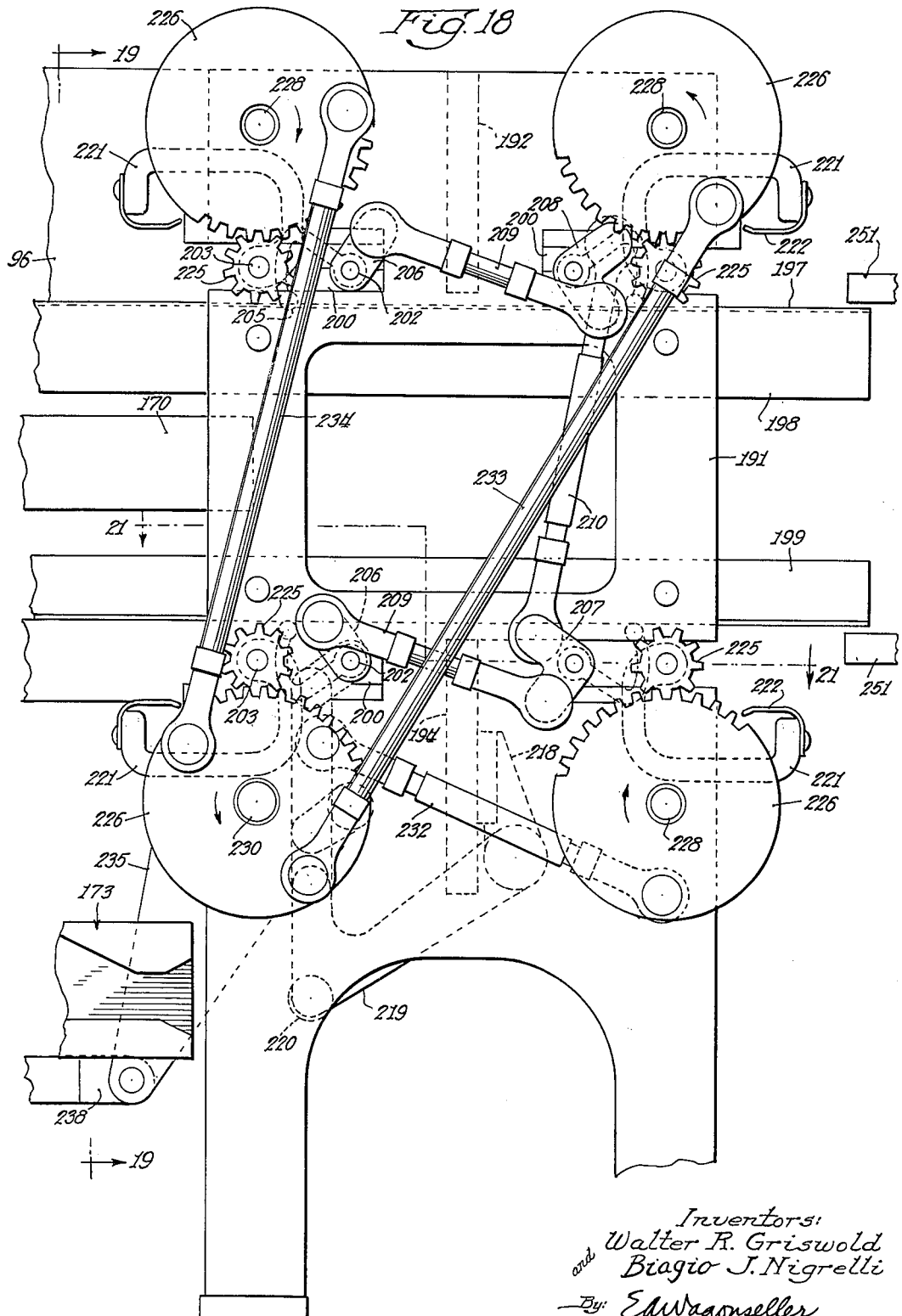

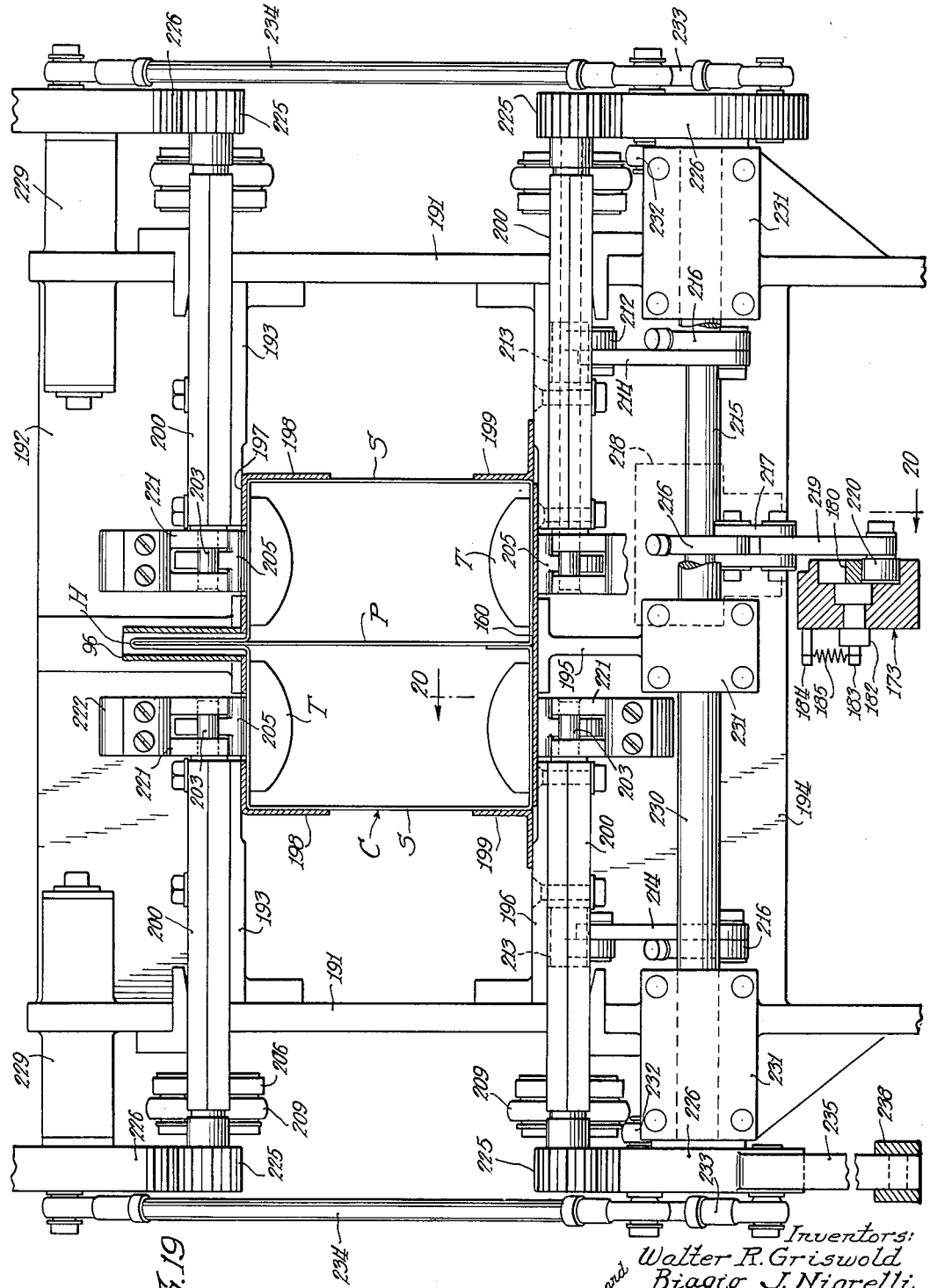

March 27, 1956 W. R. GRISWOLD ET AL 2,739,430
CARTON LOADING MACHINE
Filed Sept. 22, 1951 25 Sheets-Sheet 16
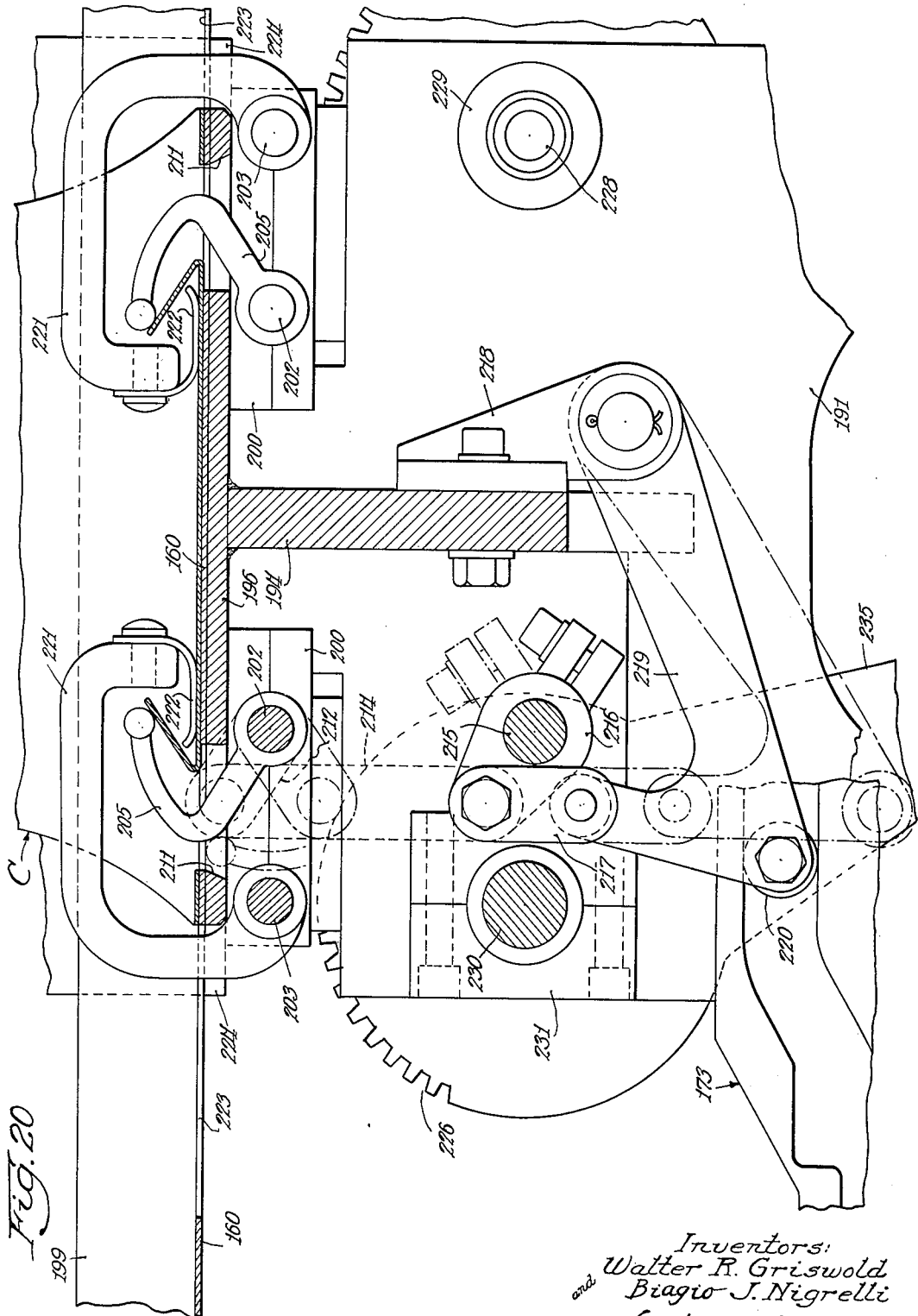
Inventors:
Walter R. Griswold
and Biagio J. Nigrelli
By: E. W. Wagonseller
Atty.

March 27, 1956 W. R. GRISWOLD ET AL 2,739,430
CARTON LOADING MACHINE
Filed Sept. 22, 1951 25 Sheets-Sheet 17

Inventors:
Walter R. Griswold
and Biagio J. Nigrelli
By: E.W.Wagonseller
Atty.

March 27, 1956
W. R. GRISWOLD ET AL
2,739,430
CARTON LOADING MACHINE
Filed Sept. 22, 1951
25 Sheets-Sheet 18
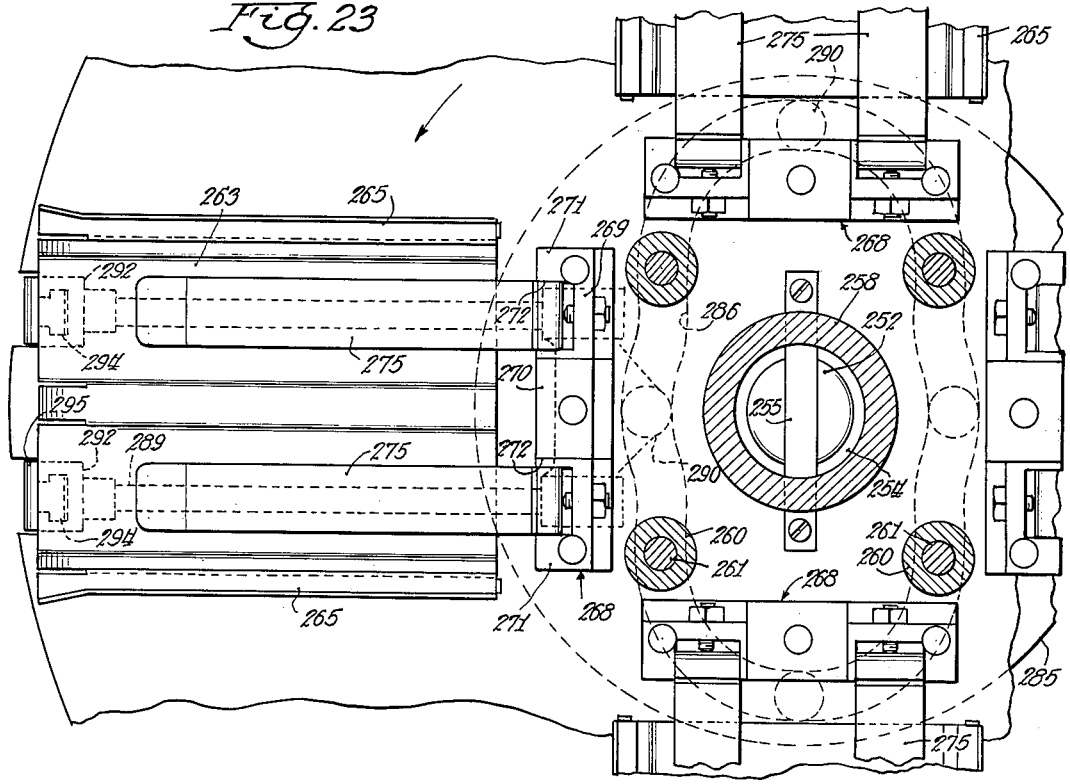
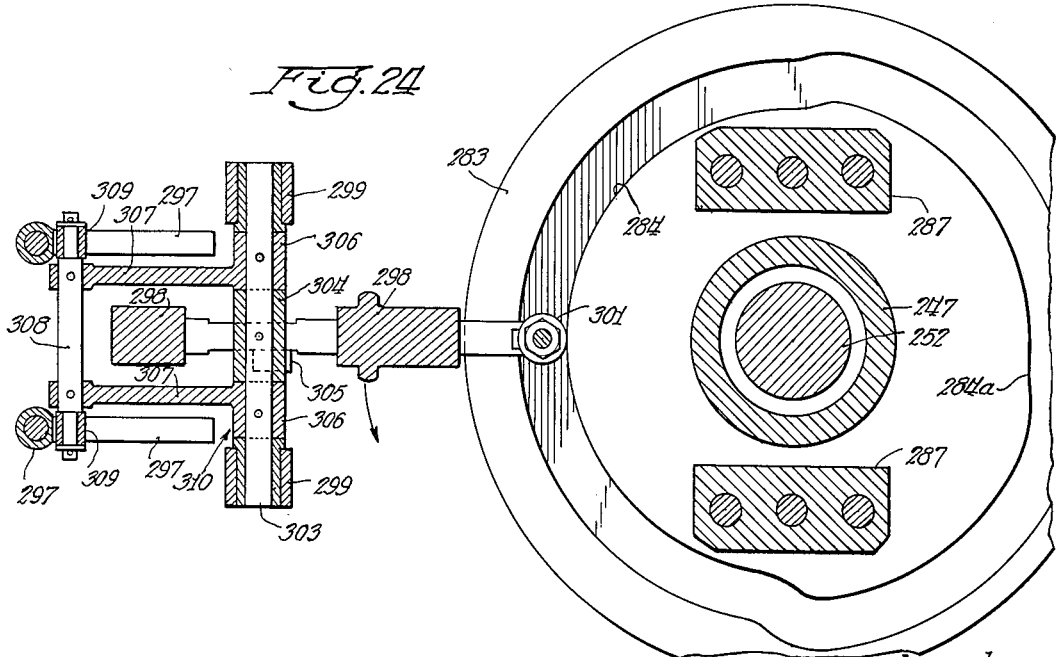
Inventors:
Walter R. Griswold
and Biagio J. Nigrelli
By: E. A. Wagonseller
Atty.

March 27, 1956  W. R. GRISWOLD ET AL  2,739,430
CARTON LOADING MACHINE
Filed Sept. 22, 1951  25 Sheets-Sheet 19
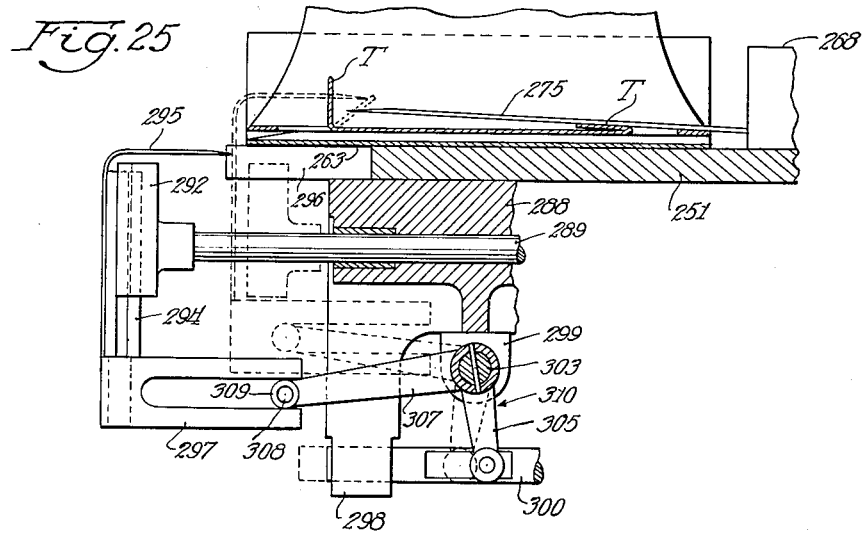
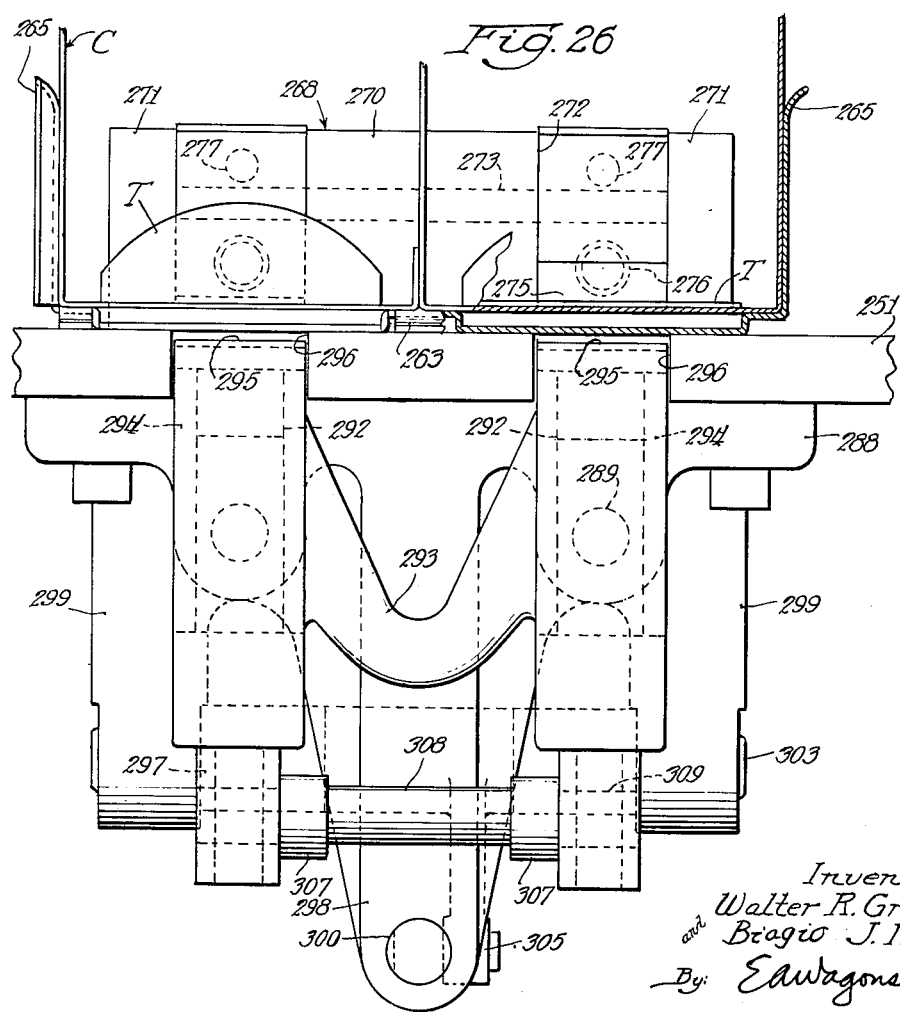
Inventors:
Walter R. Griswold
and Bragio J. Nigrelli
By: E. A. Wagonseller
Atty.

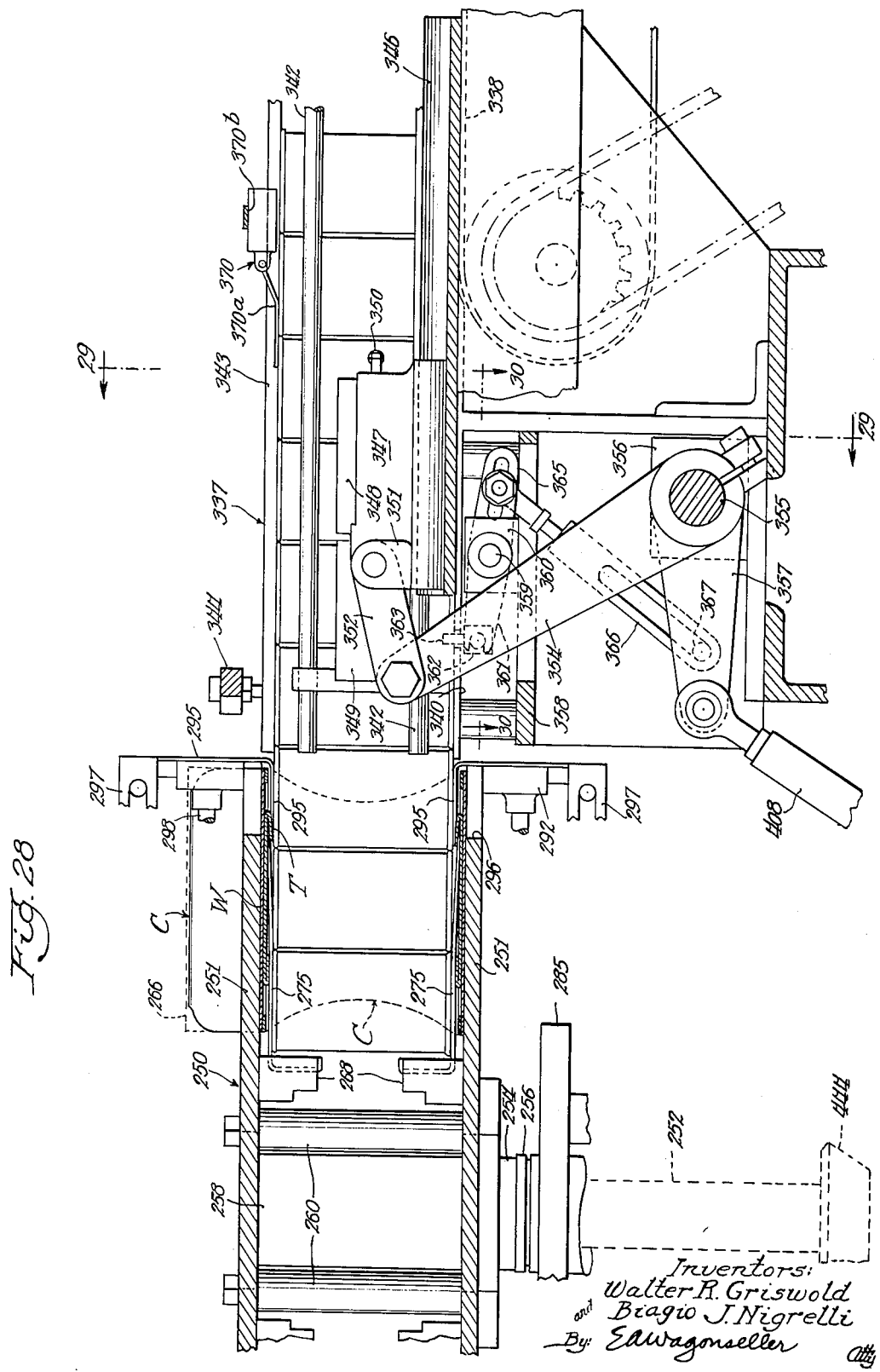

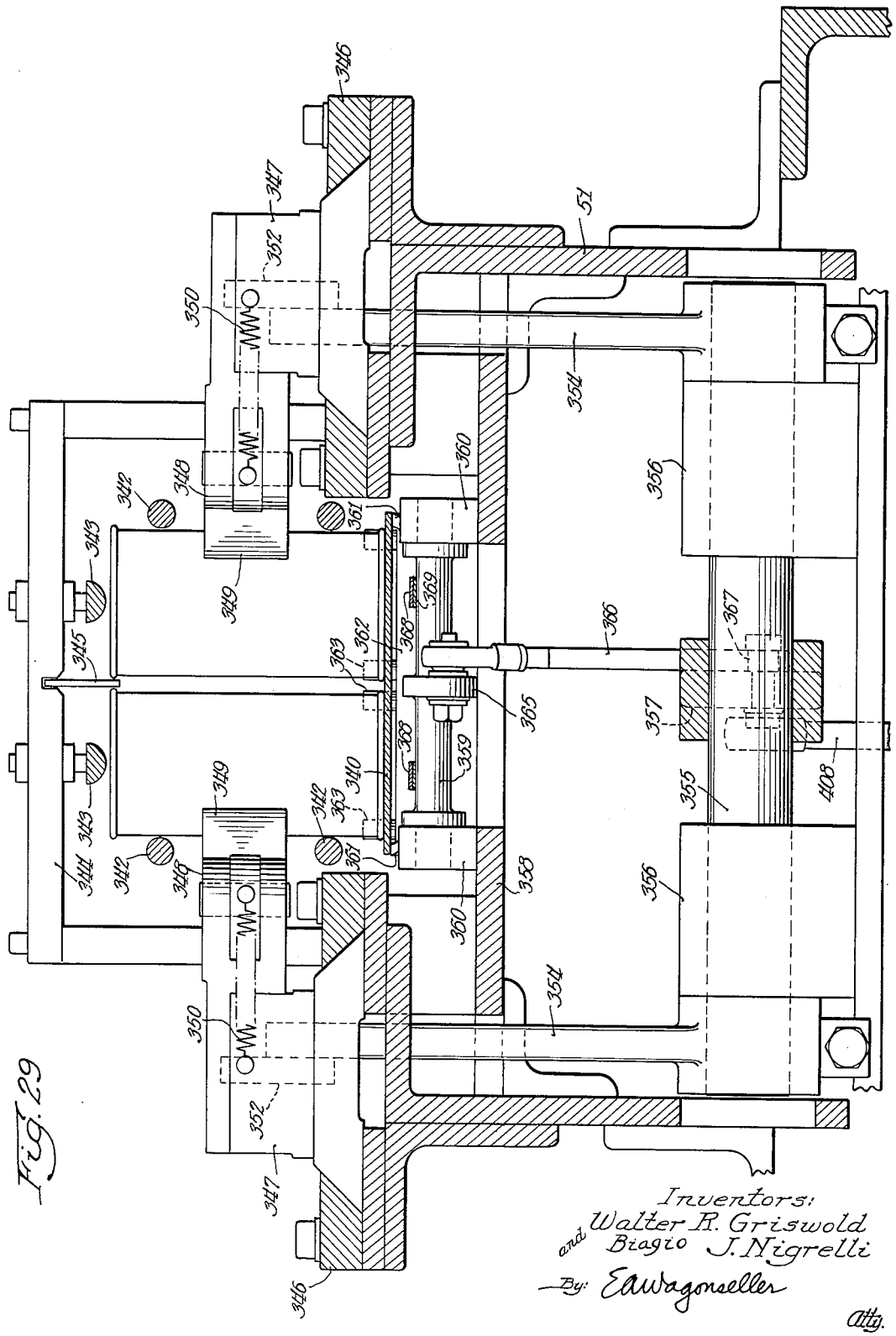

March 27, 1956 W. R. GRISWOLD ET AL 2,739,430
CARTON LOADING MACHINE
Filed Sept. 22, 1951 25 Sheets-Sheet 22
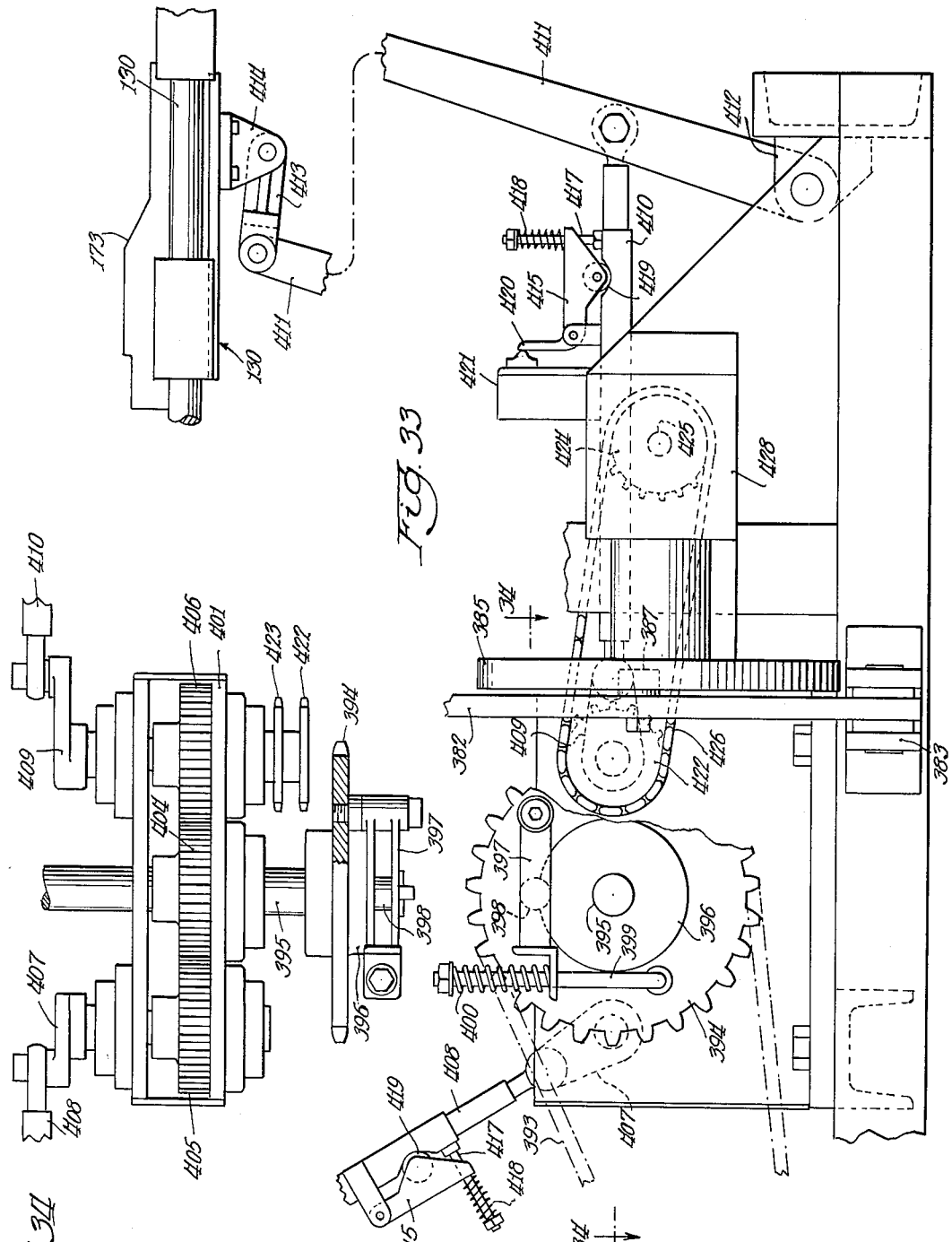
Inventors:
Walter R. Griswold
and Biagio J. Nigrelli
By: Ed Wagonseller
Atty.

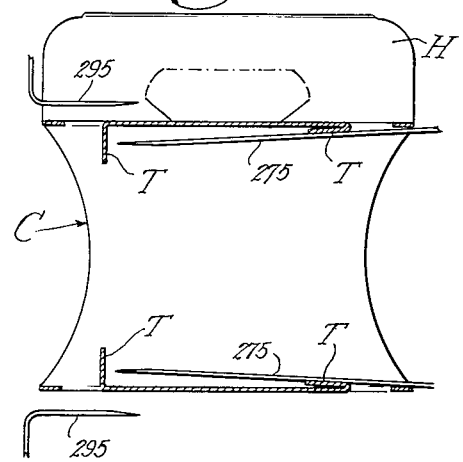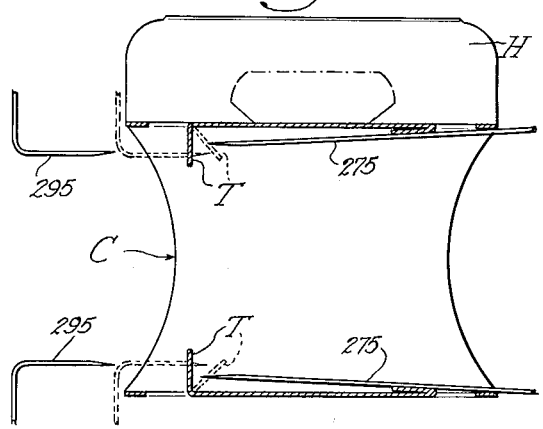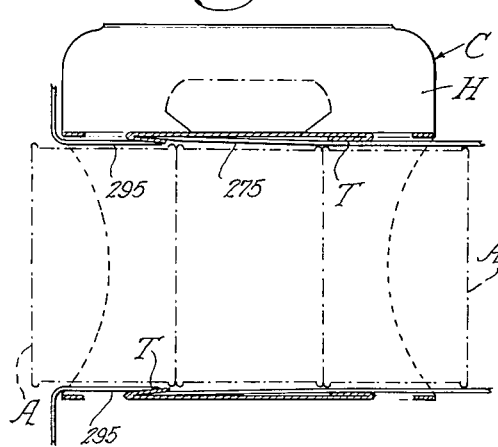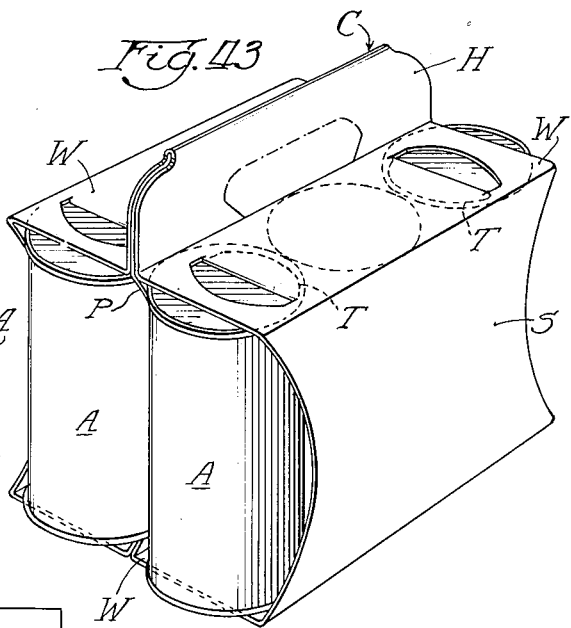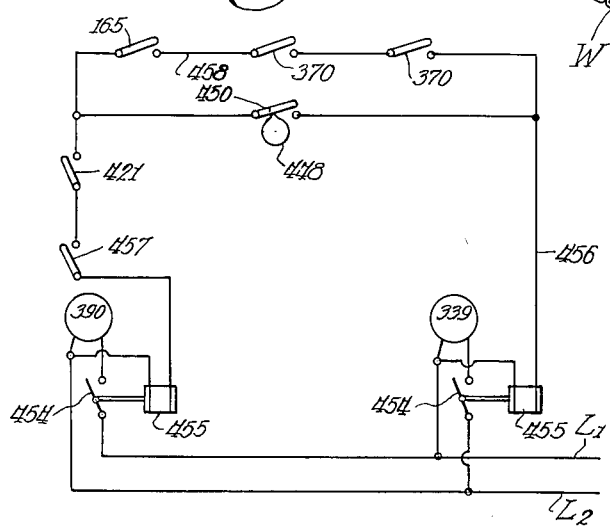
Inventors:
Walter R. Griswold
and Biagio J. Nigrelli
By: Ed Wagonseller
Atty

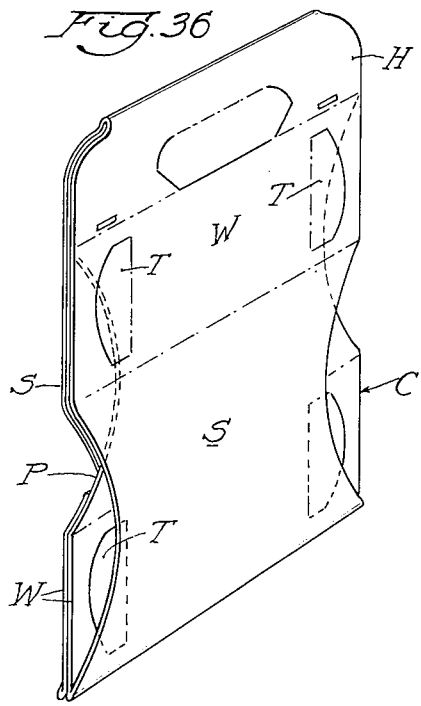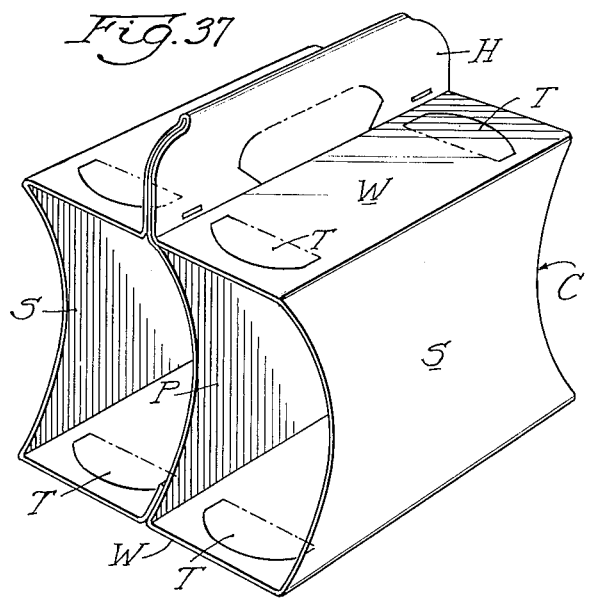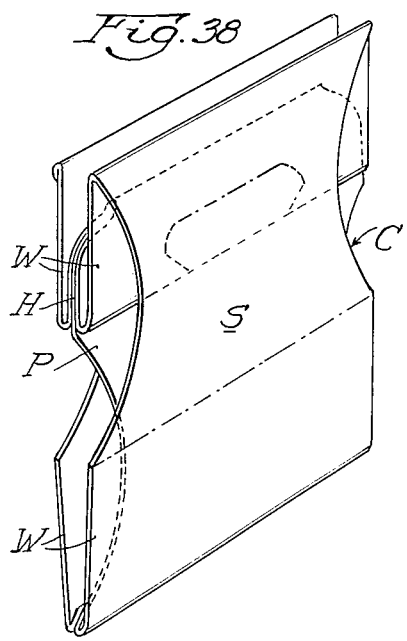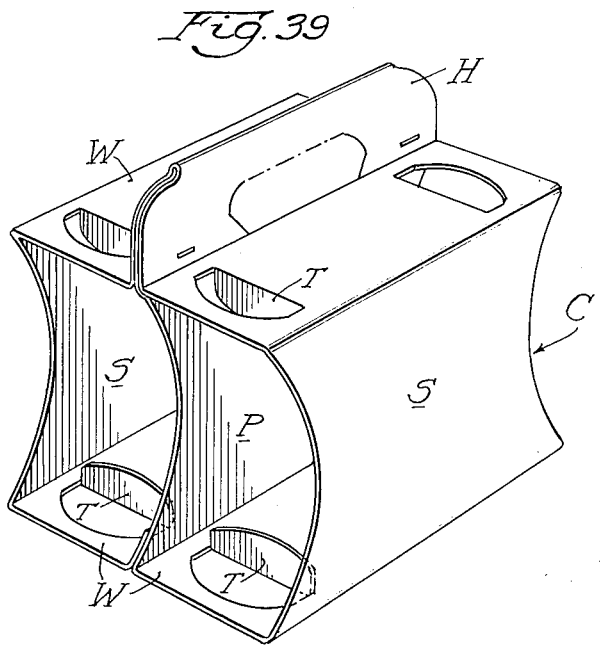

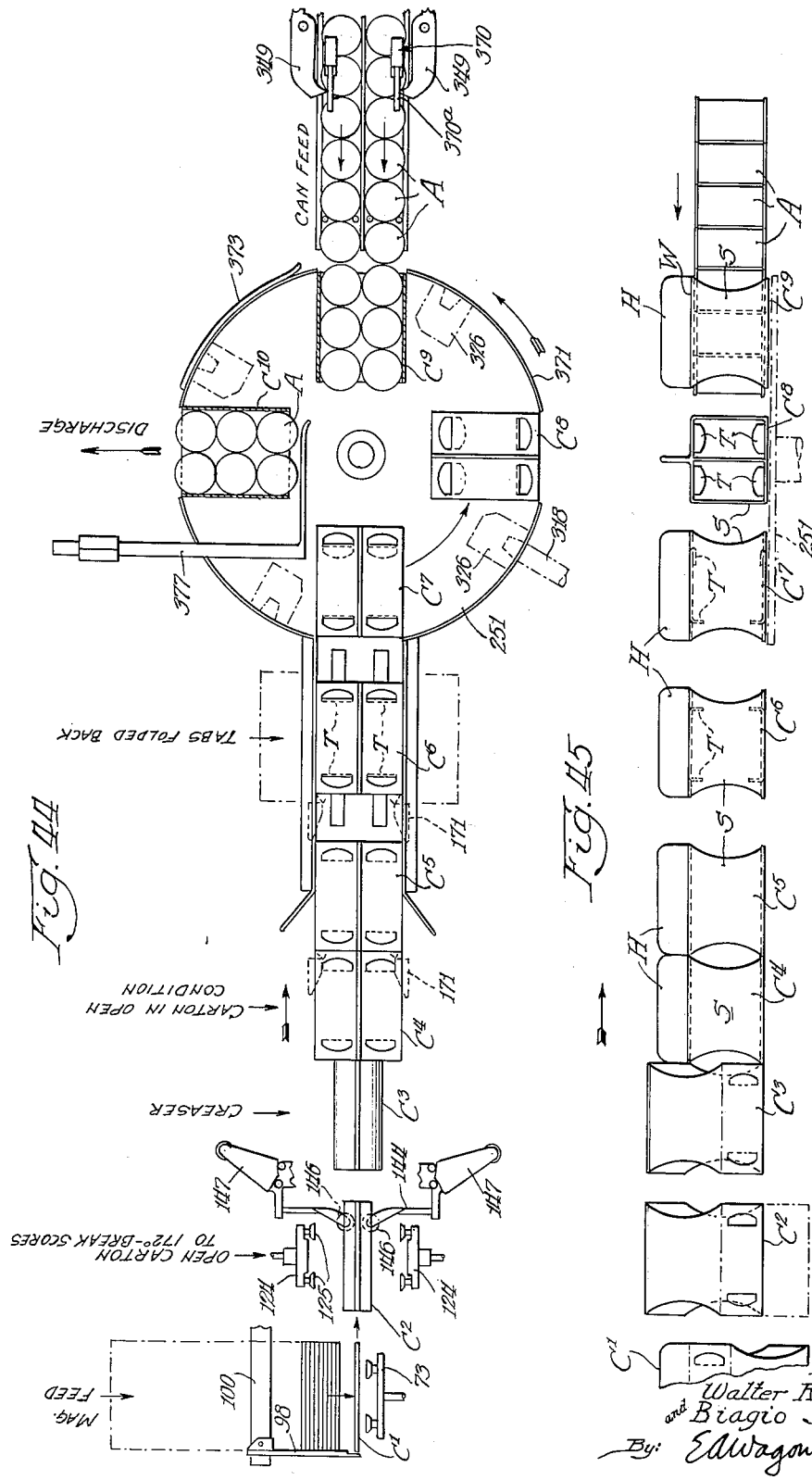

United States Patent Office 2,739,430
Patented Mar. 27, 1956

2,739,430

CARTON LOADING MACHINE

Walter R. Griswold, Minneapolis, Minn., and Biagio J. Nigrelli, Skokie, Ill., assignors to Container Corporation of America, Chicago, Ill., a corporation of Delaware Application September 22, 1951, Serial No. 247,796

18 Claims. (Cl. 53—186)

The present invention relates to a machine for loading cans or similar articles into four-walled, open-ended, tubular cartons of the type having folded tabs for retaining the articles against movement out of the carton. More particularly, the invention relates to a completely automatic machine which receives cartons in collapsed condition, expands the cartons to set-up condition, pre-folds the tabs, loads the cans or other articles into the cartons and discharges the loaded cartons.

The machine of this invention comprises a suitable frame on which are arranged means for effecting the various operations on the cartons which are necessary to accomplish the loading thereof. These means include a carton feeding mechanism at the rear of the machine for effecting timed delivery of collapsed cartons one by one and advancing the cartons forwardly to the carton expanding mechanism. The expanding mechanism comprises oppositely acting means swingable through arcs of approximately 180° in a vertical plane to fold the collapsed carton reversely for overcoming its tendency to assume collapsed condition. Tab-prefolding means are provided for initially folding the tabs out of the planes of their attached walls, these means including holding members movable into the expanded carton to support the walls adjacent the tabs during the tab-prefolding operation. A reciprocable carriage is provided with separate means for advancing the cartons step by step from the feeding mechanism to the expanding mechanism, from the expanding mechanism to the tab-prefolding means, and from the tab-prefolding means to a turntable which has compartments for receiving the opened cartons and means associated with the compartments for further folding of the carton tabs approximately against their walls in substantially their can retaining position. Opposite the tab-prefolding means is a can loading mechanism comprising a loading table onto which cans are fed by a suitable conveyor. Reciprocable pusher members are arranged to push a predetermined number of cans into the carton when a compartment of the turntable is brought into alignment with the table, and stop means are provided to prevent loading movement of the cans except upon such alignment of the compartment. A reciprocable ejector is arranged to withdraw the loaded cartons from the turntable before return of the compartments to the tab-prefolding means. Driving means are provided for actuating the several operating means in timed relation to each other, including rotation of the turntable 90° for each cycle of the carriage, pushers, and ejector. The operation of the driving means is controlled by an electric circuit which includes safety switch means for stopping the machine in the event of an overload of certain parts, the omission of a carton or cartons from the line of cartons moving to the tab-prefolding means, or a gap in the line of cans being conveyed to the can loading station.

The machine provides for rapid loading of cartons of the type described, which have gone into extensive use since their development a short time prior to the present invention and which are especially well adapted for packaging a number of flanged end cans. The invention thus constitutes a distinct advance over the hand loading of such cartons, for it operates more rapidly, cheaply, and efficiently than hand loading.

It is an object of the invention to provide an efficient machine for loading articles into tubular open-ended cartons which feeds the cartons in collapsed form, expands the cartons, loads articles into the cartons, and discharges the loaded cartons. Another object is the provision of a machine for loading articles into tubular open-ended cartons having inwardly foldable tabs for engaging articles disposed adjacent open ends of the cartons for preventing article movement out of the open carton ends, which feeds and expands collapsed cartons, pre-folds the tabs, and loads articles into the cartons in position for engagement by the tabs. A further object is the provision of a machine for loading flanged-end articles into tubular open-ended cartons having inwardly foldable tabs for engaging the flanges of articles disposed adjacent open carton ends to prevent outward movement of the articles, which feeds and expands collapsed cartons, folds the tabs, and loads articles into the cartons in position for retaining engagement by the tabs. Still another object is the provision in carton handling apparatus of an effective mechanism for feeding collapsed cartons singly from a supply of carton. It is another object to provide in carton handling apparatus mechanism for expanding the cartons from collapsed form, and further to provide such mechanism for reversely collapsing the carton to overcome the inherent resilience of the carton material and thereby reduce collapsing tendency of expanded cartons. Another object is the provision, in apparatus for handling tubular open-ended cartons having inwardly foldable article-retaining tabs, of mechanism for folding the tabs inwardly to facilitate later folding thereof to desired position. Another object is the provision in apparatus for handling tubular open-ended cartons having inwardly foldable article-retaining tabs, of mechanism for folding the tabs inwardly to desired position. Another object is the provision, in apparatus for loading articles into open-ended tubular cartons having inwardly foldable article-retaining tabs, of mechanism for carrying expanded cartons and folding the tabs thereof inwardly to desired position. It is still another object of the invention to provide, in apparatus for loading articles into open-ended tubular cartons having inwardly foldable article-retaining tabs, mechanism for folding the tabs inwardly and guiding articles into the cartons out of engagement with the tabs.

Other and further objects, advantages, and features of the machine will be apparent to those skilled in the art from the following description together with the appended drawings, in which:

Fig. 2 is a rear elevation, partly diagrammatic, of the machine;

Fig. 3 is a transverse vertical section taken substantially as indicated by the line 3—3 in Fig. 1;

Figs. 4 and 4a are plan views of the rear and forward portions of the machine, respectively;

Fig. 5 is an enlarged fragmentary elevation, partly in section and with certain parts broken away, of the carton feeding mechanism;

Fig. 6 is a plan of the carton feeding mechanism;

Fig. 7 is an enlarged sectional view taken on the line 7—7 of Fig. 2, showing certain parts of the feeding mechanism;

Fig. 8 is an enlarged detail sectional view taken on the line 8—8 of Fig. 5;

Fig. 9 is an enlarged transverse sectional view taken on the line 9—9 of Fig. 1, showing the carton expanding mechanism;

Figs. 10 and 11 are diagrammatic views of the mechanism shown in Fig. 9, illustrating different positions thereof;

Fig. 12 is a horizontal sectional view taken on the line 12—12 of Fig. 9;

Fig. 13 is a vertical section taken substantially on the line 13—13 of Fig. 1, showing a rear view of the reciprocating carriage;

Fig. 14 is a plan of the carriage and the parts mounted thereon;

Fig. 15 is an enlarged detail of toggle clamp means mounted on the carriage, taken as indicated by the line 15—15 in Fig. 13;

Fig. 16 is a side elevation of a can mounted on the carriage;

Fig. 17 is a horizontal section taken substantially as indicated by the line 17—17 of Fig. 16;

Fig. 18 is an enlarged side elevation of the tab prefolding mechanism;

Fig. 19 is a rear view of the tab pre-folding mechanism, taken substantially on the line 19—19 of Fig. 18;

Fig. 20 is a vertical section taken substantially as shown by the line 20—20 of Fig. 19;

Fig. 21 is a horizontal section taken substantially as indicated by the line 21—21 of Fig. 18;

Fig. 22 is a vertical section illustrating the construction of the turntable, taken substantially as indicated by the line 22—22 of Fig. 4a;

Fig. 23 is a horizontal section taken substantially as indicated by the line 23—23 of Fig. 22;

Fig. 24 is another horizontal section taken substantially as indicated by the line 24—24 of Fig. 22;

Fig. 25 is a fragmentary vertical sectional view of a portion of Fig. 22, illustrating different positions of certain parts of the turntable;

Fig. 26 is an enlarged end view of a portion of the turntable, taken substantially as indicated by the line 26—26 of Fig. 22;

Fig. 27 is a side elevation, partly in section, illustrating a brake means for the turntable;

Fig. 28 is an enlarged longitudinal vertical section taken substantially as indicated by line 28—28 of Fig. 4a and illustrating the loading mechanism;

Fig. 29 is an enlarged transverse vertical section taken as shown by the line 29—29 of Fig. 28;

Fig. 30 is an enlarged horizontal sectional view taken substantially on the line 30—30 of Fig. 28;

Fig. 31 is a horizontal sectional view through the machine illustrating the driving means, taken substantially as indicated by the line 31—31 of Fig. 1;

Fig. 32 is an elevational view of a portion of the driving means, taken substantially as shown by the line 32—32 of Fig. 31;

Fig. 33 is an elevational view of certain parts of the driving means, taken substantially as indicated by the line 33—33 of Fig. 3;

Fig. 34 is a fragmentary horizontal section taken substantially as indicated by the line 34—34 of Fig. 33;

Fig. 35 is a somewhat simplified diagram of the electric circuit for operating the machine;

Figs. 36 to 43 are views of carton in different conditions during its progress through the machine, Figs. 36 to 39 and 43 being in perspective, and Figs. 40 to 42 in vertical longitudinal section;

Fig. 44 is a schematic plan view of the machine illustrating the several operations performed on cartons passing therethrough; and Fig. 45 is a view showing mainly in elevation a series of cartons in positions and conditions corresponding to those shown in plan in Fig. 44.

Figure 1:
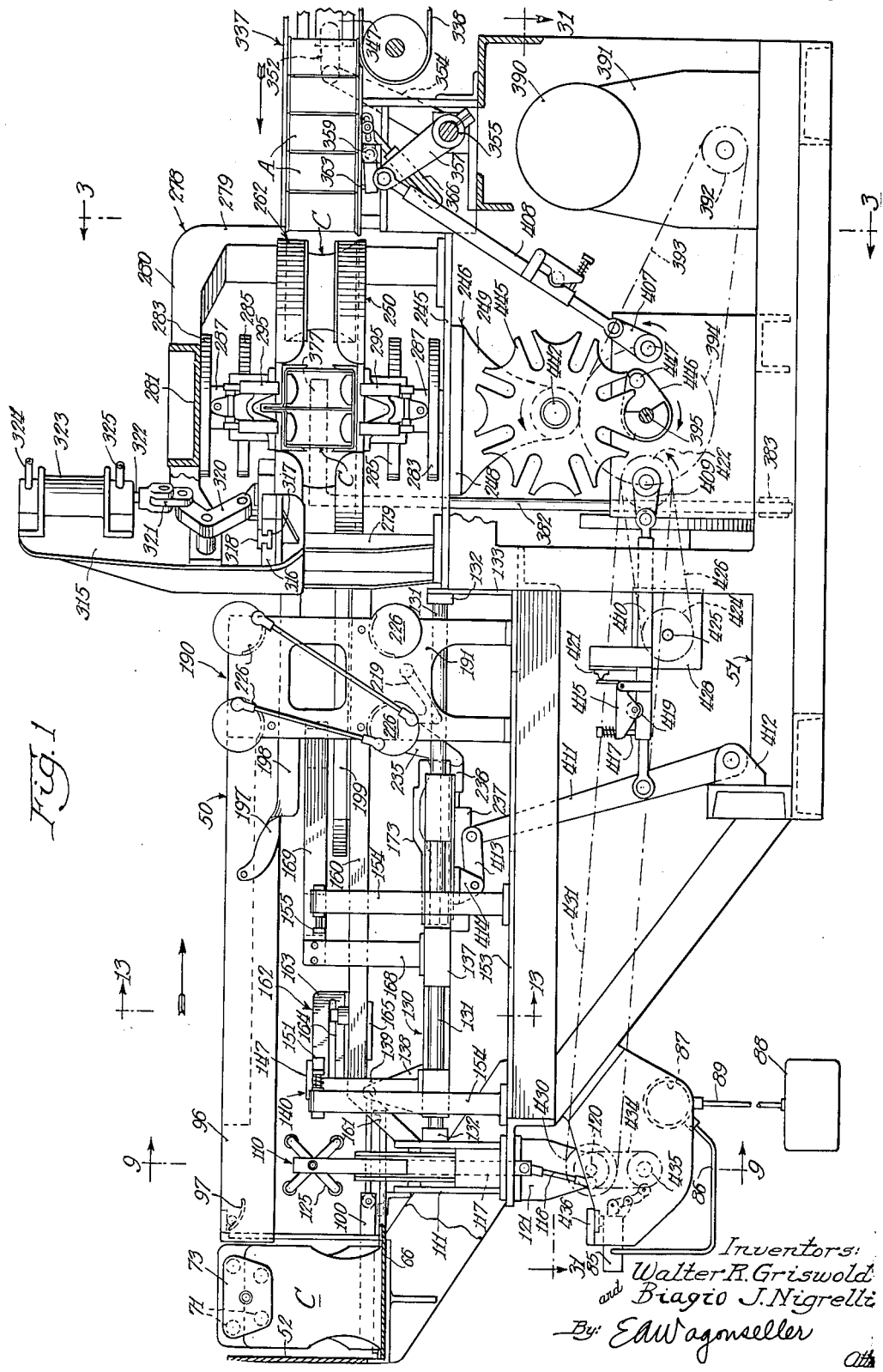
Fig. 1 is an elevation of one side of the machine.

Before proceeding with the description of the machine of this invention, a brief description will be given of a preferred form of carton on which it operates. The carton, designated C and best shown in Figs. 36 to 43, is formed of paperboard, preferably in one piece, and comprises a pair of side walls S with top and bottom walls W connecting the upper and lower edges thereof, the ends being open. The top and bottom walls are each formed of two similar sections hingedly connected to a longitudinal partition P disposed between the side walls, and the top wall is provided with a handle H of two plies between which the upper portion of the partition extends. Adjacent each end of each section of the walls W there is a tongue or tab T struck from the wall and foldable to lie approximately against the inner surface of the wall with its free end extending away from the adjacent wall end. In collapsed condition, as shown in Fig. 36, the bottom wall sections are disposed in surface contact and lie between the lower portions of the side walls S, while the sections of the top wall lie in the planes of the side walls and the plies of the handle H, the partition P lying between the handle plies, the top wall sections, and the upper portions of the side walls. The cartons C are formed, shipped, stored, and fed to the machine in this folded or collapsed condition. In the machine, the cartons are opened to the expanded condition shown in Fig. 37, the tabs T are folded inwardly to the position described above, and the cartons are loaded, and the filled cartons discharged from the machine. It will be seen that the carton can be erected from the collapsed condition of Fig. 36 to the expanded condition of Fig. 37 by swinging of the side walls outwardly and upwardly relative to the partition. Because of the inherent resilience of the paperboard from which the cartons are made, however, the cartons tend to spring back to the collapsed form if merely opened. Accordingly, the carton is "broken" or reversely folded along the fold lines as shown in Fig. 38 so as to loosen the paperboard fibres at the fold lines between the several parts and thus reduce the collapsing tendency. The reverse folding is accomplished merely by continuing the swinging of the side walls relative to the partition so that the bottom wall sections extend substantially in the planes of their attached side walls and the top wall sections lie between the upper portions of the side walls, with the handle between them, the partition lying between the bottom sections and the lower portions of the side walls. The fold lines between the bottom sections and the partition may be pressed to assure substantial removal of tension at these connections. The carton is then returned to the expanded form, which it retains. Thus, the carton is opened to the condition shown in Fig. 37 at one point in the reverse folding to the condition of Fig. 38, after which it is returned to the expanded condition. The tabs T are then folded inwardly out of the planes of the top and bottom walls, as shown in Fig. 39, so that they may readily be folded thereafter to their retaining position in engagement with the end articles of those loaded in the carton and prevent outward movement thereof. In hand loading, this may be accomplished by the articles themselves as they are moved through the open ends of the carton, but in the present case the machine includes mechanical means, indicated in Figs. 40 and 41, for completing the folding of the tabs. The particular construction of the carton need not conform exactly to that shown and described, for the machine may readily be adapted to operation on cartons of this type but so modified from the specific carton disclosed as not to be operated upon properly by the specific embodiment of the machine herein disclosed.

The carton C is primarily adapted for receiving a plurality of cans A of the common cylindrical form with chimes or flanges F at their ends provided by the top and bottom closure seams, and the tabs T have their free ends formed to correspond to the interior surface of these flanges. As will be evident from Figs. 42 and 43, the cans A are inserted in the carton C in two rows, one in each of the longitudinal compartments, with the end cans extending partly out of the open carton ends, and the retaining tabs T abut against the interior surface of the inner portions of the flanges of the end cans to prevent their movement outwardly of the carton. In the present case six cylindrical cans are disposed in the carton, in two rows of three cans each, but the particular shape and number may be varied.

The machine of this invention is designated generally by the reference numeral 50, and comprises a base frame 51 formed of suitable elements, as for example channel or angle members and plate members, welded or otherwise rigidly secured together. The frame 51 supports in progressively arranged relation a carton feeding mechanism, carton expanding mechanism, tab pre-folding mechanism, means for folding the carton tabs and holding the carton in position and condition for loading, can loading mechanism, and loaded carton discharge means, as well as means for moving the cartons step by step from the feeding mechanism to the discharge means including a reciprocable carriage and a turntable, and driving means for operating the various parts of the machine.

Carton feeding mechanism

The mechanism for feeding cartons is best shown in Figs. 2, 4, and 5 to 8 inclusive. A pair of spaced vertical plates 52, 52 are supported to extend transversely of the machine at its rear or carton-receiving end on the frame 51. A hopper 53, formed of a pair of plates bent to provide vertical sides 54 and bottom portions 55, is transversely mounted in inclined position with its lower or delivery end between the plates 52, 52. Cartons C in their flat condition are held in the hopper in substantially vertical position and move toward the delivery end by gravity. The delivery end of the hopper 53 is open except for an upstanding lip 56 on each of the bottom portions 55. A pair of retarder members 58 adapted to rest on the upper edges of the cartons in the hopper are fixed on a shaft 59 rockable in bearings supported on the plates 52. The shaft has a crank 60 fixed on its rear end. A spring 61 is arranged to urge the crank clockwise as viewed in Fig. 5 and thus normally hold the retarder members 58 in position bearing on the upper edges of cartons disposed somewhat spaced from the delivery end of the hopper to prevent the weight of the cartons from forcing the leading carton out of the hopper. Between the retarder members is a bent spring plate 62 having a lower free portion resiliently bearing on the upper edges of the cartons at the delivery end of the hopper, this free portion having a downwardly bent edge 63 which with the lip 56 holds the leading carton in the hopper. The other end of the spring plate is secured to a bar 64 suitably supported above the plates 52. A guide plate 65 extends downwardly at an angle from below the lip 56, terminating in a vertical portion above a horizontal channel guide 66 extending longitudinally of the machine, or in other words transversely of the hopper, and to the right of the delivery end as viewed from the rear of the machine.

A support 67 spaced from the hopper extends between the upper portions of the plates 52 and carries a pair of brackets 68. A transversely extending hollow block 69 is rockably mounted between the brackets by trunnions, and has a closely fitting tubular member 70 slidable therein for reciprocation toward and from the hopper 53. At its end adjacent the hopper, the tubular member 70 carries a plurality of suction cups 71 of rubber or like material on a connection 73 which is bored or otherwise formed to provide communication between the cups and the tubular member. The suction cups 71 are adapted to engage against the leading carton in the hopper upon movement of the tubular member toward the hopper and apply a suction grip thereto to carry it out of the hopper as the tubular member moves in the opposite direction. The opposite end of the tubular member 70 is closed and pivotally connected to an arm 74 having a hub portion fixed on a shaft 75 below the member 70 suitably journaled in the rear plate 52 and rockable by a crank 76. The crank 76 is moved in one direction or the other to rock the shaft 75 by an air cylinder 77 to the piston rod 78 of which the crank is connected by a link 79. A connecting rod 80 links the cranks 60 and 76. The cylinder 77 is mounted on the rear plate 52 to extend transversely of the machine. As the piston rod 78 is moved out of the cylinder the shaft 75 is rotated counterclockwise, as viewed in Fig. 5, to slide the tubular member 70 toward the hopper 53 and bring the suction cups into engagement with the leading carton C, and simultaneously the rock shaft 59 is rotated by the crank 60 to swing the retarding members 58 from the cartons. As the piston rod moves inwardly of the cylinder 77, the suction cups 71 are moved away from the hopper carrying the leading carton with them, and the retarding members are returned to position engaging the cartons, but in the meantime the cartons have advanced a step in the hopper so that the second carton replaces the withdrawn carton at the delivery end of the hopper. The piston is moved by air under pressure supplied to one end or the other of the cylinder by conduits 81 and 82 through a valve 83 which is one of three similar valves 83, 84, and 85 connected by conduits 86 to a pressure chamber or manifold 87 mounted on the base frame 51. Air under pressure is supplied to the manifold 87 by a compressor 88 through a conduit 89. To apply suction to the cups 71, the block 69 is provided with a bore communicating with the interior of the tubular member 70 through a slot 90 therein. The slot in the tubular member is so located and of such length as to afford communication with the bore as the suction cups approach the leading carton in the hopper and during the early portion of the return stroke of the member 70, and during the later portion of the return stroke to cut off the connection and extend out of the block 69 to vent the tubular member to the atmosphere. A conduit 91 extends from the bore to a suitable source of suction, as a suction pump 92. (See Fig. 2.) At least a section of conduit 91 adjacent the block 69 is flexible, to allow for the rocking of the block.

For the purpose of removing the carton carried by the suction cups each of the plates 52 has an inwardly extending stop member 93 secured adjacent its upper edge spaced somewhat from the delivery end of the hopper. The distance between the inner edges of these members is less than the length of the cartons C. The suction cups 71 move between these members toward and from the hopper. As the cups approach the hopper, the slot 90 comes into position to open the member 70 to suction from the conduit 91, and as they move away from the hopper carrying a carton, the slot breaks the suction when the cups and carton reach the stop members, so that the carton drops down onto the channel guide 66. Below the stop members 93, a guide plate 94 extends between the plates 52 with its lower end spaced slightly from the guide plate 65 to define a slot therewith above the channel guide 66, to assure deposition of the carton on the channel guide. The upper portion of the forward plate 52 has a vertical outlet slot 95 extending upwardly from the channel guide, and a pair of parallel strips 96 extend forwardly from the upper part of the slot to the central portion of the machine, receiving the vertically disposed handle portion of the carton between them. The strips have flaring portions extending rearwardly through the slot 95 to guide the carton, and have secured between them above the forward end of the channel guide 66 a curved resilient strip 97.

Pusher mechanism is provided for moving the carton forwardly through the outlet slot. For this purpose a horizontal pusher rod 98 (see Figs. 5 and 7) is mounted for movement below the hopper and normally extends transversely of and has one end projecting over the channel guide 66. The other end of the pusher rod is secured to a pivot block 99 (see Fig. 8) mounted on the lower surface of a slide bar 100 for horizontal swinging movement by a suitable bolt 101 extending through the block into the slide bar. The pusher rod 98 is normally held at right angles to the slide bar 100 by a spring-urged detent 102 disposed in a bore in the bar and engaging in a depression 103 in the block 99. A second depression 104 (see Fig. 6) is provided in the block for engagement by the detent to hold the pusher rod in a position so that it will not contact the edge of the carton, as hereafter explained. The slide bar is T-shaped in cross section, with flanges engaged in an undercut slide groove of a longitudinally extending channel block 105, which may conveniently be built up of a plurality of plates, as is common. The slide bar 100 has pivoted to its forward end a link 106 connecting it to means by which it is reciprocated longitudinally of the machine. Suitably supported on a portion of the base frame 51 forwardly of the forward plate 52 between the planes of the block 105 and the channel guide 66 is a roller 107 mounted on a vertical axis. Pusher rod 98 engages against roller 107 upon forward movement of the bar 100. The rod is forced from its position at right angles to the slide bar 100 against the resistance of the detent 102 and is swung rearwardly to the position indicated in broken lines at the right in Fig. 6. The rod is held in this position by engagement of the detent in the depression 104 in the block 99, as referred to above. The pusher rod remains in such position as it is moved rearwardly by the slide bar until its free end engages a stop 108 projecting forwardly of the rear plate 52 in the horizontal plane of the rod, by which it is returned to its normal pushing position at right angles to the slide bar as the bar moves to its rearmost position, the detent 102 again engaging in the depression 103. It will be seen that as the pusher rod 98 moves forwardly with the slide bar 100, it pushes a carton along the channel guide 66 through the slot 95 forwardly between the parallel strips 96, the rod moving beneath the strips to dispose the rear end of the carton in line with the roller 107 and then being swung rearwardly by the roller as the slide bar continues its forward movement. The pusher rod is then returned by the slide bar to the rear position for moving another carton forwardly. The handle portion of the carton engages the resilient strip 97, so that in rapid operation of the machine 50 the carton will not tilt up on its forward bottom corner.

*Carton expanding mechanism*

Located forwardly of the forward plate 52 is mechanism for unfolding, or more accurately, reversely folding the carton to "break" the scores or fold lines between the several parts thereof. This carton unfolding mechanism, generally designated 110, is best shown in Figs. 9 to 12 inclusive, and is supported by a pair of spaced vertical mounting plates 111 extending transversely of the machine, parallel to the plates 52 but with their upper edges below the plane of the channel guide 66, which extends forwardly to support above plates 111 a carton pushed from the carton feeding mechanism as just described. The plates 111 are preferably spaced apart a distance less than the length of the carton. The plates may be supported on or form a part of the base frame 51, and the rear plate 111 may conveniently serve as the support for the roller 107. A pair of horizontally disposed shafts 112 parallel to the plane of the carton, one on either side thereof, extend between the plates 111 at the upper part thereof, and another pair of shafts 112 are similarly arranged at the lower part in substantially the same vertical planes as the upper shafts. On each of the shafts there is rotatably mounted a gear member 113 having a link member 114 extending radially therefrom. The link members on one side of the carton plane carry a vertically extending swing plate 115 and the other two link members similarly carry another swing plate 115 on the opposite side of the plane of the carton, parallel to the first swing plate. Each swing plate has two vertically spaced pairs of lugs 116 on its inner face, and the upper and lower link members on each side of the carton plane have their free ends pivotally connected to the upper and lower pairs of lugs, respectively, of the adjacent plates 115. The spacing of the pairs of lugs on each plate 115 corresponds to the vertical spacing of the gear members, and the link members are all of the same length, so that rotation of the link members will cause the swing plates 115 to move in vertical position through corresponding but opposed arcs. To effect such movement of the plates 115, a double rack 117 extends vertically between the gear members 113 in mesh therewith and is arranged to be reciprocated vertically by means of a connecting rod 118 extending between its lower end and a crank 119 on a shaft 120 journaled in a suitable hanger member 121 below the mechanism 110. Suitable guide projections may be provided on the inner faces of the plates 111 to hold the rack 117 in vertical position. Extension bars 123 are bolted or otherwise secured to the swing plates 115 projecting above the upper ends thereof to a level above the channel guide 66. Each extension bar carries a branched member 124 at its upper end, each branch of which is provided with a suction cup 125 of rubber or the like adapted to engage against a carton disposed in position above the mounting plates 111 as previously described. In the present case, each member 124 has four branches and four suction cups. The branched members are hollow, with passages in the branches providing communication from the suction cups to tubes 126 projecting through the bars 123 and serving as nipples for connection to conduits 127 extending to a valve 128 connected to conduit 91 and communicating through the valve and conduit 91 with the suction pump 92 (see Fig. 2). Suction may thus be applied to the suction cups 125. The section of each conduit 127 adjacent its connection to the respective branched member 124 is a hose or other flexible tube so as to permit it to follow movements of the carton unfolding mechanism. Between the suction cups and the valve 128, the conduits 127 may be merged into one, since suction is applied to and cut off from both sets of cups simultaneously. Although the diagrammatic representation of the lines or conduits to the tubes 126 shows them of different lengths, they are of course actually of the same length.

When a carton is moved to the position above the mounting plates 111 by the pusher rod 98, it is disposed between the two sets of suction cups 125, which are spaced apart sufficiently to allow free movement of the carton. The cups are brought into engagement with opposite sides of the folded carton by upward movement of the rack 117 to swing the plates 115 downwardly and toward each other, the branched members of course moving correspondingly. As the suction cups engage the carton, suction is applied through the valve 128 and the rack 117 is moved downwardly to move the swing plates 115 in an arc upwardly and outwardly, or away from each other, as indicated by the curved arrows in Fig. 9. The branched members 124 similarly swing away from each other, and unfold or expand the carton by drawing apart the carton side walls by reason of the suction grip applied by the cups 125. The top and bottom wall sections of the carton swing about their connections to the central partition as the side walls in vertical position swing arcuately with the branched members. The engagement of the carton handle between the strips 96 and the equal and opposite actions of the opposed members on the carton side walls prevents any appreciable distortion or undue straining of the carton. The position of the swing plates 115 and the parts carried thereby, upon travel through an arc of substantially 90° from the initial carton-engaging position is indicated in dotted lines in Fig. 9. In this position of the parts, the carton is in fully open or expanded condition, as shown in Fig. 10, in which the position of the parts corresponds to the dotted-line position of Fig. 9. By reference to Figs. 36 and 37, it will be clear that the collapsed carton is engaged by the suction cups at the areas of the side walls indicated by the dotted circles and opened to the condition illustrated in Fig. 37, which corresponds to the open carton position of Fig. 10. Although the carton is now in the expanded condition corresponding to that which it assumes when loaded, it would if released return more or less to its flat folded condition, because of the inherent resilience of the paperboard. To overcome this, the carton is folded reversely of its original folded condition to so strain the material, particularly at the connections of the top wall sections with the side walls and the handle, that the score or hinge lines are broken, to allow the carton to retain a substantially rectangular cross section when set on a level surface. This reverse folding or breaking of the carton fold lines is accomplished by continuing the upward swinging of the side walls by the plates 115 and branched members 124 until the side walls are folded against the top wall sections, these sections being brought against the parallel strips 96 between which the carton handle extends. Fig. 11 illustrates this position of the carton, which it will be noted corresponds to Fig. 38, and shows the positions of the swing plates and suction devices. It will be seen that the two sets of suction cups have moved through arcs of approximately 180° from their full line positions in Fig. 9, the suction grip being maintained throughout this movement. More precisely, the arc of suction cup movement is 172°, but this exact swing is not essential. At this point, the valve 128 operates to cut off suction through the conduits 127 and vent them to the atmosphere, and the carton is released by the suction cups 125, which immediately begin a downward arcuate movement, retracing the path of their upward travel, as the double-faced rack 117 is moved upwardly by the crank 119. The carton, although released by the mechanism 110, is prevented from spreading open by means which clamp and draw it forwardly, as explained below. As the suction cups move downwardly, another carton is pushed by the pusher rod 98 into position to be engaged by the cups and reversely folded as already described.

*Carton advancing carriage and mechanism thereon*

A carton advancing carriage 130, best shown in Figs. 4 and 13 to 17, is disposed forwardly of the forward mounting plate 111 for reciprocation on a pair of horizontal rods 131 extending longitudinally of the machine and supported at their rear ends by sockets 132 on the forward mounting plate 111 and at their forward ends by similar sockets on a vertical plate 133 extending transversely of the machine at the central portion thereof. The carriage comprises a frame of two longitudinal members 134 and transverse members 135, to the bottom edges of which is secured a platform 136. On each side of the carriage, at the ends and center, three slide blocks 137 are secured to the members 134. The blocks are suitably formed to receive the rods 131 extending therethrough and to slide thereon for reciprocation of the carriage 130. Secured on the outer face of the rear block 137 at the left side of the carriage is an upstanding bracket 138 to which is pivoted the forward end of the link 106 of the slide bar 100, which with the pusher rod 98 is thus reciprocated with the carriage. On each of the blocks 137 at the rear of the carriage is an upright 139 extending to a point intermediate the height of the reversely folded carton in the carton expanding mechanism 110, and having its top end provided with a flat portion of substantial area. The uprights support opposed toggle devices 140 operable to clamp between them the reversely folded carton and move it forwardly with the carriage, and release it at a predetermined point. As best shown in Figs. 14 and 15, each toggle device 140 comprises a rearwardly extending link 141 pivotally secured at its forward end to the top of the upright 139 and having a lateral extension 142 at that end projecting outwardly at substantially right angles to the link. The link at its rear end carries a clamping finger 144 extending transversely of the machine and inwardly of the upright, which at its inner end is provided with a pair of parallel horizontal lugs 145 extending rearwardly. A gripping pad 146 of rubber or other material affording good frictional engagement with the carton is bolted or otherwise secured between the lugs. An operating member 147, of elongated generally triangular form, is provided for moving the gripping disk to and from carton-clamping position. The member 147 extends outwardly from the upright, its shortest side extending forwardly from the link 141. The corner of the member 147 adjacent the link is pivotally connected to the free end of the link extension 142. A pair of parallel links 148 are pivotally connected at one end to the member 147 at an inward projection of its short side just forwardly of the link 141 and at the other end to the forward portion of the top of upright 139. A pair of pins 149, one on the top of the upright and the other at the central portion of member 147, project upwardly above the links and pivots, and a tension spring 150 extends between the pins. The operating member carries a horizontal roller 151 at its outer end. When the member 147 is swung forwardly, the non-parallel linkage provided by the links 141 and 148 swings the clamping finger 144 inwardly to carton-clamping position, as shown in full lines in Fig. 15. When the member 147 is swung rearwardly, the toggle finger is rotated rearwardly to retracted position clear of the surface of the carton, as shown in dotted lines. The springs 150 aid in moving the linkage past dead center in either direction, and hold the clamping fingers in their clamping or retracted positions, as the case may be. Below the carriage 130 is a horizontal platform portion 153 of the base frame 51, and mounted on this platform portion are four standards 154 which extend upwardly into the plane of the operating members 147 and are arranged to be engaged by the members 147 to cause the toggle fingers to be moved to or from their clamping position as the carriage 130 is reciprocated. At their upper ends, the standards 154 carry bumpers 155 (see Fig. 4) against which the rollers 151 of the toggle devices 140 may engage as the carriage 130 moves back and forth. The bumpers of at least the rear standards are preferably mounted in a manner to yield somewhat, and are provided with suitable springs 156 giving the desired resilience. Two of the standards 154 are located just forwardly of the forward mounting plate 111, one on each side of the carriage, and the other two are spaced forwardly thereof a distance greater than the length of the carton C. One of these forward standards may conveniently be secured on a support 157 mounted on the platform portion 153 and more fully described hereinafter.

Above the carriage and below the longitudinally extending parallel strips 96 is a horizontal platform 160 (see Figs. 1, 4 and 13) extending forwardly from adjacent the expanding mechanism 110 toward the central portion of the machine 50, and supported at its rear end by braces 161 (see Fig. 1) extending upwardly from the forward mounting plate 111 and at its forward end by means to be later described. The platform 160 is disposed at a level substantially corresponding to that of the lower edge of the reversely folded carton in the expanding mechanism. At its rear end, the platform 160 has secured thereto a creaser 162 comprising a pair of parallel vertical plates 163 substantially aligned with the plates 96 and having horizontal bottom flanges for mounting on the platform. The rear ends of the creaser plates may be suitably flared for readily receiving a carton moving forwardly from the mechanism 110. As the carriage moves rearwardly, the fingers 144 are in their retracted or separated position, and are brought into their clamping position by engagement of the rollers 151 against the bumpers 155 of the rear standards 154 to swing the operating members forwardly as the fingers pass rearwardly of the forward edge of the carton in the expanding mechanism 110. The fingers thus clamp the carton between them. This occurs as the carriage reaches its rearmost position, and just before the carton is released by the suction cups 125, so that as the carriage then moves forwardly, the carton in its reversely folded condition is drawn by the fingers 144 onto the platform 160 and into the creaser 162, as will be evident from Figs. 4 and 13. The creaser applies pressure to the hinged connections of the bottom sections of the carton to the central partition so as to reduce the tendency of the paperboard to return to its original position, or in other words the tendency of the bottom sections to spring back to substantially the plane of the partition. The spacing of the creaser plates 163 is somewhat exaggerated in the drawings for clearness. The fingers 144 are thrown to their retracted position, releasing the carton to leave it stationary in the creaser, by engagement of the rollers 151 with the forward bumpers 155, swinging the operating members 147 rearwardly as the carton reaches a position in which its forward edge is substantially even with the forward ends of the creaser plates 163. The toggle devices, of course, are arranged above the level of the top edges of the plates 163.

One of the plates 163 has a horizontal slot 164 therein extending rearwardly from near its forward edge, and a suitable electric switch 165 is mounted on the platform outwardly of the slotted plate. The switch is arranged to stop the machine when it is open, as hereafter explained, and has a pivotally mounted finger 166 which extends through the slot 164 into the creaser. The finger is biased to swing inwardly and rearwardly for opening the switch, but when a carton is disposed in the creaser it engages the finger 166 and holds it against switch-opening movement, so that the switch 165 is maintained closed and does not interrupt operation of the machine. Thus, if for any reason a carton is not properly positioned in the creaser, the finger 166 swings to the switch-opening position and the machine is stopped as a safety precaution and a signal to the operator that the carton being advanced is not in proper condition.

A carton in the creaser 162 is pushed forwardly from between the creaser plates 163 by a following carton drawn from the expanding mechanism 110 by the toggle devices 140 as already described. The carton will assume its final expanded condition, illustrated in Fig. 37, as it emerges from the creaser, its bottom sections dropping flat against the platform 160. The expanded carton remains in this position just forwardly of the creaser during return movement of the carriage, and is then advanced to a position spaced from the creaser by the length of a carton as the following carton is pushed out of the creaser by the next carton drawn forwardly from the mechanism 110. Each carton as it is moved from the mechanism 110 into the creaser thus pushes two cartons ahead of it.

Mounted on the slide blocks 137 at the center of the carriage 130 is a pair of uprights 168 (see Figs. 1 and 14) one at each side of the carriage, to the tops of which are secured the rear ends of horizontal arms 169 which project forwardly of the front end of the carriage. Two pairs of pusher fingers 170 are carried by the arms, one pair at the forward ends thereof and the other adjacent the uprights. The pusher fingers are forked at their forward or pushing ends, which are spaced inwardly of the respective arms 169 on which they are mounted, and their rear portions extend at an angle outwardly toward the arms. The fingers 170 may conveniently be mounted on the arms by means of triangular blocks 171 secured on the inner faces of the arms 169. The pairs of pusher fingers are spaced apart longitudinally of the arms a distance substantially equal to the length of the cartons C, and the fingers of each pair at their forward ends are spaced apart transversely a distance less than the width of the expanded cartons. The fingers thus project over the sides of the platform 160 and are adapted to engage with the rear ends of expanded cartons on the platform and push them forwardly upon forward movement of the carriage, and to slip past the cartons without moving them upon rearward movement of the carriage. The rear pair of fingers 170 is so located that in the rearmost position of the carriage their forward ends are substantially a carton length forward of the forward end of the creaser 162, and thus adjacent the rear end of the expanded carton disposed a carton length forwardly of the creaser. The rear fingers upon forward movement engage with the rear edges of the side walls of this carton to advance it along platform 160 into a mechanism, hereinafter described, for folding the can-retaining tabs out of the planes of the top and bottom walls, and the forward pusher fingers 170 engage a carton in this mechanism to move it forwardly therefrom.

A cam 173 (see Figs. 1, 14, 16, 17, 19 and 20) is mounted on the carriage platform 136 toward one side of the center of the carriage 130 at its forward end, and projects slightly forwardly thereof. This cam is part of the actuating mechanism for folding the can retaining flaps which will be described in detail below. The structure of the cam itself will best be understood by reference to Figs. 16 and 17, from which it will be seen that the cam is of elongated form and open at one side. A horizontal base plate 174, suitably secured on the carriage 130, extends longitudinally of the machine at one side of the center line of the carriage, and a side wall 175 extends upwardly from the inner edge of this base plate. A top wall 176 extends outwardly from the upper portion of the wall 175 over and in spaced relation to the base plate 174. The top wall is suitably formed to have its lower surface at the rear of the cam extend parallel to the upper surface of the base plate to define a channel 177 in which a suitable cam follower may be received. From the forward end of this channel, the lower surface of the top wall extends upwardly and forwardly at an angle to a point more than twice the height of the channel above the base plate, then horizontally, parallel to the upper surface of the base plate, for an appreciable distance, and then at an angle downwardly and forwardly to a point aligned with the top of the channel and adjacent the forward end of the cam. The base plate and top wall are preferably beveled at their forward ends as shown to facilitate entry of a follower into the cam. A divider plate 178 is disposed midway between the base plate and the elevated horizontal portion of the top wall, to provide a pair of vertically spaced channels of substantially the same cross sections as the channel 177, the lower of these channels in effect being a continuation of channel 177. The plate 178 is secured on the side wall 175 by bolts or other suitable means. Its lower surface lies in the plane of the top of channel 177 and its upper surface conforms to the contour of the lower surface of the top wall 176. The rear edge of the divider plate is formed as an arcuately concave groove. A pivoted swing member 180 extends rearwardly from the divider plate, forming in effect an articulated extension thereof. The forward end of the swing member is rounded to fit rotatably in the concave rear end of plate 178, and the rear end of member 180 is beveled to lie against the base plate just forwardly of the channel 177 and allow the swing member to extend parallel to the upwardly and forwardly angled portion of the top wall. An integral pivot stud 181 at the forward end of the swing member projects outwardly through the cam side wall 175, and has a lever 182 fixed on its projecting end. The lever extends forwardly along the outer face of wall 175, and at its forward end has a pin 183 projecting outwardly. A similar pin 184 projects from the side wall above the level of stud 181, and a tension spring 185 extends between the pins to swing the lever 182 upwardly, and thus normally hold the swing member 180 with its rear end on the base plate 174, as shown in full lines in Fig. 16. When the cam 173 moves forwardly with the carriage 130, its open forward end engages a cam follower 220 later described. As the cam moves on, the base plate 174 rides under the follower, and the divider plate 178 and swing member 180 ride over the follower, the swing member pivoting upwardly upon engaging the follower, as indicated by dotted lines in Fig. 16, with its lower surface aligned with the lower face of plate 178.

A recess 186 is formed in the adjacent portion of the top wall to accommodate the rear end of the swing member in this upper position. The channel 177 then moves forwardly about the follower until the cam begins its rearward movement. As soon as the swing member, in forward movement of the cam, clears the follower, it is returned to its normal position by the spring 185, and thus blocks the lower channel below the divider plate and provides with the adjacent parallel surface of the top wall a connecting channel between the channel 177 and the upper channel above the divider plate. On rearward movement of the cam, the channel 177, connecting channel, and upper channel move past the follower, which is raised by the swing member and maintained in the raised position by the divider plate until the cam nears the end of its rearward movement, when the follower is moved downwardly against the base plate 174 by the forward angled portion of the top wall, and the cam rides off the follower, leaving it in position for engagement with the cam upon the next forward movement of the carriage 130. Put another way, the follower on rearward movement relative to the cam rides through the open forward end, under the divider plate and swing member, into channel 177, and on relative forward movement rides upwardly over the swing member and divider plate, and then downwardly and out of the forward end of the cam.

*Tab pre-folding mechanism*

At the forward end of the platform 160 is the tab pre-folding mechanism, generally designated 190, for holding the can-retaining tabs of the cartons out of the planes of the top and bottom walls inwardly of the carton to facilitate their later folding to can-engaging position. The mechanism, as best shown in Figs. 18 to 21, comprises a pair of parallel vertically disposed plates 191, one on each side of the platform just to the rear of the vertical transverse plate 133 (see Fig. 1) and outwardly of the carriage slide rods 131. The plates 191 are secured at their lower ends on the platform portion 153, and are connected at their upper ends by a transverse vertical web member 192 (see Fig. 1), slotted at its center to accommodate the parallel strips 96 which guide the upper edge portion of the carton in its travel. Just below member 192, a horizontal plate 193 (see Fig. 4) extends inwardly from each of the vertical plates 191 to the edges of the slot defined by the strips 96. Another web member 194 (see Fig. 19) connects the plates 191 just below the level of the platform 160, and has a central web portion 195 extending rearwardly from its upper marginal portion. A horizontal plate 196 (see Fig. 19) disposed on the upper edge of the web member 194 and the portion 195 extends between the vertical plates 191, and supports the forward portion of the platform 160, which is narrowed to substantially the width of the carton. Rearwardly of the mechanism 190 is a carton guide assembly, best shown in Figs. 1 and 4, comprising a pair of plates 197 disposed one on each side of the strips 96 at the lower edges thereof. The plates 197 have their rear portions flared upwardly and secured to the strips. The outer sides of the plates 197 are spaced apart the width of the expanded carton, and have flanges 198 depending therefrom. The plates and flanges extend forwardly into and through the tab pre-folding mechanism, supported on the lower surfaces of the plates 193. On the platform 160 are a pair of parallel guide strips 199 in the planes of the flanges 198. The guide strips have flanges at their lower edges for support on the platform 160, and extend with the platform through the mechanism 190, the strips and platform being supported at their forward portions on the plate 196. As will be evident from Fig. 19, the guide assembly corresponds to the expanded carton in cross section. The rear ends of the guide strips 199 and flanges 198 are flared to facilitate entry of a carton into the carton guide assembly. The rear end of the carton guide assembly is spaced forwardly of the creaser between one and two carton lengths, so that the carton engaged by the rear pusher fingers 170 is partially within the guide assembly before it is advanced by the pusher fingers. The carton is moved forwardly into the pre-folding mechanism 190 to the position, as best shown in Fig. 20, with its ends just inwardly of the forward and rear edges of the plates 193 and 196, and is held in expanded rectangular condition by the forward portion of the guide assembly, as evident from Fig. 19.

At the front and rear edges of each of the plates 191 is a split bearing 200 supported on the upper surfaces of the plates 193, and similar bearings are mounted on the lower surface of the horizontal plate 196 in locations corresponding to those of the upper bearings. The edges of the vertical plates 191 are slotted to accommodate and support these bearings. Each of the bearings 200 is formed of a pair of bearing plates suitably formed to journal a pair of parallel shafts 202 and 203, the shaft 202 in each case lying closer to the transverse center line of the mechanism 190. The bearing plates and shafts project inwardly to points adjacent the longitudinal center line of the mechanism. At its inner end each shaft 202 carries a bent tab folder finger 205 (see Fig. 20) which comprises a portion extending radially of the shaft and has an arcuate portion centered on the shaft extending toward the transverse center line of the mechanism 190. The arcuate portion at its free end carries a short transverse bar adapted to engage the carton tab. Each of the shafts 202 at the rear end of the tab folding mechanism has a crank 206 (see Fig. 18) fixed on its outer end. The lower shafts 202 at the forward end of the mechanism have bell cranks 207 fixed on their outer ends, the central portion of the crank being secured on the shaft and the arms extending rearwardly. The upper shafts 202 at the forward end of the mechanism similarly carry bell cranks 208 on their outer ends, but in this case the arms of the cranks extend forwardly. The free ends of the cranks 206 on the lower and upper shafts 202 at the rear of the mechanism are connected to the lower arms of the bell cranks 207 and 208, respectively, by suitable links 209, and the upper arms of the cranks 207 and 208 are connected by links 210. It is apparent that if one of the shafts 202 at one side of the mechanism is rocked, the others on that side will also rotate, and further that if the aligned lower rear shafts 202 are rotated clockwise, as viewed in Fig. 18, the lower forward shafts will rotate counterclockwise, the upper forward shafts clockwise, and the upper rear shafts counterclockwise, the rotation in each case swinging the tab folder fingers correspondingly. The fingers 205 are located so as to swing against the tabs of the carton positioned as shown, and the plates 193 and 196 are formed with apertures 211 immediately above or below, as the case may be, the locations of the tabs, and the platform 160 and guide plates 197 have corresponding apertures, to permit the fingers to swing therethrough against the tabs. A radial lug 212 on a hub 213 is fixed on each of the lower rear shafts 202 inwardly of the adjacent vertical plate 191, the lug extending rearwardly. The bearing plates journaling these shafts are formed with recesses in their forward edges, as shown in Fig. 21, and the plate 196 is correspondingly apertured, to accommodate the lugs 212, the ends of the hubs 213 engaging the sides of the recesses. Each of the lugs 212 has a depending link 214 pivotally connected to its free end. A transversely extending rock shaft 215 disposed directly below the lower shafts 202 at the rear end of the mechanism is suitably journaled in the vertical plates 191. Rearwardly extending cranks 216 are clamped or otherwise secured on the shaft 215 in the vertical planes of the lugs 212, with their free ends pivotally connected to the links 214. Another crank 216 is secured on the shaft 215 intermediate those linked to the lugs, and has a pair of links 217 pivotally connected to its free end and depending therefrom. Secured on the lower transverse web member 194 is a bracket 218 having a pair of lugs between which there is pivoted the end of one arm of a bell crank 219 the other arm of which is pivotally connected to the lower ends of the links 217. The arm pivoted on the bracket 218 is relatively long and extends at an angle downwardly and rearwardly into the plane of the carriage cam 173, while the other arm is relatively short and extends upwardly from its juncture with the longer arm. At the angle of the bell crank 219 there is provided roller 220 previously referred to which serves as the follower for the cam 173. On forward movement of the carriage 130, the cam moves forwardly along the roller without changing its position, and on rearward movement raises the roller, as explained above. The bell crank 219 is thus swung upwardly from its normal position, shown by broken lines in Fig. 20, to the full line position, moving the links 217 upwardly to swing the intermediate crank 216 upwardly and thus rotate the rock shaft 215 clockwise, as viewed in Fig. 20. This clockwise rocking of the shaft 215 is transmitted to the two lower rear shafts 202 through the other cranks 216, links 214, and lugs 212, and the clockwise rotation of these shafts 202 causes rocking of the other shafts 202 in the manner and through the linkage already described. The tab folder fingers 205 thus swing inwardly of the top and bottom walls of the carton to fold the tabs on their hinge lines, the tabs swinging substantially 135°. Although the tabs when released by the fingers tend to return to their original positions, they remain displaced from the planes of the walls from which they are formed, and thus are in position to be later engaged by other means and folded to can-engaging position. The tabs are released by return of the fingers 205 to inoperative position as the roller 220 is returned to its lower position by the cam, the bell crank 219 being returned to its normal position and reversing the action of the rock shaft 215 and the shafts 202 through the linkages described.

The top and bottom walls of the carton would in many cases yield or tend to move with the tabs, so that the tabs would not fold properly on their hinge lines, if means were not provided to prevent this by holding the wall portions adjacent the tabs against such yielding. For this purpose, each of the shafts 203 has fixed on its inner end a generally L-shaped holding member 221, one arm of which is secured at one end to the shaft, and the other arm of which has an extension at its free end which carries a substantially flat strip 222 arranged parallel to that arm. Each holding member is aligned longitudinally with the adjacent folder finger 205. In normal inoperative position, as shown in Fig. 18, the holding members 221 on the upper and lower shafts 203 are disposed above the plates 193 and below the plate 196, respectively, with the strips 222 extending outwardly of the adjacent ends of the mechanism 190. Rotation of the upper rear and lower forward shafts 203 clockwise, and of the other shafts 203 counterclockwise, as viewed in Fig. 18, through substantially 180°, correspondingly swings the holding members so that the strips 222 engage against the inner surfaces of the top and bottom walls and clamp or hold them against the guide plates 197 and platform 160. This position of two of the lower holding members 221 is illustrated in Fig. 20. The holding member arm secured to shaft 203 is of such length as to space the other arm a sufficient distance from the plate 197 or platform 160, as the case may be, not to interfere with the movement of the adjacent folder finger 205, and the other arm is of sufficient length to dispose the strip 222 inwardly of the tab hinge or fold line. In their swinging movement to the wall-holding position, the members 221 of course move through the open ends of the carton. The platform 160 and guide plates 197 are formed with apertures 223 and the plates 193 and 196 have recesses 224 formed in their front and rear edges to permit such swinging of the holding members. Rotation or rocking of the shafts 203 to move the holding members 221 to and from the holding position is effected through pinions 225 fixed on their outer ends, which mesh with sectorial gears 226, of which one is provided for each shaft and pinion. The two lower forward and the four upper gears 226 are secured on the outer ends of shafts 228 which extend transversely of the plates 191 and are journaled in suitable bearings 229 supported by the plates. The two lower rear sectorial gears are secured on the outer ends of a rock shaft 230 extending transversely of the vertical plates 191 rearwardly of the rock shaft 215 and journaled in pillow blocks 231 mounted in recesses formed in the rear edges of the plates 191 and the rearwardly extending web portion 195. Each of the lower rear sectorial gears has pivoted on its inner face one end of a link 232 the other end of which is pivotally connected to the lower forward gear 226 on the same side of the mechanism 190. A similar but longer link 233 is pivotally connected to the outer faces of the lower rear gear and the upper forward gear, and another link 234 is pivoted at its ends to the outer faces of the upper and lower rear gears 226, on each side of the mechanism. The connections of the links 233 and 234 to the lower rear sectorial gears are at diametrically opposite portions thereof. As is apparent from Fig. 18, in which the gear and linkage arrangement at one side of the mechanism is clearly illustrated, the connections of the lower rear gears 226 to the others are such that the upper forward gears will be rotated in the same direction, while the upper rear and lower forward gears will be rotated in the opposite direction, when the lower rear gears are turned by rocking of the shaft 230. To effect rotation of the rock shaft 230, one of the lower rear sectorial gears is provided with a radial crank extension 235 which extends toward the platform portion 153. Rearwardly of this gear is a support 157 (see Figs. 4 and 13) hereinbefore mentioned on which one of the forward standards 154 is mounted. The support is of generally rectangular tubular form, and within it is mounted an air cylinder 237 having a piston rod 238 projecting forwardly and pivotally connected to the crank extension 235 by a suitable stud or like member. Projection and retraction of the piston rod 238 is effected by admission of compressed air from the manifold 87 to one end or the other of the cylinder 237 through one or the other of conduits 239 and 240 (see Fig. 2) connected to the valve 85. This valve is operable to cause the piston rod to be projected forwardly to swing the crank extension 235 at the same time that the roller 220 is moved upwardly in the cam 173 to effect the tab folding movement of the fingers 205, so that as the fingers move into engagement with the tabs, the holding members 221 are brought into the wall-holding position described. This movement of the members 221 results from the fact that the crank extension 235 and the lower rear gears 226 are rotated counterclockwise, as viewed in Fig. 18, by forward movement of the piston rod 238, causing clockwise rotation of the pinions 225 meshed therewith and of the lower rear shafts 203 carrying the pinions, and the holding members 221 mounted on those shafts are swung clockwise to the position shown in Fig. 20. The upper forward sectorial gears 226 are rotated in the same direction as the lower rear gears, by means of the links 233, so that the upper rear forward holding members are rotated clockwise to their positions engaging the lower surface of the top wall of the carton. The lower forward and upper rear sectorial gears are simultaneously rotated clockwise to cause counterclockwise rotation of the shafts 203 associated therewith to similarly bring the holding members on those shafts into the holding position. It may be noted that the sectorial gears 226 are considerably larger than the pinions 225, so that the substantially 180° rotation of the shafts 203 is effected by a relatively slight rocking movement of the gears 226, and the relatively short and rectilinear movement of the piston rod 238 can be employed to impart such rocking movement to the sectorial gears. Reverse movement of the holding members 221 and the other parts is effected by rearward movement of the piston rod, the valve 85 being operable to cause such movement when the breaker fingers 205 release the tabs and return to their normal positions, or in other words when the roller 220 is returned to its lowermost position. As already explained, this occurs as the carriage approaches its rearmost position, and on the next forward movement of the carriage, the forward pusher fingers 170 engage the rear edges of the side walls of the carton in the tab pre-folding mechanism 190 and move it forwardly off the platform 160, while at the same time the rear pusher fingers move another carton into the mechanism 190. Fig. 39 shows the carton with the tabs folded, in the condition in which it leaves the tab pre-folding mechanism 190.

*Turntable and mechanism thereon*

Figure 22:
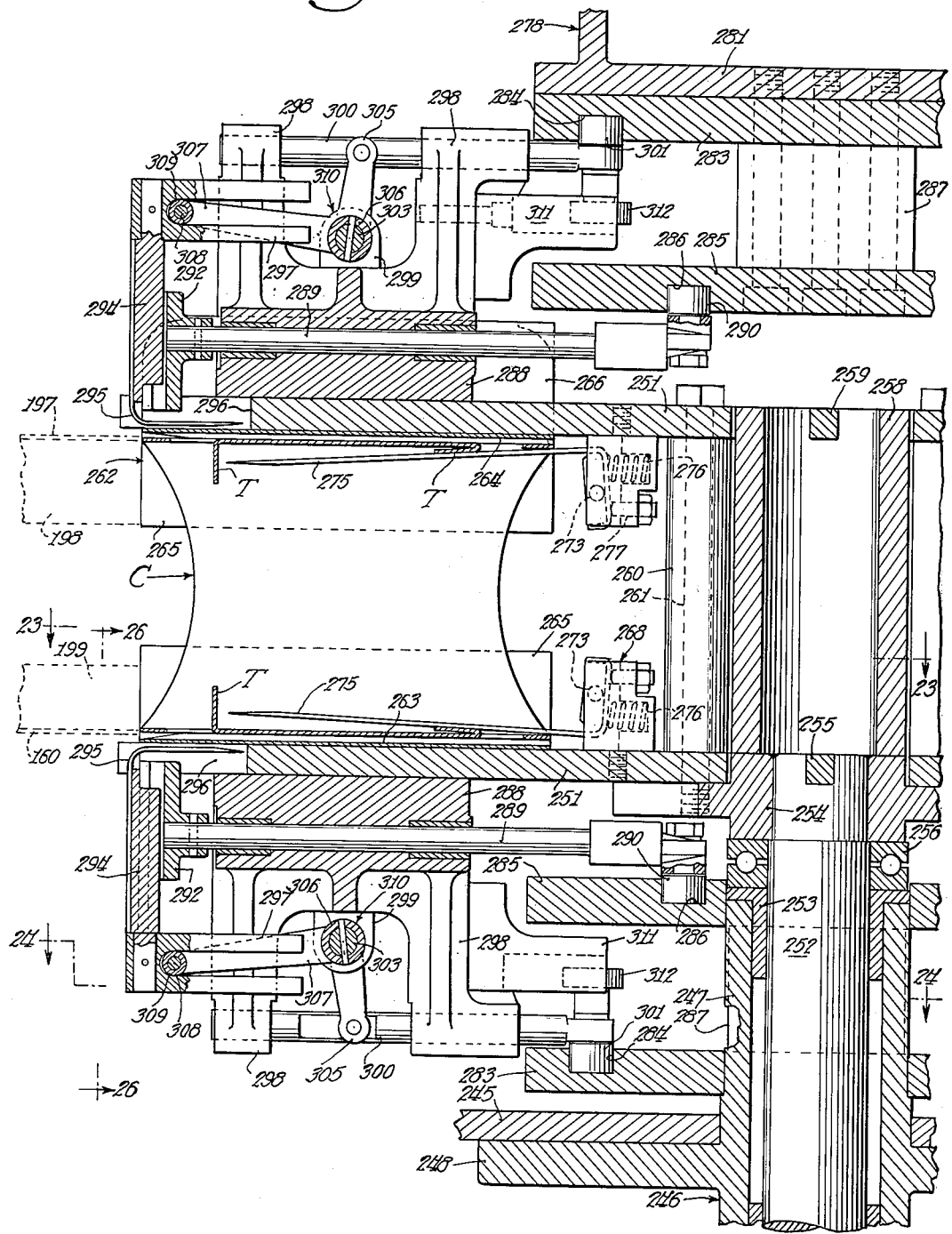

Extending forwardly from the vertical plate 133 is a horizontal platform portion 245 of the base frame 51 similar to but preferably somewhat higher than the platform portion 153, as best seen in Figs. 1 and 3. A shaft support unit generally designated 246 is mounted on the platform portion 245. The unit 246 comprises a vertical shaft housing 247 extending through an aperture in the platform portion 245 and having a wide, circular plate or flange 248 secured to the under side of the platform portion. A pair of aligned hangers 249 depend from the flange, extending below the lower end of the housing 247. Above the platform portion 245, just forwardly of the tab pre-folding mechanism 190, is a turret or turntable 250 (see Figs. 1, 3, 4a and 22 to 27), which comprises a pair of vertically spaced, horizontal, centrally apertured disks 251. The turntable is secured on the upper end of a vertical shaft 252 for rotation therewith, as best shown in Fig. 22, the shaft 252 being disposed in the shaft housing 247. The upper end of the housing terminates below the upper end of the shaft, and has suitable sleeve bearings 253 or the like for the shaft. The upper end of the shaft is reduced and has disposed thereon a hub or spider 254 comprising a hollow central portion, the lower edge of which engages on the shoulder of the shaft provided by the reduction of the end, and four radial arms extending horizontally under the lower disk 251. A key 255 engages in a diametral key-seat in the end of the shaft 252 and extends through slots in the central portion of the spider 254 into recesses in the disk to secure the disk and spider for rotation with the shaft. (See Fig. 23.) Screws or the like may be used to secure the key against displacement. The spider may additionally be welded or otherwise secured to the shaft. Between the central portion of the spider and the upper end of the shaft housing 247 there is disposed a suitable thrust bearing, such as the ball bearing 256 illustrated. Secured on the upper end of the central portion of the spider is a hollow post 258 the upper end of which is substantially flush with the upper surface of the upper disk 251. A key 259 extends through notches in the upper post edge to engage with the upper disk to secure the disk and post for rotational movement together. Four spacers 260, one disposed above each of the radial arms of the spider 254, extend between the upper and lower disks 251, and bolts 261 are disposed extending through the disks and spacers into the spider arms to secure the disks in spaced parallel relation and also in fixed relation to the spider for rotation therewith. The disks 251 are spaced apart a distance slightly greater than the height of the expanded carton excluding the handle, with the lower disk just below the level of the platform 160 and the upper disk just above the level of the guide plates 197, and the turntable is so arranged relative to the mechanism 190 that the forward edges of the platform and guide plates extend slightly within the peripheries of the disks, as shown in Figs. 18 and 22. The axis of shaft 252 lies in the vertical longitudinal plane of the machine 50 which bisects the mechanism 190.

Each of four radially extending compartments 262, spaced 90° apart, is formed in the turntable by a lower plate 263 and a pair of upper plates 264. The plate 263, of the same length and width as the carton, is secured on the lower disk 251, and has upwardly extending flanges 265 at its side edges. The plate has a pair of longitudinal depressions (see Fig. 26) between relatively raised portions at its center and sides. Each of the upper plates 264 is slightly less than half the width of plate 263, and has a depression similar to one of the depressions of the lower plate. The upper plates are secured on the lower face of the upper disk in inverted relation above the plate 263, with their adjacent edges disposed at opposite sides of a radial slot formed in the disk. Each plate 264 has a flange 265 depending from its outer edge in the plane of a lower flange 265, and on its inner edge has a flange 266 extending upwardly through the slot in the disk. The upper and lower plates and their flanges 265 are located in planes respectively corresponding to those of the guide plates 197, platform 160, flanges 198, and guide strips 199, while the flanges 266 correspond to the strips 96, so that each compartment 262 may be considered a separated extension of the guide assembly of mechanism 190. The inner ends of the compartments are appreciably spaced from the center of the turntable, and the outer ends of the plates and flanges are flared to facilitate reception of cartons in the compartments. As appears best from Figs. 4a, 18, and 22, the turntable 250 is rotatable to position a compartment in registry or alignment with the forward end of the guide assembly of the mechanism 190, so that when the forward pusher fingers 170 move the expanded carton out of mechanism 190, it moves into the compartment 262. The top and bottom walls of a carton in a compartment 262 bridge the depressions of plates 263 and 264, and thus may be stretched or deflected into the depressions.

A bracket 268 is secured on each of the disks 251 inwardly of the inner end of each compartment, each bracket comprising a plate 269 perpendicular to the adjacent disk and extending transversely of the central radial plane of the compartment. The plate has extending outwardly therefrom a central block portion 270 and flanges 271 at its ends. This forms a pair of recesses 272 each centered on a line extending longitudinally of the adjacent compartment 262 and spaced substantially one-fourth the width of a carton inwardly of the adjacent flange 265, the recesses thus being aligned with the tabs of the top and bottom wall sections of a carton disposed in the compartment. A hinge pin 273 mounted in the block portion 270 extends across the recesses. Inner tab-folding and holding elements 275 of flat blade form extend from the recesses 273 outwardly into the compartment in closely spaced relation to the plates 263 and 264, each blade having its inner portion bent away from the adjacent disk 251 and pivoted on the pin 273. The outer end of each blade lies inwardly of the outer end of the compartment, close to the hinge line of a rear or outer tab of a carton placed in the compartment. A spring 276 seated in the plate 269 bears on the bent inner portion of each blade 275 between the hinge pin 273 and adjacent disk 251 to normally swing the blade so that the outer end thereof is spaced somewhat farther from the adjacent disk than the inner end. The blade extends at a slight angle to the disk and plates 263 and 264. An adjustable stop member 277, in the form of a machine screw, extends through the plate 269 to engage the free end of the bent blade portion and determine the angle of the blade. As each compartment 262 is brought into alignment with the forward end of the mechanism 190 and a carton is pushed into it, the forward or inner tabs of the carton engage against the ends of the blades 275 and are folded thereby against the top and bottom carton walls, which move between the blades and the plates 263 and 264. When the carton reaches its position in the compartment, as shown in Fig. 22, the forward or inner tabs lie folded between the blades and the top and bottom carton walls, while the rear tabs extend out of the planes of their walls just outwardly of the outer ends of the blades. Fig. 40 clearly shows the condition of the carton at this stage.

Means are also provided for folding and holding the rear or outer tabs against their walls, and will now be described. As best shown in Figs. 3 and 4a, a supporting frame or bridge structure 278 is provided over the turntable 250. Four vertical frame members 279 extend upwardly from the platform portion 245 to a point above the upper disk of the turntable. The frame members are located outwardly of the disk edges and are suitably spaced about the turntable so as not to interfere with the operation of the machine. From the upper ends of frame members 279, horizontal members 280 extend inwardly over the turntable to the upstanding circular flange of a horizontal support plate 281 centered over the turntable. As best seen in Fig. 22, there is secured to the lower face of the plate 281 a cam plate 283 with a cam groove 284 (see Figs. 22 and 24) formed in its lower face, and secured in spaced relation below the cam plate 283 and above the upper disk 251 is another cam plate 285 with a cam groove 286 (see Figs. 22 and 23) in the lower face thereof. A pair of spacers 287 each comprising a suitable block is disposed between the cam plates 283 and 285, and a plurality of bolts extend through the cam plates and spacers into the support plate to hold the cam plates in position. Similar cam plates 283 and 285 are disposed below the lower disk 251, but in reversed or inverted relation as compared to the upper cam plates, the respective grooves 284 and 286 being formed in the upper faces thereof, and the lower plate 285 being spaced above the lower plate 283. The lower cam plates are centrally apertured and secured on the shaft housing 248, and are assembled in spaced relation by a pair of spacers 287 similar to the upper spacers.

At each compartment, the turntable is provided with a pair of blocks 288, one on the upper surface of the upper disk and the other on the lower surface of the lower disk. Each block has a pair of parallel radially extending bores therethrough in which are slidably received a pair of parallel rods 289 the inner ends of which extend between the cam plate 285 and disk 251 and are rigidly connected by a yoke carrying a roller 290 engaged in the cam groove 286. On the outer end of each slide rod 289 is fixed a block 292 having an undercut recess in its outer face providing a vertical slide groove. The blocks 292 of each pair of rods are rigidly connected by a web member 293. A slide member 294 works in each of the blocks 292, and on its end adjacent the disk 251 carries an outwardly disposed tab folding and holding blade 295 which extends inwardly. Each outer blade 295 is aligned longitudinally with one of the inner blades 275, and has a length greater than the distance from the edge of the disk to the outer end of the inner blade 275. The blades 295 are normally disposed at the levels of the disks 251, which are provided with suitable recesses 296 in their edges to accommodate the blades. To the ends of the slide members 294 remote from the disks 251 are secured parallel horizontal slotted pieces 297 which extend inwardly of the disks and have a length greater than that of the holding blades 295. Each of the blocks 288 has radially aligned hangers 298 extending perpendicularly therefrom at its inner and outer ends, and a bearing bracket 299 at each side thereof intermediate the hangers extending perpendicularly a smaller distance than the hangers. A radially extending rod 300 is slidably mounted in the hangers, which on its inner end carries a cam roller 301 engaged in the groove 284 of the cam plate 283. Journaled in the brackets 299 is a rock shaft 303 extending transversely of the rod 300. Fixed on the shaft 303 centrally thereof is a hub portion 304 of a lever arm 305 extending to one side of the rod 300 and pivotally secured thereto, and fixed on the rock shaft at each side of the hub portion 304 are a pair of hub parts 306 each with an arm 307 extending outwardly between the slotted pieces 297. A transverse bar 308 extends through the outer ends of the arms 307 and into the slots of the slotted pieces, and on its ends carries rollers 309 working in the slots. It will be seen that the rock shaft 303 and the parts associated therewith as just described form a bell crank, which for convenience may be generally designated by the numeral 310. To guard against deflection, side play, or binding of the rod 300 and assure proper longitudinal movement in the hangers 298, there is secured on the inner face of the inner hanger a channel bracket 311 (see Fig. 22) formed with a radially extending roller channel which receives a guide roller 312 mounted on the inner end of the rod 300 in coaxial relation with the roller 301.

Before describing the operation of the cam-actuated blades 295, the shape and arrangement of the cam grooves 284 and 286 will be briefly explained. As is evident from Figs. 23 and 24, all the grooves are concentric with the shaft 252, so that their centers lie in the vertical plane bisecting the tab folding mechanism 190 longitudinally and passing through the axis of the shaft, as previously described. Each of the cam grooves 284 is generally circular, being formed of two substantially semicircular portions. These semicircular portions have different radii, so that their adjacent ends are radially offset. The ends of these two portions are spaced circumferentially to permit their connection by short offset groove portions without too sharp a curvature. The semicircular groove portion of larger radius lies entirely forward of a transverse vertical plane normal to the above-defined longitudinal plane and passing through the groove center. The smaller semicircular portion lies mainly to the rear of the transverse plane, but extends clockwise from the longitudinal plane somewhat more than 90°. One of the offset portions is spaced substantially 90° clockwise from the intersection of the longitudinal plane with the larger semicircular portion, so that it is intersected by the transverse or normal plane. The other offset portion is spaced more than 90° clockwise from the intersection of the semicircular portion of smaller radius with the longitudinal plane, or in other words is located forwardly of the transverse plane, at the end of the smaller semicircular portion which extends past the transverse plane. The semicircular portion of larger radius, which it will be evident has an extent appreciably less than 180°, has a part thereof just clockwise of the longitudinal plane which is curved slightly inwardly. Each of the cam grooves 286 is of regular, generally elliptical shape, with its shorter axis in the vertical plane bisecting the mechanism 190 longitudinally, and its longer axis at right angles thereto, the groove of course being concentric with shaft 252. The central portions of the longer sides of the groove are arcuate, and also the portions closest to the center, so that when a roller 290 is positioned in one of these portions, as when a compartment is disposed opposite the forward end of the tab folding mechanism 190, the associated slide rods 289 are at their innermost positions. When a roller is at a portion of the groove at one end of the long axis, that is at one of the groove portions farthest from the center, as by rotation of a compartment 90° from its position opposite the mechanism 190, the slide rods are projected to their outermost positions.

After a carton C has been moved by the forward pusher fingers 170 from the mechanism 190 into what for convenience will be designated the first compartment 262, as previously described, the turntable 250 is rotated a quarter turn counterclockwise as viewed in Fig. 23. Each cam roller 290 associated with this compartment is moved outwardly as it travels along the related groove 286 to one of the portions farthest from the center, sliding the rods 290 outwardly to move the holding blades 295 out of the recesses 296 and position them outwardly of the disk 251, as shown in full lines in Fig. 25. At the same time, each of the cam rollers 301 associated with the compartment follows its respective cam groove 284, but has no radial movement and therefore does not impart any movement to its slide rod 300 until nearly the end of the quarter turn of the turntable, when it engages in the offset portion described above as intersected by the second or transverse plane, and moves outwardly a distance equal to about half the difference of the radii of the two main portions of the groove 284. This causes a corresponding outward movement of the slide rod 300 to swing the bell crank 310 so as to push the slotted pieces toward the adjacent disk 251, moving the slide members 294 in the blocks 293 and moving the holding blades 295 vertically inwardly of the disk as the turntable is brought to a stop. Upon another quarter turn of the turntable, the roller 301 at once moves further outwardly to engage in the groove portion of greater radius, effecting movement of the blades 295 vertically inwardly of the outer ends of the blades 275 and holding the blades 295 in this plane throughout most of the 90° rotation of the turntable. At the beginning of the movement just referred to the blades will be in the position shown in full lines in Fig. 41. Just before the turntable comes to a stop, however, the roller 301 is moved radially inward a slight distance by the radially inwardly curved portion 284a of the groove 284, moving the blades 295 back toward the disk. During the second quarter turn, while the blades 295 are being moved vertically inwardly of the blades 275, the roller 291 is moved inwardly because it moves to the other end of the short axis of the groove 286, or in other words closer to the center, and draws the blocks 292, and therefore the blades 295, inwardly. This inward movement of the blades 295 occurs when they are in their vertically innermost position, so that they engage the rear or outer tabs T and fold them over the ends of the blades 275. At the same time, the inner ends of the blades 295 move past the outer ends of the blades 275. This position of blades 295 is shown in dotted lines in Figs. 25 and 41. Then occurs the vertically outward movement of the blades 295 which has already been described, as a result of which the blades 275 are moved so that their outer free end portions are brought against the adjacent wall of the carton, the outer tabs are disposed flat against the blades 275, and the blades 295 overlie the outer tabs and outer ends of blades 275. Fig. 42 shows the parts in this condition, in which the carton is loaded with cans pushed thereinto, as illustrated. It is during the pause of the turntable at the end of the second quarter turn that the cans are loaded into the carton, as explained more fully below.

On a third quarter turn of the turntable 250, the blades 295 are moved vertically inwardly as the roller 301 moves from the inwardly curved section of the groove 284, then they are moved radially outwardly by movement of the can roller 291 to the other end of the long axis of groove 286, and moved vertically outwardly back to the full line position of Fig. 25 as the roller 301 passes through the other offset portion of groove 284 from the larger semicircular portion to the smaller. The blades are thus in the plane of the disk 251 outwardly of the recesses 296, and remain in this plane as the turntable makes the last 90° turn to bring the first compartment back to its starting point at the mechanism 190, since the roller 301, in following the corresponding portion of groove 284, merely swings arcuately around the center. The roller 291, however, is moved inwardly by the groove 286, and the blades 295 are thereby drawn into the recesses 296. The compartment is thus carried through a full revolution of the turntable in four steps, and returned to the starting point prepared to receive another carton and repeat the operation.

Indexing means are provided to assure exact alignment or registration of the turntable compartments with the mechanism 190 and other structure later described at the completion of each quarter turn of the turntable. These means are best shown in Figs. 1, 3, and 4a. On one of the frame members 279 is secured a vertically extending support 315 which carries a horizontally disposed block 316 formed with an undercut slide groove 317 in its upper face. The block 316 is located at substantially the level of the upper disk 251 of the turntable and extends closely adjacent the periphery thereof, and the groove extends radially of the disk and has its bottom surface in or slightly above the plane of the upper face of the disk. An indexing slide 318 reciprocates in the groove 317, and has projecting from its upper surface a pair of lugs between which is pivoted one end of a link 319. The other end of the link is connected to the lower end of a bell crank 320 pivotally mounted at its angle on a horizontal pivot on the support 315 above the slide. The upper end of the bell crank is pivotally connected by a link 321 to the end of a piston rod 322 projecting downwardly from a vertically arranged double-acting cylinder 323 mounted on the support. The piston rod is moved up or down by compressed air supplied to one end or the other of the cylinder through conduits 324 and 325 leading from the manifold 87 through the valve 85 (see Fig. 2). Upward movement of the piston rod 322 swings the bell crank to project the slide 318 inwardly over the upper disk 251, while downward movement causes retraction of the slide outwardly of the disk periphery. Adajacent each of the compartments 262 is an index block 326 mounted on the upper disk adjacent its edge, with a recess in its outer end to receive the inner end of the slide 318, the recesses and slide preferably being correspondingly tapered as shown to assure exact engagement of the slide in the block. The blocks 326 are of course so located relative to the respective compartments and the indexing slide that when the slide is engaged in one of the indexing blocks the turntable is positioned with the compartments registering with the mechanism 190 and other portions of the machine. Movement of the slide is timed in relation to movement of the turntable by means of the valve 85, as explained hereinafter.

Brake means are provided for the turntable to prevent excessive shock to the parts from repeated starting and stopping of the rotating turntable. Referring to Figs. 4a and 27, the brake means comprises a pair of brake assemblies 328 at diametrically opposite portions of the upper turntable disk which engage the edges of the adjacent cam plates 283 and 285. Each brake assembly comprises an angle bracket 329 one wing of which serves as a base and is secured to the disk 251. The other wing extends vertically in spaced relation to the cam plate edges, and has a pair of horizontally spaced internally threaded apertures therein which may be extended by bosses on the outer face of the wing. A pair of tubular externally threaded members 330 extend through the apertures and are formed with enlarged inner ends. A rod 331 is slidably received in each of the tubular members and is secured to a brake shoe carrier 332 which has upper and lower arcuate brake shoe surfaces adjacent the cam plates. To each of these surfaces is secured a strip of brake lining 333 which engages the edge of the adjacent cam plate. Encircling each rod 331 is a compression spring 334 extending between the brake plate and the enlarged inner end of the associated tubular member 330. The brake plate is thus slidably supported by the tubular members and urged into braking engagement with the cam plates, the pressure being adjustable by turning of the members 330 to compress or relax the springs 334. The brakes slow the rotation of the turntable 250 so as to ease the starting and stopping thereof. Similar brake means may be provided on the lower disk 251 if desired.

Vertically inwardly extending shields 335 are provided on the edges of each disk 251 between the compartments 262, for preventing the possible entrance of cans into the turntable 250 except at the compartments. This guards against the possibility of damage to the parts if by some chance improper timing of the turntable and the can loading mechanism about to be described should occur.

Can loading mechanism

Cans are loaded into the turntable compartments at the forward end of the machine by loading mechanism generally designated 337, disposed diametrically opposite the tab folding mechanism 190. The can loading mechanism is best shown in Figs. 4a and 28 to 30. The cans A are brought to the machine by a conveyor 338 of any suitable type, as for example the link conveyor shown at the right in Fig. 28, which moves two lines or rows of cans rearwardly toward the turntable. The conveyor 338 is driven by a motor 339, shown diagrammatically in Fig. 35, through a drive belt or other appropriate means. The delivery end of the conveyor is spaced forwardly from the turntable, and a horizontal loading table 340 at a level just above the lower disk 251 extends from the conveyor to the turntable, providing a surface along which the cans move in a double line for feeding into a prepared carton disposed in a compartment 262 of the turntable brought into alignment with the loading table 340 by rotation of the turntable as previously described. It will be noted that a compartment is moved from the mechanism 190, at which it receives a carton, to the can loading mechanism 337 in two steps or quarter turns of the turntable, so that when it reaches the mechanism 337 the carton tabs are folded against the top and bottom walls and the holding blades 295 extend across the outer tabs and overlie the ends of the blades 275 as already described. It will also be evident from Fig. 28 that the lower blades 295 are substantially at the level of the loading table 340. The cans A may thus pass smoothly from the table into the carton without catching on the tabs or the blades 275, their end flanges moving along the blades 295 and 275. The carton is stretched slightly with its top and bottom walls drawn into the recesses at the top and bottom of the compartment, so that the carton height is slightly greater than the height of the cans to allow for the thickness of the blades 275 and 295 disposed in the carton.

A continuous double row of cans is maintained on the table 340 by the conveyor, the pressure of cans on the conveyor urging preceding cans rearwardly along the table toward the turntable. At each side of the table is a pair of vertically spaced horizontal guide rails 342, and spaced above the table by the height of the cans is a pair of can hold-down rails 343, one for each row of cans, extending longitudinally and supported at their rear ends adjacent the turntable by a transverse bar 344 on suitable uprights and at their forward ends by similar supporting means, not shown. The rails 342 and 343 maintain the cans in alignment on the loading table 340 and prevent their dislodgement. A separating strip 345 is supported between the rails 343 and extends between the tops of the two rows of cans on the table. At each side of table 340, supported on a suitably formed portion of the frame 51, is a horizontal guide member 346 provided with an undercut channel or guide for a slide 347 which extends upwardly to a level approximately halfway of the height of the cans on the table. At its side adjacent the table, each slide is formed with a pair of horizontal lugs 348 between which is pivoted a pusher 349 (see Fig. 4a) which has its rear portion bent to project over the table, the rear end being concave to conform to the shape of the can walls. The pusher has a portion extending forwardly of the pivot, and a spring 350 is secured extending between the forward ends of the pusher and slide to urge the rear end of the pusher in the direction of the loading table 340. The slide 347 has at its rear end a pair of vertical lugs 351 between which is pivoted a link 352 connected to a rocker arm 354 extending upwardly from the end of a rock shaft 355 which extends transversely below the table and is journaled in suitable bearings 356 supported on the machine frame. The rear portion of each guide member 346 is slotted to accommodate the rocker arm. A lever arm 357 is fixed on the shaft 355 between the rocker arms 354, so that when the arm 357 is moved in one direction or the other the rocker arms are moved correspondingly by the shaft to shift the slides rearwardly or forwardly, as the case may be. When the slides are moved rearwardly, the pushers 349 engage simultaneously against two of the cans on the table, one in each of the can rows, and push the cans, and cans disposed between such cans and the turntable, toward the turntable. When the slides move forwardly, the pushers ride along the sides or walls of the cans until they reach their extreme forward positions, at which point they are in readiness to push another group of cans upon rearward movement, as is evident from Fig. 4a. The travel of the slides and pushers is slightly more than three times the diameter of the cans, so that three cans from each row, or a total of six, are pushed into the carton by each rearward stroke of the pushers. The pushers 349, however, are arranged to engage the fourth cans forwardly of the turntable and terminate their pushing or loading stroke about one can diameter forwardly of the turntable, the pusher-engaged can of each row being left at the rear end of the table 340 outside of the turntable on each loading stroke and being moved into the carton in the following compartment on the next pushing stroke. The pushing stroke begins with the pushers located forwardly of the turntable somewhat more than four can diameters.

Stop means are provided as a precaution against the cans being moved off the loading table and against the turntable when a compartment is not disposed in position to receive them. An apertured support plate 358 (see Fig. 28) is held spaced below the table 340 by suitable spacers and brackets. A transversely extending rock shaft 359 disposed between the table and plate 358 is journaled in bearings 360 at opposite sides of the plate aperture, and has a pair of rearwardly extending outwardly bent arms 361 fixed on its ends. The rear ends of the arms are slotted to receive the rounded reduced ends of a transverse bar 362 which has four stop pins 363 extending upwardly therefrom and normally projecting above the table 340 through suitable apertures therein, about one can diameter forwardly of the rear end of the table. The stop pins are arranged in two pairs, one pair for each row of cans, and the pins of each pair are so spaced that a can in engagement therewith projects rearwardly between them to engage the can at the rear end of the table. A rocking arm 365 is fixed on the shaft 359 to extend forwardly therefrom, and has pivotally connected to its free end a slotted link 366 which extends downwardly through the opening in plate 358 to have its slotted portion engaged with the lever arm 357 of the shaft 355 by means of a stud 367 on the arm projecting through the slot. The free end of rocking arm 365 is preferably slotted as shown to allow adjustment of the point of connection thereto of the link 366. A pair of spring strips 368 are secured under the loading table 340 forwardly of the shaft 359 and extend at right angles to the shaft to press downwardly thereon to hold it in one or the other of the positions to which it may be turned.

Each spring strip has a small pad 369 of brake lining or similar material on its free end for frictional engagement with the shaft. When the lever arm 357 is rotated upwardly and forwardly, that is clockwise as viewed in Fig. 28, to return the slides 347 and pushers 349 to their forward positions ready for a rearward or pushing stroke, the stud 367 rides in the slot of link 366 until it reaches the upper end thereof, at which point it moves the link upwardly to rotate the rocking arm 365 counterclockwise and rock the shaft 359 so as to depress the bar 362 and move the stop pins 363 below the upper surface of the table. This leaves a clear path for movement of the cans into the carton brought into alignment with the loading table 340 by the turntable. The spring strips 368 hold the shaft 359 so that the pins 363 are maintained in their depressed or retracted position. The length of the slot in the link 366 is such that the stop pins are depressed just as the pushers 349 reach the end of their return stroke and begin a pushing stroke. On the pushing stroke, the lever arm 357 swings counterclockwise but causes no downward movement of the link 366 until the stud 367 engages the lower end of the slot, when the link is drawn downwardly to cause reverse movement of the shaft 359 to bring the stop pins 363 to their raised positions blocking the paths of the cans on the table, the spring strips 368 then holding the shaft with the pins in such position. This reverse movement occurs at the end of the pushing stroke of the pushers 349, the pins moving upwardly just after the cans actually engaged by the pushers come to the rear of the loading table just rearward of the pins and forward of the turntable. As already explained, these two cans remain on the rear end of the loading table and do not enter the carton. Cans moving off the conveyor onto the table are moved rearwardly by the pressure of cans on the moving conveyor until the rearmost or leading can engages the stop pins. Such movement of the cans to fill the table occurs during both the pushing and return strokes of the pushers, and is so related to the speed of the pusher movements that the leading can of each row moving from the conveyor comes into contact with the can standing on the rear end of the table substantially as the pushers begin a loading stroke. As seen in Fig. 4a, the pushers end their return strokes and begin their pushing strokes with the concave pushing ends thereof disposed somewhat forward of the fourth cans from the rear end of the table 340, so that if for any reason the standing cans have not quite been engaged by the cans moving from the conveyor, the pushers will still properly engage the fourth cans. Thus if the cans coming off the conveyor reach the standing cans before the pushers begin their loading stroke, they are halted by the stop pins 368, and if they do not reach the standing cans before the pushing stroke, they are still positioned for proper engagement by the pushers. As above pointed out, the stop pins are retracted during the pushing strokes of the pushers 349, allowing the first three cans of the four moved by each pusher to enter the carton in the compartment 262 aligned with the loading table 340, the can ends sliding along the fingers out of contact with the tabs and encountering no obstacles which might cause jamming. Fig. 42 shows the carton as it appears at the loading mechanism after the cans have been loaded therein, and it will be noted that the end cans are located in positions to be engaged in a retaining manner by the carton tabs, except for the interposition of the fingers between the tabs and cans.

A pair of switches 370, shown in Figs. 28 and 44 and schematically in Fig. 35, are provided in the paths of the two rows of cans above the conveyor 338 for stopping the machine in the event of interruption of the flow of either of the can rows. The movable part of switch 370 is in the form of a bent strip 370a pivotally mounted in a stationary portion 370b which is supported by the frame of the machine. In the event that the flow of cans is interrupted so that no can will be in position beneath the pivoted strip 370a, it will be allowed to swing downward to interrupt the circuit passing through the switch 370. These switches are incorporated in an electrical circuit which controls the operation of the driving means for the machine as explained below. So long as an uninterrupted flow of cans is passing below the switch the circuit through the switch will remain closed. If a gap occurs in either row, the switch for that row opens and the machine is stopped in the manner described hereinafter.

Before the compartment 262 comes into alignment with the loading table 340 on the 90° rotation of the turntable after its alignment with the mechanism 190, it is stopped at a position halfway between the tab folding mechanism and the can loading mechanism 337. This is an idle position, there being no action on the carton, which remains in substantially the same condition as when inserted into the compartment. An arcuate retaining strip 372, which is suitably supported by one of the frame members 279, is disposed radially inward of the shields 335 in position to engage the outer end edges of the side walls and partition of the carton as the carton is moved from the idle position to the can loading mechanism, and serves to hold the carton from movement outwardly of the compartment as it is swung around, so that it will be in the proper position relative to the cans when they are loaded thereinto. It also serves to return to proper position a carton which has moved outwardly during the first quarter turn. It is very rarely that a carton fits so loosely in a compartment as to be shifted by the centrifugal force resulting from rotation of the turntable, but the retaining strip takes care of such exceptional cases.

As the turntable rotates a quarter turn from the loading mechanism 337 to carry the loaded carton to the discharge point, the holding blades 295 are first moved slightly away from the inner faces of the adjacent disks 251, then projected outwardly from the compartment so as to pass out of engagement with the ends of the cans, and then moved into the planes of the disks 251 outwardly of the recesses 296, to the position shown in full lines in Fig. 25, by the action of the cam means as already explained. Two vertically spaced arcuate restraining rails 373 are provided between the mechanism 337 and the discharge point to engage the two outer cans and thus hold the cans against outward movement due to centrifugal force or the outward movement of the blades 295. The rails 373 are supported at a suitable height by one of the vertical frame members 279 or other appropriate means. As the blades move outwardly, the can-engaging tabs adjacent the outer ends of the top and bottom carton walls snap into retaining position with their free edges engaging the ends of the cans and the interior surfaces of the end flanges. This occurs before the carton moves past the ends of the restraining rails 373.

*Discharge mechanism*

The means for discharging the loaded carton from the machine is best understood with reference to Figs. 2, 3 and 4a. The discharge mechanism, generally designated 375, is located halfway between the loading table 340 and the folding mechanism 190, opposite the idle stop point, and comprises a chute 376 extending radially of the turntable at substantially the level of the lower disk 251, with its inner end spaced somewhat from the disk. The outwardly projected blades 295 carried on the lower disk lie between the chute and the disk when the compartment is brought to position aligned with the chute by 90° travel from the loading table, and provide a surface over which the carton moves from the compartment onto the chute 376. To remove the loaded carton from the compartment, an ejector 377 is provided adjacent the chute to extend between the disks of the turntable. The ejector is an L-shaped member one arm of which extends parallel to the midline of the chute and the compartment aligned therewith, or in other words transversely of the machine, and is of sufficient length to project inwardly of the turntable to a point inward of the inner end of the compartment, but at one side thereof. The other arm extends at right angles from the inner end of the first arm across the radially inner end of the compartment so that it may engage the cans at the inner end of the carton and move the carton outwardly onto the chute upon outward movement of the ejector. The outer end of the first ejector arm is secured to a block 378 slidable on a pair of transversely extending horizontal rods 379 supported outwardly of the turntable parallel to the chute by a suitable frame portion. One end of a link 380 is pivoted between a pair of lugs 381 depending from the slide block and the other end is pivotally connected to the upper end of an oscillating lever 382 pivoted at its lower end to a bracket 383 at the bottom of the frame 51. The lever 382 may thus be oscillated about its lower connection in a plane transverse of the machine to slide the ejector 377 back and forth in and out of the turntable. To effect such oscillation, a shaft 384 is suitably supported adjacent the lower portion of the lever at right angles to the plane thereof, and has fixed on its end adjacent the lever a cam plate 385. In its face adjacent the lever, the cam plate has an eccentric cam groove 386, generally oval but irregular in shape, as best shown in Fig. 3. The lever is formed with a projection on which is mounted a roller 387 engaged in the groove 386. The cam is rotated clockwise as viewed in Fig. 3 to swing the lever 382 back and forth, the oscillation being so timed that the ejector is moved into the turntable during each quarter turn thereof and moved out while the turntable is stationary, with one of the compartments aligned with the chute 376. As the loaded carton is moved out of the compartment, it is in effect drawn off the blades 275, the carton tabs at the inner end of the carton springing into retaining engagement with the end cans. Fig. 43 shows the carton as it appears when discharged, with the cans secured therein. The ejected or discharged cartons may be removed from the chute 376 in any desired manner or by any suitable mechanism.

After discharge of a carton therefrom, the now-empty compartment 262 moves to the tab folding mechanism 190 upon another quarter turn of the turntable 250, the holding blades 295 being drawn into the recesses 296 through the action of cam groove 286 before the compartment reaches that mechanism, and the ejector 377 being moved to its inner position before the next compartment arrives at the chute, through the action of the cam groove 386. The first compartment then again has an expanded carton inserted thereinto from the tab folding mechanism as a loaded carton is discharged from the second compartment onto the chute 376, and as cans are loaded into a carton in the third compartment at the can loading mechanism 337.

*Driving means*

The mechanism for driving the machine is best shown generally in Figs. 1, 3, 28, 33 and 34, although certain details are shown in other figures. The driving means comprise a conventional electric motor 390 (see Fig. 1) working through a speed reducer of conventional form indicated as enclosed in casing 391 at the forward end of the machine below the loading table 340. The drive shaft extends transversely of the machine and carries a sprocket 392 which through a sprocket chain 393 and a sprocket 394 drives a main shaft 395 parallel to and located rearwardly of the drive shaft, directly below the vertical drive shaft 252 (see Fig. 3) of the turntable 250. The sprocket 394 is secured on the main shaft in driving but releasable relation, as a precautionary measure in case of jamming of the machine. The sprocket is rotatably mounted on the shaft adjacent a radially flanged hub or collar 396 (see Fig. 34) fixed on the shaft, and is normally held against rotation relative thereto by a link 397 pivoted at one end on a stud extending from the face of the sprocket adjacent the collar. The link extends in the plane of the collar flange and has an open central portion which receives a part of the flange and in which is journaled a roller 398 which normally seats in an arcuate recess in the edge of the collar flange to hold the sprocket in fixed relation to the shaft 395. The other end of the link has a projection with an aperture through which extends a rod 399 fixed at one end to the sprocket and extending parallel to the plane thereof. A spring 400 is disposed on the rod between its free end and the link projection to urge the link into locked relation with the collar flange, a nut threaded on the free end of the rod 399 securing the spring and serving to adjust the compression thereof. The main shaft 395 is suitably journaled in a gear casing 401 and a pair of standards 403, 403. A gear 404 (see Fig. 34) is secured on the shaft 395 in the gear casing, meshing with gears 405 and 406 on opposite sides thereof, the gear 405 being disposed at the forward side of the shaft 395, that is, the side adjacent the drive shaft, and gear 406 being on the opposite or rearward side. The gears 405 and 406 are secured on shafts parallel to the main shaft suitably journaled in and projecting through the gear casing, one end of each terminating near the longitudinal center line of the machine. The shaft of gear 405 carries at this end a crank 407 having a connecting rod 408 linked to the lever arm 357 of the rock shaft 355, so as to swing the arm 357 back and forth for operating the can loading mechanism 337 as previously described. A similar but somewhat longer crank 409 is secured on the corresponding end of the shaft of gear 406, and has a connecting rod 410 linked to an oscillating lever 411 for reciprocating the carriage 130. The lever 411 is similar to the lever 382 for the carton ejector 377, being arranged to swing in a vertical plane, but longitudinally of the machine, by pivotal connection at its lower end to a bracket 412 adjacent the bottom of frame 51, extending upward through a suitable slot formed in the platform portion 153 and being connected at its upper end by a link 413 to a bracket 414 (see Figs. 1 and 18) depending from the carriage 130. The cranks are so arranged that the carriage and the pusher slides 347 are drawn toward each other on their operating strokes and pushed in opposite directions on their return strokes, the cycle in each case being completed in the same period of time, since the gears 405 and 406, as shown, are of the same size.

The connecting rods 408 and 410 are of substantially the same construction, each having two telescoping sections releasably locked against relative sliding movement by a safety link construction similar to that employed with the sprocket 394. The outer telescoping section of each rod 408 and 410 has a pair of lugs between which is pivoted one end of a channel-shaped link 415 the other end of which is apertured for the projection therethrough of an upstanding rod 417 on that section and having a spring 418 compressed between a nut on its free end and the adjacent end of the link. A roller 419 is mounted between the sides of the link and normally is pressed into locking engagement with an arcuate recess in the inner telescoping section, the wall of the outer section being apertured to permit the engagement. In the event of excessive longitudinal stress on the connecting rod, as by jamming of cartons in the rear part of the machine, the roller is forced out of the recess against the pressure of the spring, permitting the two sections to slide relative to each other and thus preventing damage to the rod or other parts of the machine. The link 415 on the connecting rod 410 has a perpendicular extension 420 at its pivoted end which engages with a normally closed switch 421 mounted on the outer telescoping section. In the event of disengagement of the roller from the inner section, the extension 420 is rotated to open the switch and stop operation of the machine, as described in greater detail hereinafter. A similar switch arrangement may be provided on the connecting rod 408 if desired, but is not necessary.

The end of the shaft for gear 406 opposite that carrying the crank 409 extends out of the gear casing 401 and has secured thereon a pair of sprockets 422 and 423. In the plane of the sprocket 422 is a sprocket 424 secured on the inner end of a transversely extending shaft 425 journaled in the machine frame 51 rearwardly of the cam plate 385. A sprocket chain 426 is trained around the sprocket wheels 422 and 424 for driving the shaft 425. The outer end of the shaft 425 extends into a suitable gear box 428 mounted on the side of the frame 51 and also enclosing the rear end of the shaft 384 of the cam plate 385. Cooperating bevel gears 429 are secured on the shafts 384 and 425, completing the drive for the cam 385 for operating the ejector 377 in the manner already explained.

As best shown in Figs. 1, 2 and 7, the shaft 120 which operates the carton expanding mechanism 110 is driven by a sprocket 430 connected by a chain 431 to the sprocket 423. Another sprocket 432 (see Fig. 7) is fixed on the shaft 120 drivingly connected to a sprocket 433 by a sprocket chain 434. The sprocket 433 is secured on a cam shaft 435 which extends transversely of the machine directly below the shaft 120, and is journaled at its ends in opposite sides of the frame 51. Rotation of the cam shaft 435 effects the timed operation of the valves 83, 84 and 85 respectively controlling the actions of the air cylinders operating the carton feeding means, the folder holding members, and the index slide; and control the action of the three-way valve 128 to apply suction to the suction cups 125 for breaking the fold lines of the cartons. The valves 83, 84, 85 and 128 are mounted in suitably spaced relation along a supporting shelf 436 forming part of the machine frame and extending parallel to the cam shaft. Each of the valves has operating means of the general type illustrated in Fig. 7, which include an operator 437 pivotally connected to a valve stem or the like in such manner as to shift the valve to one operating position when its free end is swung toward the valve and to move the valve to another operating position when it is swung away therefrom. The valve has spring or other biasing means to normally urge the parts in a desired direction. On its free end the operator 437 is provided with a roller 439 which bears on the perimeter of a rotating cam 440 secured on the cam shaft 435. The cam is suitably shaped and has its high and low portions properly positioned relative to the valve to move the operator 437 at the exact moment the particular cylinder controlled by the valve is to be operated and to hold the valve in the desired position for the necessary period of time. In Fig. 7, the cam 440 shown is that employed for the valve 83 controlling the holding members 221 of the cylinder 77 for the carton feeding mechanism. The other cams 440 are similar, but not necessarily identical, to the cam shown.

Each of the valves 83, 84 and 85 is a four-way valve having one port opening to atmosphere, and arranged to alternately supply air under pressure to one of the two lines or conduits from the associated double-acting air cylinder while venting the other line to the atmosphere, and vent the one conduit while supplying air to the other. The valve 128 is a three-way valve arranged to alternately connect the suction lines 127 to the conduit 91 and open them to the atmosphere.

For intermittently rotating the turntable 250 as described, start-and-stop mechanism is provided which is driven by the main shaft 395 (see Fig. 3). A shaft 442 disposed parallel to and above the main shaft and below the lower end of the vertical shaft 252 is journaled in the hangers 249 of the shaft support unit 246. On the shaft 442 is a bevel gear 443 meshing with a cooperating bevel gear 444 on the lower end of shaft 252. Rotation of shaft 442 counterclockwise as viewed in Fig. 1 thus will cause counterclockwise rotation of shaft 252 and turntable 250 as viewed from above, as in Figs. 4a and 23. On the left end of shaft 442 as viewed in Fig. 3 there is secured a Geneva wheel 445 which is actuated by the crank-like member 446 fixed on the main shaft 395 and having a stud 447 for engagement with the radial slots of the Geneva wheel. It will be noted that there are eight slots in the wheel, so that it is rotated 45° upon each rotation of the actuating member 446 and shaft 395 and that the bevel gear 443 is of twice the diameter of the bevel gear 444, so that the latter rotates twice for each rotation of the former. Thus upon each actuation or one-eighth rotation of the Geneva wheel 445, the turntable is rotated 90°. The main shaft 395 rotates clockwise as seen in Fig. 1, so that the Geneva wheel and its shaft 442 are turned counterclockwise and the desired rotational direction is imparted to the turntable 250. It will be apparent that each revolution of the main shaft 395 results in a quarter turn of the turntable, and one cycle of reciprocation of the carriage 130, pushers 349, and ejector 377, the carriage and pushers moving away from the turntable as it makes each 90° rotation and toward the turntable during each pause thereof, while the ejector moves into the turntable as it rotates and outwardly thereof when it stops.

A cam 448 is secured on the end of the main shaft and, as best shown in Fig. 32, comprises a circular disk with a single tooth or radial projection 449. Adjacent the cam is a make-and-break switch 450 mounted on the frame and having a pivoted switch arm 451 carrying a roller which engages the cam edge, a spring or the like biasing the arm to this position, in which the switch is held closed. On each revolution of the main shaft 395, the cam projection 449 swings the switch arm 451 against the action of the biasing means and opens the switch momentarily. This occurs at the beginning of each cycle of operation, when the carriage 130 and pushers 349 are at their most inward positions, and the ejector is at its outer position, relative to the turntable, and the turntable is about to rotate. The switch 450 is opened upon each revolution of the shaft 395, but as explained is arranged in the machine operating circuit in parallel with the switches 165 and 370, so that it will not cause the machine to stop when it is opened unless at least one of the other switches is open at the time, and conversely opening of a switch 165 or 370 will not stop the machine until the switch 450 is also opened.

Referring to Fig. 35, showing the diagram of a suitable form of the electric circuit controlling the machine, the main motor 390 and the conveyor motor 339 are each connected to the power lines L1 and L2 through a switch 454 biased to open position. A suitable coil 455 is provided for each switch which when energized closes the switch. The coils are each connected to one of the power lines, and are connected in series with each other through a line 456 in which is disposed a manually operated control switch 457, the safety switch 421 mounted on the connecting rod for the carriage 130, and the make-and-break switch 450. A line 458 is arranged in parallel with the portion of line 456 which includes the switch 450 but not switches 457 and 421, and in line 458 are serially arranged the creaser switch 165 and the two can loader switches 370. As previously explained, the switch 421 is normally closed, while the switches 165 and 370 are biased to open position, but ordinarily are held closed by the cartons and cans, respectively. Thus when the control switch 457 is closed, the coils 455 are energized to close the switches 454 and cause operation of the machine motor and conveyor motor. The machine may be stopped at any time by opening switch 457, breaking the energizing circuit for the coils and causing the motor switches 454 to be opened. If the carriage 130 is jammed by improper passage of cartons from the hopper 53 to the turntable 250, or otherwise, so as to overload the connecting rod 410, the safety link 415 yields and opens the safety switch 421 (see Fig. 33), stopping the motors in the same manner as switch 457. The switch 450 of course is repeatedly opened and closed by rotation of the main shaft 395, but does not stop the machine because the parallel line 458 provides an alternate path for the coil-energizing current. Again, if any one of the switches 165 or 370 is opened, the machine is not stopped immediately because current may flow through switch 450 until it is opened by the cam 448. If one of these three switches is opened, the machine will continue for a short space until the switch 450 is also opened and the circuit thus is broken. Since the switch 450 is opened at the moment an index cycle is beginning, as already pointed out above, the machine when stopped by operation of the switches 165 or 370 always comes to a halt with the carriage 130 and can pushers 349 at their nearest approach to the turntable and the ejector at its outermost position, the turntable being disposed with diametrically, opposed compartments aligned with the mechanism 190 and the can loading mechanism 337. In practice, the simplified circuit just described will include a number of refinements such as jog switches for moving the parts through a small portion of a cycle, and means for cutting out the motors upon excessive overloading thereof. These refinements are conventional and not necessary to the operation of the machine herein disclosed.

The operation of the machine may be summarized by reference to Figs. 44 and 45, in which a line of cartons $C^1$ to $C^{10}$ inclusive is shown in the machine occupying the compartments of the turntable 250 and the several positions between the hopper 53 and the turntable. The machine is shown as in the middle of an index cycle, except for two deviations hereafter explained, with the turntable at rest just after completing a quarter turn, the carriage 130 and can pushers 349 at their positions most remote from each other and from the turntable about to slide theretoward, and the ejector 377 in its innermost position about to move outwardly to push a loaded carton onto the discharge chute 376. The carton $C^1$ rests on the channel guide 66 at the rear end thereof, having just been dropped by the suction cups 71 of the tubular member 70 in the movement of the latter away from the hopper by the cylinder 77 through the crank arrangement as described. The member 70 is at its farthest point from the hopper 53, about to begin movement back toward it to pick up another carton. The pickup movement of the tubular member is made as the carriage through the pusher rod 98 draws the previous carton forwardly, and its return movement occurs as the rod 98 moves rearwardly, so that the withdrawn carton may drop onto the channel guide 66 unimpeded. The movement of the tubular member 70 is timed by the cam 440 governing the valve 83 for the cylinder 77 which effects movement of the member and swinging of the retarders 58 by the crank arrangement as described. The member 70 itself, by means of the slot 90, controls the application of suction from the conduit 91.

The carton $C^2$ is in the expanding mechanism 110, having just been reversely folded by upward swinging movement of the opposed suction cups 125 effected by the double rack 117. The cups are just releasing the carton and beginning their downward return movement, suction from conduit 91 being cut off by the valve 128, and the carton has just been gripped by the clamping fingers 144 of the toggle devices 140 of the carriage 130. As already pointed out, the cups 125 move upwardly during rearward movement of the carriage and downwardly during forward sliding of the carriage.

A carton $C^3$ is disposed in the creaser 162, the central connections of the bottom wall sections W being gripped between the plates 163, and the upper portion flaring. The carton holds the switch 165 closed.

The carton $C^4$ is positioned just forwardly of the creaser, where it has been pushed by the carton drawn into the creaser. It is substantially in squared up, open condition, to which it comes of itself upon being freed from the creaser. A carton length forward of the creaser is the carton $C^5$, just pushed to that position by the following carton moving out of the creaser. The carton $C^5$ is in open set-up condition substantially the same as the carton $C^4$, and has its forward end entered in the guide assembly of the pre-breaking mechanism 190. This carton is about to be pushed along the guide assembly into the mechanism by the rear pusher fingers 170.

In the mechanism 190 is a carton $C^6$, the tabs of which have been prefolded, during the rearward stroke of the carriage just completed, by the folder fingers 205 and holding members 221 operated by the cam 173 and cylinder 237, the latter acting in response to the actuation of valve 83 by its cam 440. A carton $C^7$ is shown in the adjacent compartment of turntable 250 to illustrate more clearly the machine operation, although actually at the stage depicted the compartment would be empty and awaiting insertion of a carton from the mechanism 190. The carton $C^7$ is moved into the compartment by the forward pusher fingers 170 during forward movement of the carriage, and the forward or inner tabs are folded against their walls by the inner blades 275 of the compartment, while the outer tabs remain at an angle to the walls, as previously explained. A carton $C^8$ is held in the preceding compartment, 90° counterclockwise from the mechanism 190, at the idle position between the tab pre-folder and can loading mechanism. The carton $C^8$ is in the same condition as the carton $C^7$, there being no operation on it except movement to and from the idle position.

The carton $C^9$ shown in the turntable compartment adjacent the can loading mechanism 337 has just been rotated from the idle position, the outer blades 295 folding the outer carton tabs as the carton comes to this position, in the manner described. Six cans A are shown as disposed in the carton, although these cans would not actually be shoved into the turntable until completion of the rearward operating or pushing stroke of the pushers 349 which is about to begin. Showing of the cans in the carton, however, more clearly illustrates the position of the cans and the condition of the carton at this point when filled. The outer blades 295 extend into the carton, folding the outer tabs and providing a smooth path for the cans.

The fully loaded carton $C^{10}$ at the discharge station has just been brought there from the can loading mechanism by rotation of the turntable, and is about to be removed by the ejector 377. During the travel from the mechanism 337, the outer tabs have been allowed to spring into holding engagement with the flanges of the cans at the outer end of the carton by withdrawal of the blades 295 from the carton, such withdrawal occurring before the carton has passed the restraining rails 373 which hold the cans from centrifugal movement outwardly of the carton as they move from the can loading mechanism. The lower outer blades 295 are in position for the carton $C^{10}$ to move thereover onto the discharge chute 376.

The condition of and operations on a carton at each of the several points of the machine have been described above, and the movement of a carton through the machine may be similarly outlined.

A carton is drawn from the hopper and deposited on the channel guide during the initial or rearward movement of the carriage in each index cycle. The carton $C^1$ is one such carton. On the first forward stroke of the carriage following the rearward movement during which the carton was fed from the hopper, the carton $C^1$ is moved by the pusher rod 98 to the position of carton $C^2$, where it is reversely folded, and on the next forward movement of the carriage the carton is moved by the toggle devices 140 to the position of carton $C^3$ in the creaser. The carton here remains stationary, except for the flaring movement of its upper portion when released by the clamping fingers, until the third forward stroke of the carriage, when it is pushed by a following carton to the position of carton $C^4$, just out of the creaser, and assumes its set up form. On the fourth forward slide of the carriage, the carton $C^1$ is pushed forward one carton length by a carton moving out of the creaser, and engages the guide assembly in the position of carton $C^5$. It is moved to the position of carton $C^6$ in the pre-folding mechanism 190 by the rear pusher fingers 170 upon the fifth forward reciprocation of the carriage. It will be noted that the stroke of the carriage is somewhat greater than the carton length, and the carton $C^1$ is not moved to the position of carton $C^5$ directly by the carriage but moves only a carton length when pushed from the creaser. Thus when the carton is moved into the mechanism 190 directly by the carriage-mounted pusher fingers, there is a gap between it and the following carton at the position of carton C⁵, which allows the rear holding members 221 to swing without interference from the following carton. In the tab pre-folder, the carton has its tabs folded out of the planes of their walls, and is then moved by the forward pusher fingers 170 upon the sixth forward carriage movement into a turntable compartment, in the position of carton C⁷, during the pause of the turntable between quarter turns, the inner tabs being folded against the walls. As the carriage then moves rearwardly, the turntable rotates 90° counterclockwise, bringing the carton C¹ to the position of carton C⁸, and after a pause carries the carton another 90° to the position of carton C⁹ at the can loading mechanism, where the cans A are pushed into the carton, the outer tabs being folded substantially flat and bridged by the outer blades 295. The now loaded carton C¹ on the next quarter turn of the turntable is carried past the restraining rails 373 and the blades 295 withdrawn during that passage so that the outer cans are secured by the outer tabs, and thus comes to the discharge mechanism 375. As the turntable stops, the ejector 377 is actuated by its cam 385 to move outwardly therefrom and engages the radially inner end of carton C¹ to push it over the outer blades 295 on the lower turntable disk out of the compartment and onto the chute 376. On the next quarter turn of the turntable, the emptied compartment is returned to alignment with the tab pre-folder ready to receive another carton.

Since many changes and variations of the disclosed embodiment of the invention may be made without departing from the scope of the inventive concept, it is not intended to limit the invention otherwise than as required by the appended claims, with due regard to the spirit as well as the literal wording thereof.

What is claimed is:

1. A machine for loading articles into a four-walled open-ended carton having an article-retaining tab adjacent an end of the carton formed from a wall thereof, which comprises means for expanding the carton, means for feeding a carton in collapsed form to said expanding means, means for preliminary folding of a tab of the expanded carton inwardly out of the plane of its supporting wall, movable carrier means adapted to receive and retain the carton in expanded condition with the tab out of the plane of said wall, means on the carrier means for further folding the tab toward its supporting wall to extend away from the adjacent end of the carton, means to move an expanded carton to the preliminary folding means, means to move a tab-folded carton to the carrier means, and means for inserting an article into the carton on the carrier means to a position to be engaged by the folded tab.

2. A machine for loading flanged-end articles into a four-walled open-ended carton having an article-retaining tab formed from a wall adjacent an end thereof, which comprises means for feeding a carton in collapsed form, means for expanding the collapsed carton, means for folding a tab out of the plane of its wall, carrier means for holding and moving an expanded tab-folded carton in condition and to position for loading of articles thereinto having tab-holding means to fold and hold a tab against its wall, means for loading articles into the carton on the carrier, means for discharging the loaded carton from the carrier, and means to move the carton successively from the feeding means through the expanding means and tab-folding means to the carrier; said carrier comprising a turntable having a compartment therein for holding an expanded carton and including a folding blade extending parallel to the tab-supporting carton wall, a slide carrying the folding blade, a guide member receiving the slide for movement perpendicularly of said carton wall, shifting means secured to the guide member reciprocably mounted for shifting the guide member inwardly and outwardly relative to the carton, a first cam follower on the shifting means, first stationary cam means engaged by the first follower adapted to reciprocate the shifting means upon rotation of the turntable to cause movement of the folding blade in a plane parallel to said carton wall, slotted means extending from the folding blade slide, bell crank means pivotally mounted adjacent the slotted means and having one end engaged in the slot therein, a reciprocable member pivotally connected to the other end of the bell crank means, a second cam follower on the reciprocable member, second stationary cam means engaged by the second cam follower adapted to move the reciprocable member upon rotation of the turntable in timed relation to movement of said shifting means for effecting movement of the folding blade in a plane perpendicular to said carton wall, and means for rotating the turntable step by step, whereby the folding blade is moved into an end of the carton to fold the tab approximately parallel to said wall and to overlie the tab during subsequent loading of the carton and whereby the folding blade is retracted therefrom after loading; said article loading means including a table for supporting articles adjacent the turntable periphery spaced from said tab-folding means, pusher means reciprocable toward and from the turntable to move an article from the table into a carton disposed adjacent thereto by the turntable, and means for reciprocating the pusher means in timed relation to the step by step movement of the turntable; said discharge means including a chute disposed adjacent the turntable periphery spaced from said tab-folding means and said loading means, a reciprocable ejector movable radially of the turntable to engage and move a loaded carton therefrom onto said chute, and means for reciprocating the ejector in timed relation to movement of the turntable; said means for moving the carton comprising a reciprocable carriage having spaced means thereon for engaging a carton at the feeding means, at the expanding means, and at the tab-folding means upon successive strokes of the carriage during reciprocation thereof, and means for reciprocating the carriage.

3. A machine for loading articles into a four-walled open-ended carton having an article-retaining tab adjacent an open end formed from a wall thereof, which comprises means for feeding a carton in collapsed form, means for expanding the carton, means for folding the tab inwardly of the plane of its supporting wall, movable carrier means adapted to receive and retain the carton in expanded tab-folded condition, and means for inserting an article into the carton on the carrier means to a position to be engaged by the tab, said tab-folding means comprising a folding member mounted for movement transversely of the plane of said wall adapted to engage the outer face of the tab and swing it inwardly of the plane of said wall, a holding member mounted for movement through said open carton end to engage the inner face of said wall adjacent the tab during inward movement of the folding member to hold the wall against deflection, and means for moving the holding member to and from the wall-engaging position, and means for moving the folding member inwardly and outwardly.

4. A machine for loading articles into a four-walled open-ended carton having an article-retaining tab adjacent an open end formed from a wall thereof, which comprises means for feeding a carton in collapsed form, means for expanding the carton, means for folding the tab inwardly of the plane of its supporting wall, movable carrier means adapted to receive and retain the carton in expanded tab-folded condition, and means for inserting an article into the carton on the carrier means to a position to be engaged by the tab, said tab-folding means comprising a folding member carried by and movable with said carrier means and mounted for movement transversely of the plane of said wall adapted to engage the outer face of the tab and swing it inwardly of the plane of said wall, and means for moving the folding member inwardly and outwardly.

5. A machine for loading articles into a four-walled open-ended carton having an article-retaining tab adjacent an end formed from a wall thereof, comprising means for feeding a collapsed carton, means for expanding the carton and preliminarily folding the tab about its hinge line out of the plane of its supporting wall, movable carrier means for receiving the carton in expanded tab-folded condition and moving the carton to article loading means, and means for loading an article into the carton on the carrier means, said carrier means comprising a turntable having a compartment for receiving and holding the carton in expanded condition, means normally clear of the compartment and carton for further folding of the tab away from the adjacent carton end and approximately parallel to said carton wall movable into said carton end to engage and swing the tab to such position and hold the tab in such position during loading of an article thereinto, and means for moving the last named folding means to and from the folding and holding engagement with the tab.

6. A machine for loading articles into a four-walled open-ended carton having an article-retaining tab adjacent an open end formed from a wall thereof, which comprises means for feeding a carton in collapsed form, means for expanding the carton and preliminarily folding the tab inwardly of the plane of its supporting wall, movable carrier means adapted to receive and retain the carton in expanded tab-folded condition, additional folding means on the carrier means for folding the tab toward its wall to extend away from the adjacent carton end, means for loading an article into the carton on the carrier means in position to be engaged by the folded tab, and means for successively moving the carton through the expanding means and preliminary tab-folding means from the feeding means to the carrier means, said additional tab-folding means comprising a blade normally positioned outwardly of the plane of said wall and outwardly of the open carton end and movable to extend within the open carton end to engage the tab and fold it toward the opposite carton end, and means for moving the blade between said normal position and the tab-folding position.

7. A machine for loading articles into a four-walled open-ended carton having an article-retaining tab formed from a wall adjacent an end thereof, which comprises means for feeding a carton in collapsed form, means for expanding the carton and preliminarily folding the tab about its hinge line out of the plane of its supporting wall, movable carrier means for receiving and retaining the carton in expanded tab-folded condition and moving the carton to article loading means, and means for loading an article into the carton on the carrier means, said carrier means comprising means for holding the carton, additional folding means normally disposed clear of the carton movable into the carton to swing the tab approximately parallel to said wall and extending away from the adjacent carton end and to hold the tab in such position during loading of an article into the carton, and means for moving the additional folding means to and from the folding and holding engagement with the tab.

8. In a machine for loading articles into a four-walled open-ended, collapsible carton, including means for feeding cartons in collapsed form, and means for loading articles into the expanded cartons, the improvement which comprises means for expanding collapsed cartons, said carton expanding means comprising a double-faced rack mounted for reciprocation, a pair of gear members rotatably mounted at each face of the rack and meshing therewith, an arm extending from each of the gear members, a pair of opposed carrying members each pivotally connected at spaced points to the arms of one pair of gear members and adapted to receive a collapsed carton therebetween, suction cup devices carried by the carrying members, and means to reciprocate the rack for causing arcuate movement through approximately 180° of the suction cup devices in opposition to each other, said devices being adapted upon movement toward each other at one extreme of their movement to grip by suction opposed walls of the collapsed carton and upon movement from each other to draw the opposed walls apart for expanding the carton and upon movement toward each other at the other movement extreme to swing the walls to overcome the inherent return folding tendency thereof.

9. In a machine for loading articles into a four-walled open-ended, collapsible carton, including means for feeding cartons in collapsed form, and means for loading articles into the expanded cartons, the improvement which comprises means for expanding collapsed cartons, said carton expanding means comprising a double-faced rack mounted for reciprocating movement, a pair of gear members rotatably mounted at each side of the rack and meshing therewith, each of the gear members having an arm extending therefrom, a pair of opposed carrying members each pivotally connected at spaced points to the arms of one pair of gear members and adapted to receive a collapsed carton therebetween, suction cup devices carried by the carrying members, and means to reciprocate the rack for causing arcuate movement of the suction cup devices in opposition to each other, said devices being adapted upon movement toward each other to grip by suction opposed walls of the collapsed carton and upon movement from each other to draw the opposed walls apart for expanding the carton.

10. In a machine for loading articles into a four-walled open-ended carton having an article-engaging tab adjacent an open end thereof formed from a wall of the carton, which includes movable carrier means adapted to receive and retain a carton in condition with the tab extending inwardly of the plane of its wall, means to deliver a carton in said condition to the carrier means, and means for loading an article into the carton on the carrier means in position to be engaged by the tab for retention in the carton thereby, the improvement which comprises means for folding the tab out of the plane of its wall, said tab folding means comprising a rock shaft mounted to extend parallel to the fold line of the tab, a crank arm member fixed on the rock shaft, a folding finger pivotally mounted outwardly of the tab-supporting wall with a free end adapted to engage against the outer surface of the tab and to fold the tab inwardly upon swinging movement of the finger inwardly relative to said wall, a lever arm fixed at one end relative to the finger, a link pivotally connecting the crank arm member and the lever arm, link means pivotally connected to the crank arm member, cam-engaging means on the link means, movable cam means engageable with the cam-engaging means to effect turning of the rock shaft to swing the folding finger for folding the tab inwardly, a rotatable shaft mounted to extend parallel to the tab fold line adjacent the open carton end outwardly of the tab-supporting wall, a holding member fixed at one end on the rotatable shaft between the planes of the side walls defining the open carton end and normally extending outwardly of the tab-supporting wall and outwardly of the open carton end, said holding member being adapted to be rocked inwardly of the open carton end against the inner face of said wall adjacent the tab, a gear fixed on the rotatable shaft, a gear member rotatably mounted adjacent the rotatable shaft and meshing with the gear, a crank arm fixed relative to the gear member, and a reciprocable member connected to the crank arm to effect rotation of the rotatable shaft for swinging the holding member through the open carton end against the tab-supporting wall prior to inward swinging of the folding finger, whereby the holding member may support the wall against deflection during the inward folding of the tab.

11. In a machine for loading articles into a four-walled open-ended carton having an article-engaging tab adjacent an open end thereof formed from a wall of the carton, which includes movable carrier means adapted to receive and retain a carton in condition with the tab extending inwardly of the plane of its wall, means to deliver a carton in said condition to the carrier means, and means for loading an article into the carton on the carrier means in position to be engaged by the tab for retention in the carton thereby, the improvement which comprises means for folding the tab out of the plane of its wall, said tab folding means comprising a rock shaft mounted to extend parallel to the fold line of the tab, a crank arm member fixed on the rock shaft, a folding finger pivotally mounted outwardly of the tab-supporting wall with a free end adapted to engage against the outer surface of the tab and to fold the tab inwardly upon swinging movement of the finger inwardly relative to said wall, a lever arm fixed at one end relative to the finger, a link pivotally connecting the crank arm member and the lever arm, link means pivotally connected to the crank arm member, cam-engaging means on the link means, and movable cam means engageable with the cam-engaging means to effect turning of the rock shaft to swing the folding finger for folding the tab inwardly.

12. In a machine for loading articles into a four-walled open-ended carton having an article-engaging tab adjacent an open end formed from a wall thereof, which includes movable carrier means adapted to receive and retain a carton in expanded condition with the tab folded inwardly of the plane of its supporting wall, means to deliver a carton in said condition to the carrier means, and means for inserting an article into the carton on the carrier means in position to be engaged by the tab for retention in the carton thereby, the improvement which comprises means for folding the tab inwardly of the plane of its wall, said tab folding means comprising a rock shaft extending parallel to the fold line of the tab, a crank arm fixed on the rock shaft, a bent folding blade pivotally mounted outwardly of the plane of said wall with a free end adapted to engage the outer face of the tab and fold it inwardly upon swinging movement inwardly relative to said wall, a lever arm fixed at one end relative to the blade, a link pivotally connecting the crank arm means and the lever arm, link means pivotally connected to the crank arm means, cam-engaging means on the link means, movable cam means engageable with the cam-engaging means to cause turning of the rock shaft to swing the folding blade inwardly, a rotatable shaft mounted to extend parallel to the fold line of the tab adjacent the open carton end outwardly of said wall, a holding member fixed at one end on the rotatable shaft between the planes of the side walls defining the open carton end and normally extending outwardly of said wall and outwardly of said open carton end, said holding member being adapted to engage against the inner face of said wall adjacent the tab upon swinging movement inwardly of the open carton end, a gear fixed on the rotatable shaft, a gear member rotatably mounted adjacent the rotatable shaft and meshing with said gear, a crank arm fixed relative to the gear member, and reciprocable means connected to the crank arm to effect rotation of the rotatable shaft for swinging the holding member inwardly of the open carton end against the inner face of said wall adjacent the tab prior to inward swinging of said folding blade, whereby the holding member supports the wall against deflection during the inward folding of the tab.

13. In a machine for loading articles into a four-walled open-ended carton having an article-engaging tab adjacent an open end formed from a wall thereof, which includes movable carrier means adapted to receive and retain a carton in expanded condition with the tab folded inwardly of the plane of its supporting wall, means to deliver a carton in said condition to the carrier means, and means for inserting an article into the carton on the carrier means in position to be engaged by the tab for retention in the carton thereby, the improvement which comprises means for folding the tab inwardly of the plane of its wall, said tab folding means comprising a rock shaft extending parallel to the fold line of the tab, a crank arm fixed on the rock shaft, a bent folding blade pivotally mounted outwardly of the plane of said wall with a free end adapted to engage the outer face of the tab and fold it inwardly upon swinging movement inwardly relative to said wall, a lever arm fixed at one end relative to the blade, a link pivotally connecting the crank arm means and the lever arm, link means pivotally connected to the crank arm means, cam-engaging means on the link means, and movable cam means engageable with the cam-engaging means to cause turning of the rock shaft to swing the folding blade inwardly.

14. A machine for loading flanged-end articles into a four-walled open-ended carton having a flange-engaging tab formed from a wall thereof adjacent an end of the carton, which comprises means for folding the tab of an expanded carton inwardly out of the plane of its wall including a holder for supporting a carton in expanded condition, means movable to engage the tab and swing it inwardly out of the plane of its wall, and wall holding means movable to engage the inner face of the tab-supporting wall adjacent the tab for holding the wall against stress during the folding of the tab, a movable carrier adapted to receive and retain a carton in expanded tab-folded condition, and means for moving a carton from the tab folding means to the movable carrier.

15. In a machine for loading flanged-end articles into a four-walled open-ended, collapsible carton having a flange-engaging tab formed from a wall thereof adjacent an end of the carton, which includes carrier means movable in a pre-determined path adapted for receiving and retaining the carton in expanded condition, means for delivering the carton in expanded condition to the carrier means, and means for loading flanged-end articles into the expanded carton on the carrier means, the improvement which comprises means for folding a tab of the expanded carton inwardly out of the plane of its supporting wall before delivery of the carton to the carrier means, and means movable against the inner face of the supporting wall adjacent the tab to hold the wall against deflection during said swinging of the tab.

16. Mechanism for loading articles into a four-walled open-ended carton having an article-retaining tab adjacent an open end formed from a wall thereof, which includes means for folding the tab inwardly of the plane of its supporting wall, said tab folding means comprising means for receiving and holding the carton in open condition, a movably mounted member adapted to engage the outer face of the tab and swing it inwardly of the plane of said wall, means for projecting and retracting said movable member, a holding member mounted for movement through said open carton end to engage the inner face of said wall adjacent the tab for holding the wall against deflection during the folding of the tab, and means for moving the holding member to and from its wall-engaging position.

17. A machine for loading flanged-end articles into a four-walled, open-ended carton having a flange-engaging tab formed from a wall thereof adjacent an end of the carton, which comprises means for folding a tab of a carton inwardly out of the plane of its supporting wall, said tab folding means including means movable against the tab to swing it inwardly and means movable against the inner face of the supporting wall to hold it against deflection during the swinging of the tab, means to deliver a carton to the tab folding means, and means for inserting an article into the tab-folded carton in position to be engaged by the tab for retention of the article within the carton.

18. In a machine for loading articles into a four-walled open-ended carton having an article-engaging tab adjacent an open end thereof formed from a wall of the carton, which includes movable carrier means having a plate-like portion and adapted to receive and retain a carton in expanded condition with the tab extending inwardly of the plane of its wall with said open end disposed adjacent an edge of said portion, means to deliver a carton in said condition to the carrier means, and means for loading an article into the carton on the carrier means in position to be engaged by the tab for retention in the carton thereby, the improvement which comprises means mounted on the carrier means for folding the tab toward its supporting wall and holding it to extend in a direction away from the adjacent open carton end, said folding and holding means comprising a blade member movably mounted at the edge of the carrier means adjacent which said open carton end is disposed, said blade member having a supporting portion extending substantially perpendicular to the plane of the tab-supporting wall and a folding portion extending from the supporting portion in a direction inwardly relative to said carrier means edge and normally disposed outwardly of the tab-supporting wall and inwardly of said edge, a slide element on said supporting portion, a guide member receiving the slide element for movement in a direction substantially perpendicular to the tab-supporting wall, a reciprocal member secured to the guide member and mounted for reciprocation in a direction inwardly and outwardly relative to the carrier means edge, cam-engaging means on the reciprocal member, first stationary cam means engaged by the cam-engaging means adapted to reciprocate the reciprocal member upon movement of the carrier means to cause inward and outward movement of the blade member, a slotted element extending from the supporting portion of the blade member, a bell crank member pivotally mounted adjacent the slotted element and having one end engaged therein, a second reciprocable member mounted for movement inwardly and outwardly relative to said carrier means edge and pivotally connected to the other end of the bell crank member, cam-engaging means on the second reciprocable member, and second stationary cam means engaged by the cam-engaging means of the second reciprocable member adapted to move the bell crank member for effecting movement of the blade member inwardly and outwardly of the tab-supporting wall in timed relation to inward and outward movement of the blade member relative to the carrier means edge, whereby the folding portion of the blade member may be moved from its normal position outwardly of the carrier means edge, then inwardly of the plane of the tab-supporting wall, and inwardly of said edge to engage through the open carton end against the tab to fold it inwardly from the open end and toward the tab-supporting wall, and may be returned to its normal position by reverse movement.

References Cited in the file of this patent

UNITED STATES PATENTS

| | | |
|---|---|---|
| 1,935,269 | Jones | Nov. 14, 1933 |
| 2,124,962 | Ferguson | July 26, 1938 |
| 2,171,131 | Milmoe | Aug. 29, 1939 |
| 2,217,784 | Bennett | Oct. 15, 1940 |
| 2,351,596 | Brogden | June 20, 1944 |
| 2,399,934 | Monroe | May 7, 1946 |
| 2,558,456 | Palmer | June 26, 1951 |
| 2,567,598 | Deutsch | Sept. 11, 1951 |
| 2,587,050 | Levkoff | Feb. 26, 1952 |
| 2,603,924 | Currie et al. | July 22, 1952 |
| 2,625,777 | Malhiot | Jan. 20, 1953 |
| 2,646,656 | Wahl | July 28, 1953 |